(12) United States Patent
Karasawa et al.

(10) Patent No.: US 11,592,004 B2
(45) Date of Patent: Feb. 28, 2023

(54) VERTICAL SHAFT WIND POWER GENERATION DEVICE AND HYDROPOWER GENERATION DEVICE ACCOMMODATED IN CONTAINER

(71) Applicant: NTN CORPORATION, Osaka (JP)

(72) Inventors: Ryosuke Karasawa, Kuwana (JP); Tomohisa Okuno, Kuwana (JP); Mitsuru Akagawa, Kuwana (JP); Kaname Nishimura, Kuwana (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 17/225,524

(22) Filed: Apr. 8, 2021

(65) Prior Publication Data

US 2021/0222676 A1    Jul. 22, 2021

Related U.S. Application Data

(63) Continuation of application No. PCT/JP2019/039069, filed on Oct. 3, 2019.

(30) Foreign Application Priority Data

Oct. 9, 2018   (JP) .............................. JP2018-190582
Oct. 9, 2018   (JP) .............................. JP2018-190583
(Continued)

(51) Int. Cl.
*F03D 13/40* (2016.01)
*F03D 13/10* (2016.01)
(Continued)

(52) U.S. Cl.
CPC ............. *F03D 13/10* (2016.05); *F03D 3/005* (2013.01); *F03D 9/008* (2013.01); *F03D 13/40* (2016.05); *F05B 2240/90* (2013.01)

(58) Field of Classification Search
CPC .......... F03D 13/10; F03D 3/005; F03D 9/008; F03D 13/40; F05B 2240/90
See application file for complete search history.

(56) References Cited

U.S. PATENT DOCUMENTS 7,287,962 B2   10/2007   Wobben
7,888,590 B2    2/2011   Niederer
(Continued)

FOREIGN PATENT DOCUMENTS

JP   2007-187043   7/2007
JP     4563179    10/2010
(Continued)

OTHER PUBLICATIONS

International Search Report dated Dec. 10, 2019 in International Patent Application PCT/JP2019/039069.
(Continued)

*Primary Examiner* — Aaron R Eastman

(57) ABSTRACT

Provided is a vertical axis wind power generation device including a wind turbine of a vertical axis type including a support column, a main shaft disposed on an upper portion of the support column so as to be rotatable, a plurality of blades coupled to the main shaft through arms; a power generator; and a container having a standard dimension for freight transport. The wind turbine is accommodatable in a folded or disassembled state in the container together with the power generator. The container is provided with a support-column fixing part configured to fix the support column of the wind turbine to the container. The container may include an inclining mount inside the container, the inclining mount being configured to accommodate a folded body of the wind turbine.

19 Claims, 42 Drawing Sheets

(30) Foreign Application Priority Data

Apr. 4, 2019 (JP) .............................. JP2019-072001
Apr. 18, 2019 (JP) .............................. JP2019-079604

(51) Int. Cl.
*F03D 3/00* (2006.01)
*F03D 9/00* (2016.01)

(56) References Cited

U.S. PATENT DOCUMENTS

| | | |
|---|---|---|
| 8,061,998 B2 | 11/2011 | Wobben |
| 2006/0013689 A1 | 1/2006 | Wobben |
| 2006/0260672 A1 | 11/2006 | Niederer |
| 2008/0050235 A1 | 2/2008 | Wobben |
| 2008/0231057 A1* | 9/2008 | Zeuner .................. F03B 17/065 |
| | | 416/106 |
| 2009/0079161 A1 | 3/2009 | Muchow et al. |
| 2010/0140949 A1* | 6/2010 | Pitre ....................... F03D 13/20 |
| | | 290/55 |
| 2011/0146751 A1* | 6/2011 | McGuire ................ F03D 9/007 |
| | | 136/245 |
| 2011/0176256 A1 | 7/2011 | Van Straten |
| 2012/0007365 A1* | 1/2012 | Harrison ................... E03B 3/03 |
| | | 290/55 |
| 2015/0300321 A1* | 10/2015 | Haar ....................... F03D 9/255 |
| | | 206/223 |
| 2016/0036375 A1* | 2/2016 | Ansari .................... F03G 6/001 |
| | | 206/216 |
| 2016/0108893 A1 | 4/2016 | Agtuca |
| 2017/0370346 A1* | 12/2017 | Botwright .............. B63B 25/00 |
| 2017/0370347 A1* | 12/2017 | Davis ..................... F03D 13/20 |

FOREIGN PATENT DOCUMENTS

| | | |
|---|---|---|
| JP | 4791353 | 10/2011 |
| JP | 5557858 | 7/2014 |
| JP | 5599926 | 10/2014 |
| JP | 2017-218998 | 12/2017 |

OTHER PUBLICATIONS

International Preliminary Report on Patentability for International Application No. PCT/JP2019/039069 dated Apr. 8, 2021.
Notice of Reasons for Refusal dated Jul. 26, 2022 in Japanese Patent Application No. 2018-190582.
Extended European Search Report dated Jun. 10, 2022 in European Patent Application No. 19870489.2 (11 pages).
Japanese Notice of Allowance dated Nov. 15, 2022 in Japanese Patent Application No. 2018-190582 (3 pages; 2 pages English translation).

\* cited by examiner

VERTICAL SHAFT WIND POWER GENERATION DEVICE AND HYDROPOWER GENERATION DEVICE ACCOMMODATED IN CONTAINER

CROSS REFERENCE TO THE RELATED APPLICATION

This application is a continuation application, under 35 U.S.C. § 111(a), of international application No. PCT/JP2019/039069, filed Oct. 3, 2019, which claims priority to Japanese patent application No. 2018-190582, filed Oct. 9, 2018, Japanese patent application No. 2018-190583, filed Oct. 9, 2018, Japanese patent application No. 2019-072001, filed Apr. 4, 2019, and Japanese patent application No. 2019-079604, filed Apr. 18, 2019, the entire disclosures of all of which are herein incorporated by reference as a part of this application.

BACKGROUND OF THE INVENTION

Field of the Invention

The present invention relates to a vertical axis wind power generation device capable of being easily transported and simply installed as a power supply source in non-electrified areas of developing countries and/or disaster areas affected by hazards and to a container-accommodated hydropower generation device having excellent transportability.

Description of Related Art

Patent Documents 1 to 4 have proposed wind power generation devices in consideration of easy transport and simple installation. Patent Document 1 describes that solar panels serving as side surfaces of a transport box are unfolded upward so as to be raised on a frame of the box in an inclined manner and that a wind power generator is attached to a side of the frame. Patent Documents 2, 3 describe that a container used when transporting a wind power generator is used as a foundation for setting up the wind power generator. Patent Document 4 describes that blades of a wind turbine of a vertical axis wind power generation device can be folded along a main shaft.

RELATED DOCUMENT

Patent Document

[Patent Document 1] JP Patent No. 4791353
[Patent Document 2] JP Patent No. 4563179
[Patent Document 3] JP Patent No. 5557858
[Patent Document 4] JP Laid-open Patent Publication No. 2017-218998

SUMMARY OF THE INVENTION

Important requirements of power source systems for supplying electric power in non-electrified areas of developing countries and/or disaster areas affected by hazards include easy transport, simple installation, and power generation capability.

Patent Document 1 assumes that a unit is dimensioned as a 1-m cube, so that sufficient power generation capability cannot not be achieved. Further, although the size of the 1-m cube is advantageous in transport in that the unit can be transported even by a small truck, in the case where more than one units are loaded in and transported by a truck, they do not tightly fit within the dimensions of a back of the truck and leave a useless space, which is uneconomical. Patent Documents 2, 3 use containers each having a standard dimension, so that they can be efficiently transported by ground transport (by trucks or trains), ocean freight and/or air freight. The wind power generation devices of Patent Documents 1 to 3, however, all employ horizontal axis wind turbines, so that they have poor power generation efficiency when they have compact configurations. Where a wind turbine has a compact size in consideration of transportability to and easy installation in non-electrified areas of developing countries and/or disaster areas affected by hazards, the wind turbine has poor power generation efficiency and insufficient power generation capability. In addition, the horizontal axis wind turbines are hardly rotated at low wind speed, so that it may not be possible to find an installation location in which electric power can be effectively generated in the case where they are installed in limited spaces in disaster areas.

Patent Document 4 does not have the problem of the horizontal axis wind turbines because it employs a vertical axis wind turbine, and provides excellent transportability and installation because the blades can be folded. However, the document does not disclose how the folded wind turbine is transported.

An object of the present invention is to provide a vertical axis wind power generation device capable of being easily transported and simply installed and providing sufficient power generation capability even where it has a compact configuration.

Another object of the present invention is to provide a container-accommodated hydropower generation device which is a compact hydropower generation device having improved transportability.

A vertical axis wind power generation device of the present invention includes:

a wind turbine of a vertical axis type including a support column, a main shaft disposed on an upper portion of the support column so as to be rotatable about a vertical axis, a plurality of blades extending in a vertical direction around the main shaft and coupled to the main shaft through arms;

a power generator configured to generate electric power by rotation of the main shaft; and a container having a standard dimension for freight transport, wherein the wind turbine is accommodatable in the container together with the power generator, and the container is provided with a support-column fixing part configured to fix the support column of the wind turbine to the container.

According to the constitution, since the wind power generation device is of a vertical axis type, it is possible to efficiently generate electric power even where the device has such a compact size that it can be transported by a single truck and to efficiently generate electric power at low wind speed, unlike that of a horizontal axis type. Further, since the wind power generation device includes a container having a standard dimension for freight transport, and the wind turbine is accommodatable in the container together with the power generator, it can be treated as a general standard-sized container when transported by ground transport (by trucks or trains), ocean freight and/or air freight and thus is excellent in transportability. For this reason, the power generation device can have a largest possible size within a size restriction for transport, which is advantageous in ensuring power generation capability. In order to set up the wind turbine, the container is provided with a support-column fixing part for fixing the support column of the wind turbine thereto, so that the wind turbine can be easily set up on the container, and the container can be used as a foundation for the wind turbine.

Thus, it is possible to easily transport the wind power generation device, to install it easily and speedily, and to ensure power generation capability even where it has a compact configuration. This makes it possible to meet a demand for electric power in non-electrified areas and/or disaster areas affected by hazards. It should be noted that the "container having a standard dimension for freight transport" may have a dimension meeting at least a national standard for container transport or a dimension meeting, for example, a standard established by the national administrative body or international authorities such as the International Organization for Standardization (ISO).

In the present invention, the vertical axis wind turbine may be foldable or disassemblable. Where the wind turbine is foldable or disassemblable, a larger vertical axis wind turbine can be easily transported. Although the vertical axis wind turbine may be of an assembled type which allows disassembly of the wind turbine, the vertical axis wind turbine of a foldable type can further facilitate installation operation and can be installed speedily.

In the present invention, the wind turbine may be accommodatable in a folded or disassembled state in the container. Where the wind turbine is accommodatable in a folded or disassembled state in the container, a larger vertical axis wind turbine can be accommodated in the container.

Where the vertical axis wind turbine is foldable, the container may include an inclining mount inside the container, the inclining mount being inclined so as to be lowered toward an opening side at a longitudinal end of the container and configured to carry a folded body of the wind turbine on the inclining mount such that the folded body can be moved in and out through an opening. Thus, the container includes the inclining mount thereinside and accommodates the folded body of the wind turbine on the inclining mount, so that the folded body of the wind turbine can slide on the inclining mount due to self-weight so as to be moved out of the container at an installation site, which facilitates installation operation at the site. For example, it is possible to manually take out a folded wind turbine from a container without using heavy equipment.

In order to accommodate the wind turbine in the container, the wind turbine is pushed up on the inclining mount so as to be received in the container. Since factories or storage warehouses of vertical axis wind power generation devices are generally equipped with heavy machinery or the like, a problem is unlikely to arise in accommodating the devices. Where the vertical axis wind power generation device is set up in a disaster area, however, it is preferable that the wind turbine can be easily taken out from the container by human power at an installation site where the environment is not ready for use of heavy equipment. When the vertical axis wind power generation device is no longer needed and is removed, the traffic situation in the surrounding area is likely be recovered, and heavy equipment can thus be used easily. Alternatively, it is also possible to manually push up the wind turbine on the inclining mount by using a winch or the like from the state of FIG. 39 to accommodate it in the state of FIG. 38.

Where the container includes the inclining mount, the container may include a withdrawing and unfolding mechanism configured to withdraw the folded body of the wind turbine by using the inclining mount while unfolding the folded body and to assist operation of setting up the wind turbine. Where the container includes such a withdrawing and unfolding mechanism, the installation operation can further be facilitated and expedited. In the case where the vertical axis wind turbine has an overall length shorter than that of a longer side of the container, it can be accommodated without being folded, so that the installation operation of such a wind turbine can be more speedily as compared with that of a folded type.

In the present invention, the container may include a double door configured to open and close the opening at the longitudinal end of the container, and the door in an opened state may serve as outriggers. Since the door of the container serves as outriggers, it is possible to secure stability of the container and the wind turbine fixed thereto against e.g. strong wind and/or earthquake, without providing dedicated outriggers.

Where the door serves as outriggers, the container may include an inner door disposed an inner side of the door and configured to prevent entry from an outside. Where the door is used as outriggers, if nothing is provided, the inside would be left open and may be subjected to entry of rain and wind and/or theft. The inner door can prevent such entry and/or theft or the like.

In the present invention, there may be a solar panel assembled with a stand so as to be installable outside or on the container and configured to photovoltaically generate electric power and a secondary battery configured to store the generated electric power, the solar panel and the secondary battery being accommodatable in the container together with the wind turbine in the folded or disassembled state. In the case of this constitution, it is possible to perform wind power generation as well as solar power generation. Since the solar panel is assembled with the stand, it is only necessary to place the solar panel outside or on the container to install it. In the case where the device includes a plurality of solar panels assembled with stands, the solar panels may be shaped such that they can be sequentially stacked in a nesting manner when they are accommodated in the container, so that a large number of solar panels can be accommodated in the container.

In the present invention, the vertical axis wind power generation device may include: a main-shaft-unit folding mechanism configured to allow the main shaft unit including the support column and the main shaft to be folded; and a blade-unit folding mechanism configured to allow blade units, which are constituted by the blades and the arms, to be folded along the main shaft unit in a folded state. According to this constitution, since both the main shaft unit including the support column and the main shaft as well as the blade units including the blades and the arms for supporting the blades can be folded, the device has excellent transportability because it can be transported in the folded state, and can be easily installed by being unfolded from the folded state at a destination because it is a foldable type. Since not only the blade units, but also the main shaft unit including the support column can be folded, the support column can have a relatively large height so as to securely receive a wind force and thus provide sufficient power generation capability, without causing the problem of transportability. This makes it possible to easily transport the wind power generation device, to install it easily and speedily, and to ensure power generation capability even where it has a compact configuration. Thus, it is possible to meet a demand for electric power in non-electrified areas and/or disaster areas affected by hazards.

In the present invention, the main-shaft-unit folding mechanism may include a support-column tilting mechanism tiltably coupling the support column to a wind turbine mount. Where the support column is tiltable, the device can be transported in a more compactly folded state and thus has greater transportability.

In the present invention, the main-shaft-unit folding mechanism may include a main-shaft tilting coupling mechanism coupling a main-shaft lower-end supporting member located at an upper end of the support column and rotatably supporting the main shaft at a lower end of the main shaft to the upper end of the support column such that the main shaft is tiltable, the main-shaft tilting coupling mechanism being configured to cause the main shaft in a laid state to assume a posture along the support column. Thus, the main shaft can be folded so as to assume a posture along the support column, so that the device can be transported in a more compactly folded state and thus has greater transportability.

In the present invention, the blade-unit folding mechanism may include rotary coupling members provided to the respective blades and disposed around the main shaft so as to be rotatable, the rotary coupling members being coupled to base ends of the respective arms. In the case of this constitution, the rotary coupling members can be rotated about the main shaft such that the plurality of blades are folded in an overlapped state, which makes it possible to compactly fold the device.

In the present invention, the blade-unit folding mechanism may include arm-base-end bending coupling parts coupling base ends of the arms to the main shaft in a bendable manner and arm-tip-end bending coupling parts coupling tip ends of the arms to the blades in a bendable manner. In the case of this constitution, the blade unit can be folded such that the respective blades are arranged along the main shaft by bending the arms, which also makes it possible to compactly fold the device.

In the present invention, the door may include a wind-turbine holding part configured to hold the wind turbine in the accommodated state in the container such that the wind turbine extends along an inner side of the door of the container. In the case where the wind turbine is removed from an installation position and is accommodated into the container by using a dolly or the like when moving the wind turbine, the following problems arise. Since there is a step between a floor of the container and the ground, it is necessary to separately provide a slope etc. Further, it is very difficult to push the dolly carrying the wind turbine, which is a heavy object, on the slope up to the floor. In the case where the wind turbine disposed in the container is set up outside the container, it is also necessary to provide a slope and lower a dolly carrying the wind turbine from the container.

As a means for solving the problems, the door is provided with the wind-turbine holding part configured to hold the wind turbine in the accommodated state in the container such that the wind turbine extends along the inner side of the door of the container. Thus, when the door is opened to take out the wind turbine held along the inner side of the door from the container, the wind turbine can be received on a dolly or the like and be moved to a desired installation position without using a slope or the like. Also in the case where the wind turbine is removed from an installation position and accommodated into the container, it is possible to open the door and to easily hold the wind turbine along the inner side of the door by the wind-turbine holding part without using a slope or the like.

In the invention in which the wind-turbine holding part is provided, the wind-turbine holding part may have a function of changing a position of the wind turbine from the inner side of the door to a position distant from the inner side of the door. Although, when the door is opened, the wind turbine held along the inner side of the door can be easily taken out from the container, it is sometimes difficult to carry it on a dolly depending on road surface conditions, such as gravel or soil roads. Thus, the wind-turbine holding part makes it possible to change the position of the wind turbine from the inner side of the door to a position distant from the inner side of the door, so that the wind turbine can be directly moved and fixed to a desired installation position, without being unloaded from the door.

The door may include a water-turbine holding part configured to hold a water turbine in an accommodated state in the container such that the water turbine extends along the inner side of the door of the container. In this case, when the door is opened to take out the water turbine held along the inner side of the door from the container, the water turbine can be received on a dolly or the like and be moved to a desired installation position without using a slope or the like. Also in the case where the water turbine is removed from an installation position and accommodated into the container, it is possible to easily hold the water turbine along the inner side of the door by the water-turbine holding part without using a slope or the like.

In the present invention, the container may be provided with a linear guiding device configured to liftably guide the wind turbine between a use position at which the blades project upward from a height range of the container and an accommodation position at which the blades are accommodated within the height range of the container. In this way, where the wind turbine can be lifted and lowered by the linear guiding device, it is possible to easily unfold the wind turbine to a useable state at a destination and to easily shelter the wind turbine during removal of the wind turbine or high wind events.

Where the wind turbine is liftable, the vertical axis wind power generation device may include a lifting device of a winding type configured to wind a winding member connected to an upper portion of the container and a lower portion of the support column such that the wind turbine can be lifted and lowered. In the case of this constitution, the lifting device can be operated to lift or lower the wind turbine, so that the operation of lifting and lowering the wind turbine is further facilitated. Since the lifting winder is a feature for winding the winding member connected to the upper portion of the container and the lower portion of the support column, it may have a simple constitution. For example, it may be a common winch or the like. The winding member may be a chain, a rope, a belt or the like. Where the lifting device configured to lift and lower the wind turbine such as the lifting winder is provided, the support-column fixing part may be provided only for fixing purpose separately from the lifting device or the like, or the lifting device and/or the linear guiding device may also serve as the support-column fixing part. Where the linear guiding device is provided, the motion is limited to directions other than the vertical direction. Thus, because the lifting device restricts a vertical motion, the wind turbine is fixed to the container.

The lifting device may be of an electrically-powered type which is configured to be driven by an electric motor to perform winding operation. Although the lifting winder may be of a manual type, where it is of an electrically-powered type, the wind turbine can be more easily lifted and lowered through an operation of a switch.

Where the wind turbine is liftable, the container may have a ceiling surface having an upper opening configured to allow the wind turbine to move in and out therethrough, and the support column may be provided with an inner lid configured to tightly close the upper opening when the wind turbine is raised. Where the support column is provided with the inner lid, the upper opening of the container is closed by the inner lid when the wind turbine is raised to the use position, so that a dedicated operation for closing the inner lid is not necessary.

A container-accommodated hydropower generation device of the present invention includes: a container having a standard dimension for freight transport; and a compact hydropower generation device capable of being installed in a water channel and being accommodated in and removed from the container. According to the hydropower generation device having this constitution, the compact hydropower generation device is accommodated in the container having the standard dimension, so that it has excellent transportability.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
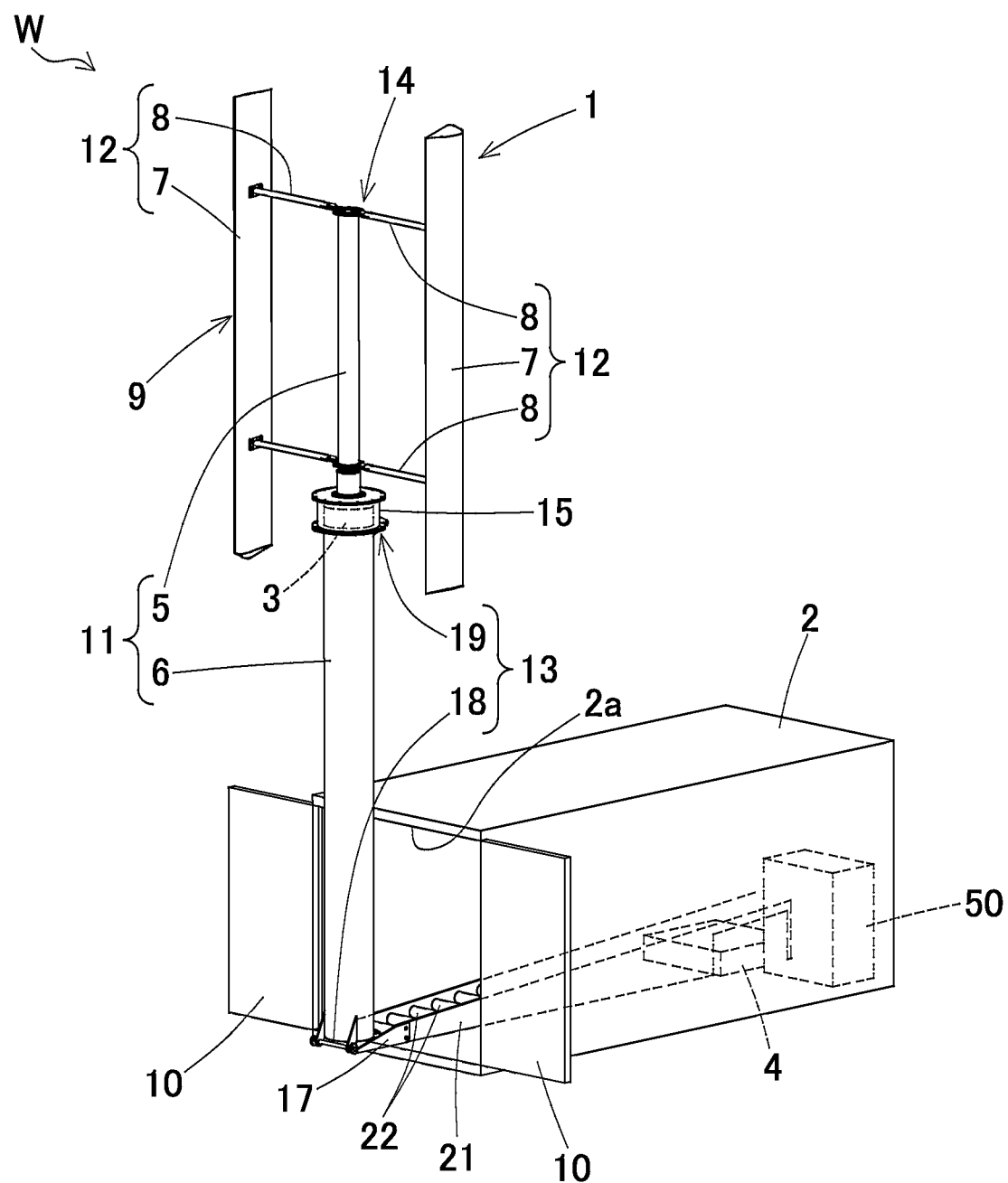
FIG. 1 is a perspective view illustrating a use state of a vertical axis wind power generation device according to a first embodiment of the present invention.

A vertical axis wind power generation device W according to a first embodiment of the present invention will be described with reference to FIG. 1 to FIG. 28. In FIG. 1, the vertical axis wind power generation device W includes: a wind turbine 1; a container 2; and a power generator 3 configured to generate electric power by rotation of the wind turbine 1. The vertical axis wind power generation device W further includes a secondary battery 4 and a control panel 50.

The wind turbine 1 is a wind turbine of a vertical axis type including: a support column 6; a main shaft 5 disposed on an upper portion of the support column so as to be rotatable about a vertical axis; a plurality of blades 7 extending in a vertical direction around the main shaft 5 and coupled to the main shaft 5 through arms 8. The plurality of blades 7 and the arms 8 constitute a rotary blade 9. The support column 6 is constituted by a round steel tube or the like, and the support column 6 is provided with a main-shaft lower-end supporting member 15 at an upper end thereof. The main-shaft lower-end supporting member 15 includes a short tubular casing, and the main shaft 5 is rotatably supported at its lower end by double rows of rolling bearings (not illustrated) disposed inside the casing. The power generator 3 is disposed in the casing of the main-shaft lower-end supporting member 15 and includes an input shaft coupled to the main shaft 5.

The container 2 has a standard dimension for freight transport. The standard for freight transport may at least refer to a national standard for container transport or may refer to, for example, a standard established by the national administrative body or international authorities such as the International Organization for Standardization (ISO). The container 2 of this example corresponds to a 20-feet container according to the ISO standard for dry containers. The container 2 of FIG. 1 includes an opening 2a at a longitudinal end thereof and a double door 10 configured to open and close the opening 2a.

Figure 2:
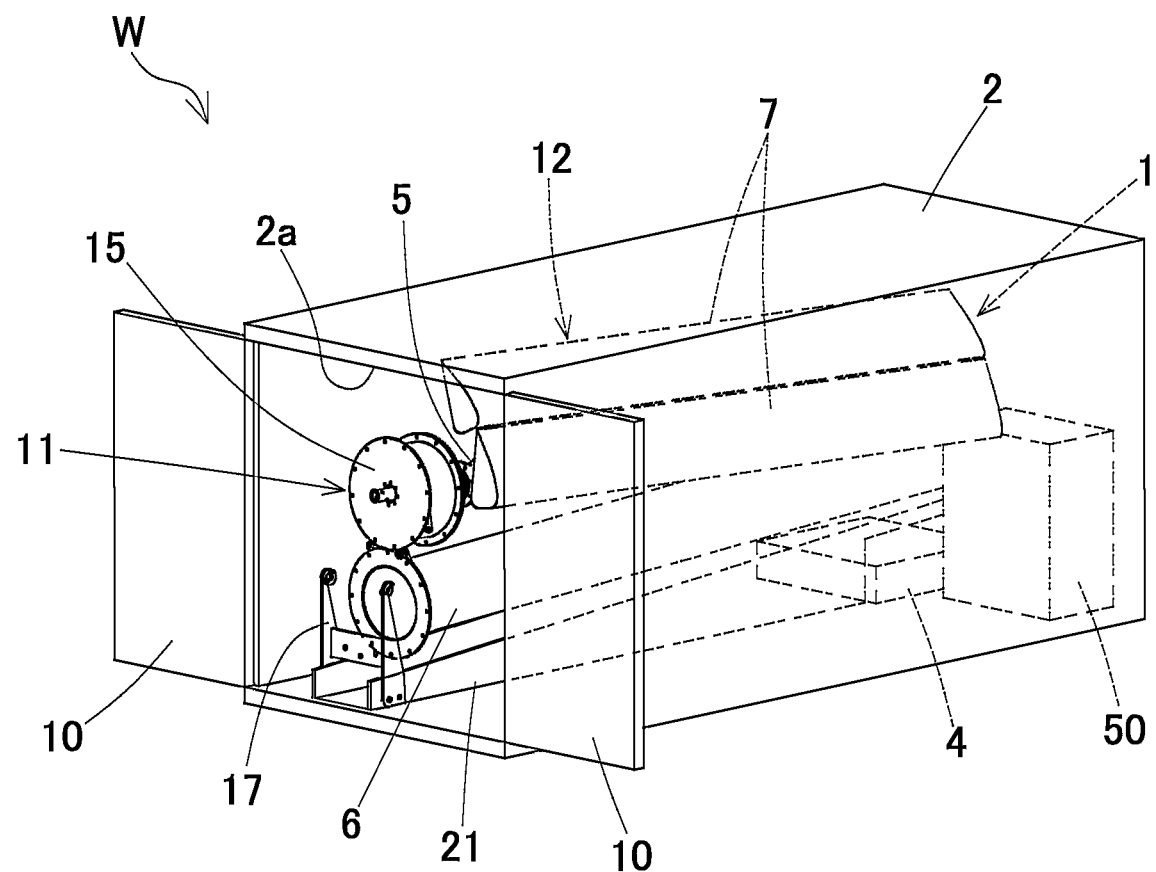
FIG. 2 is a perspective view illustrating an accommodated state of the vertical axis wind power generation device, with its door being opened.

The wind turbine 1 is a foldable type which can be accommodated in the container 2 as shown in FIG. 2. Specifically, in FIG. 1, the wind turbine 1 is constituted by a main shaft unit 11 including the support column 6 and the main shaft 5 as well as a plurality of blade units 12 including the blades 7 and the arms 8 supporting the blades 7. The vertical axis wind power generation device W includes a main-shaft-unit folding mechanism 13 which allows the main shaft unit 11 to be folded and a blade-unit folding mechanism 14 which allows the blade units 12 to be folded so as to extend along the folded main shaft unit 11.

The main-shaft-unit folding mechanism 13 is mainly constituted by a support-column tilting mechanism 18 and a main-shaft tilting coupling mechanism 19. The support-column tilting mechanism 18 is a mechanism tiltably coupling the support column 6 to a wind turbine mount 17. The main-shaft tilting coupling mechanism 19 is a mechanism coupling the main-shaft lower-end supporting member 15 such that the main shaft 5 is tiltable and configured to cause the main shaft 5 in a laid state to assume a posture along the support column 6.

Figure 4:
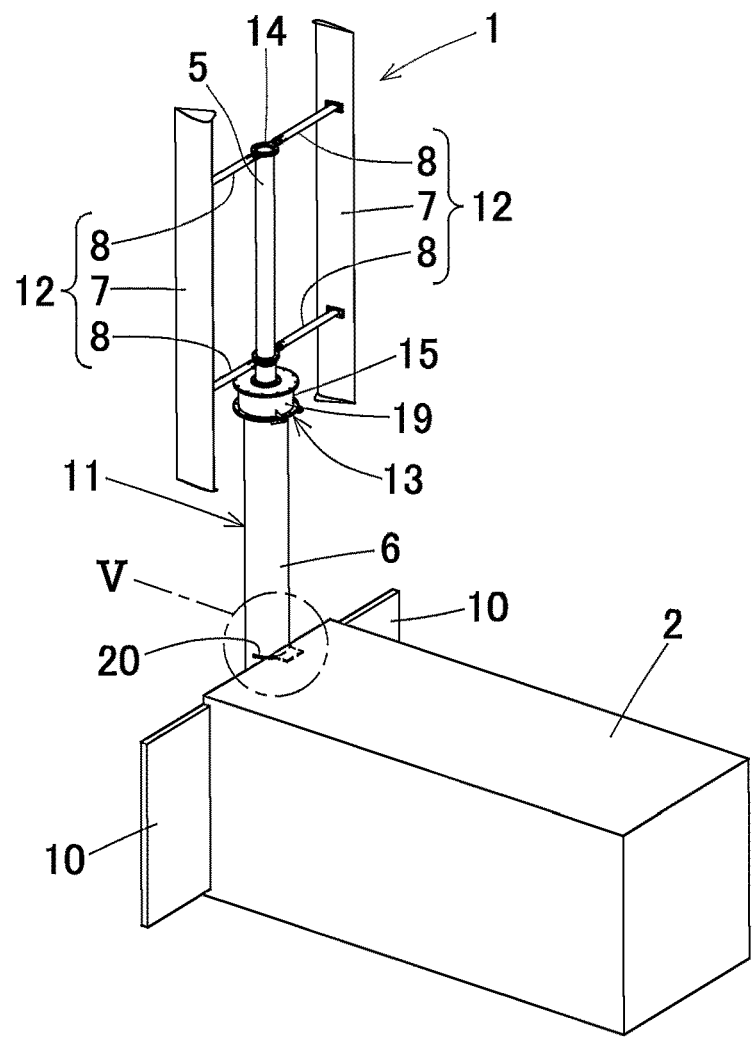
FIG. 4 is a perspective view illustrating the use state of the vertical axis wind power generation device as seen from a back side.
Figure 5:
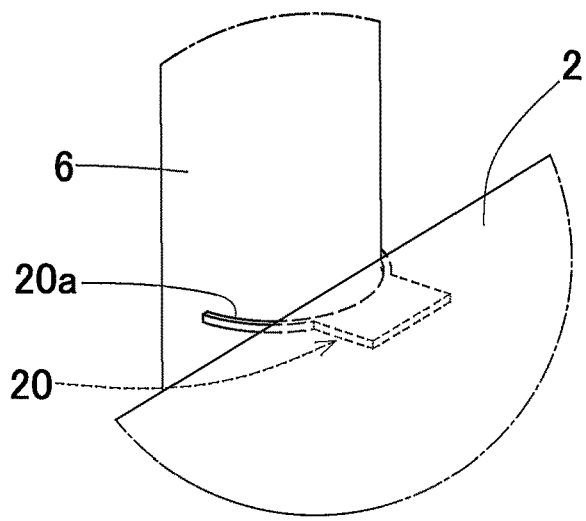
FIG. 5 is an enlarged perspective view of part V of FIG. 4.
Figure 6:
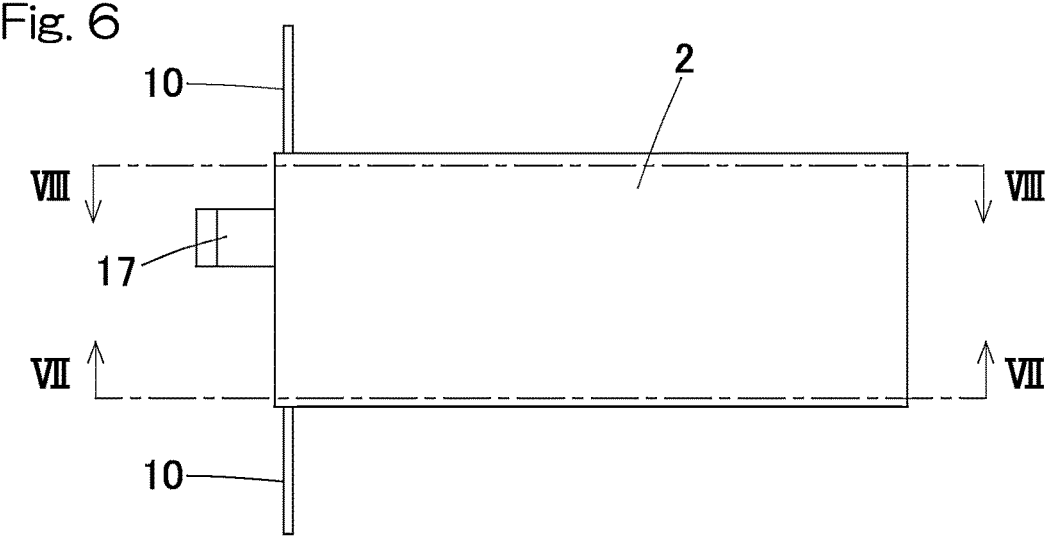
FIG. 6 is a plan view of the vertical axis wind power generation device in the accommodated state, with the door being opened.

The support column 6 in a raised posture is supported by the wind turbine mount 17 at its lower end so as to be positioned along the opening 2a of the container 2 and is fixed at an upper edge of the opening 2a of the container 2 by a support-column fixing part 20 provided to the container 2 as shown in FIG. 4 and FIG. 5. The support-column fixing part 20 is constituted by: a two-pronged metal fitting having a semicircular receiving part 20a (FIG. 5) matching a part of an outer periphery of the support column 6 and a base end fixed to a lower surface of a ceiling of the container 2; and a stopping member (not illustrated) for stopping the support column 6 to the receiving part 20a. The stopping member may be constituted by, for example, a semicircular metal fitting or a rope removably attached to the receiving part 20a so as to surround a remaining part of the outer periphery of the support column 6, along which the receiving part 20a does not extend.

In FIG. 1, an inclining mount 21 is disposed in the container 2. The inclining mount 21 is a stand inclined such that a longitudinal end of the inclining mount on a side of the opening 2a is lowered, the inclining mount being configured to carry and store a folded body of the wind turbine 1 on the inclining mount such that the folded body can be moved in and out through the opening 2a as shown in FIG. 2. In this embodiment, the folded body of the wind turbine 1 includes the main shaft unit 11 and the blade units 12 in a folded state.

Figure 3:
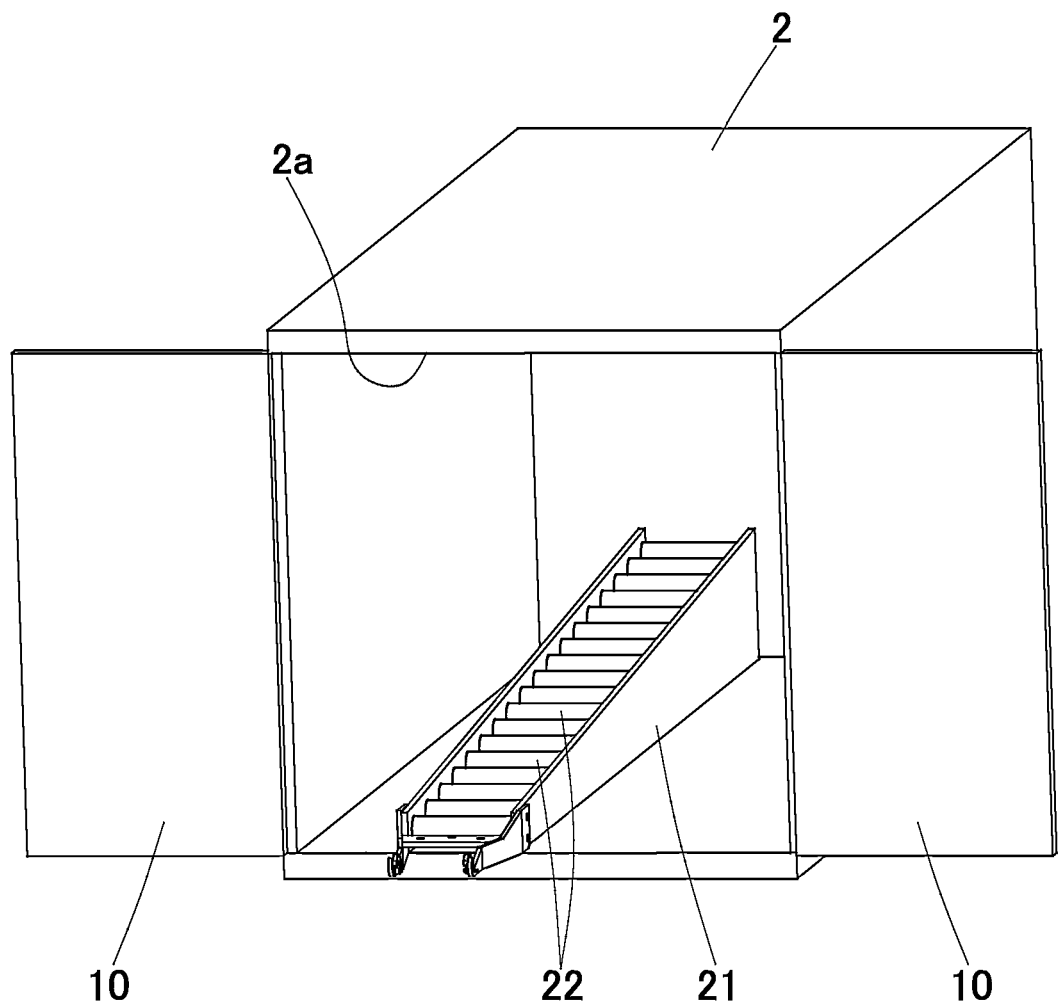
FIG. 3 is a perspective view of an inclining mount disposed in a container of the vertical axis wind power generation device.

The inclining mount 21 includes a guiding part for facilitating movement of the folded body of the wind turbine 1 in a longitudinal direction. In the example of FIG. 1, the guiding part is constituted by a plurality of rollers 22 arranged in the longitudinal direction of the inclining mount 21. As shown in FIG. 3, the inclining mount 21 is constituted as an inclined roller conveyor including the rollers 22 and a frame. It should be noted that the inclining mount may have a flat upper surface and is provided with a resin sheet (not illustrated) for friction reduction as the guiding part.

The inclining mount 21 has a smaller width dimension than a dimension of the container 2 in a shorter width direction of the container and is disposed at a position displaced from the center of the container 2 in the shorter width direction in accordance with the shape and dimension of the folded body of the wind turbine 1. Note that the container 2 may be provided with, instead of the inclining mount 21, a stand (not illustrated) having a flat upper surface for storing the folded body and moving it in and out.

In FIG. 1, the secondary battery 4 and the control panel 50 are disposed in a fixed manner on a floor surface of the container 2 at an inner position lateral to the inclining mount 21. The control panel 50 includes, for example, an AC/DC converter configured to convert alternating current (AC) power generated by the power generator 3 into a voltage which can be stored in the secondary battery 4, a power generation controller configured to control power generation by rotation of the wind turbine 1, and an inverter configured to convert the electric power stored in the secondary battery 4 into sine wave AC similar to commercial AC power or into rectangular wave AC.

Figure 16:
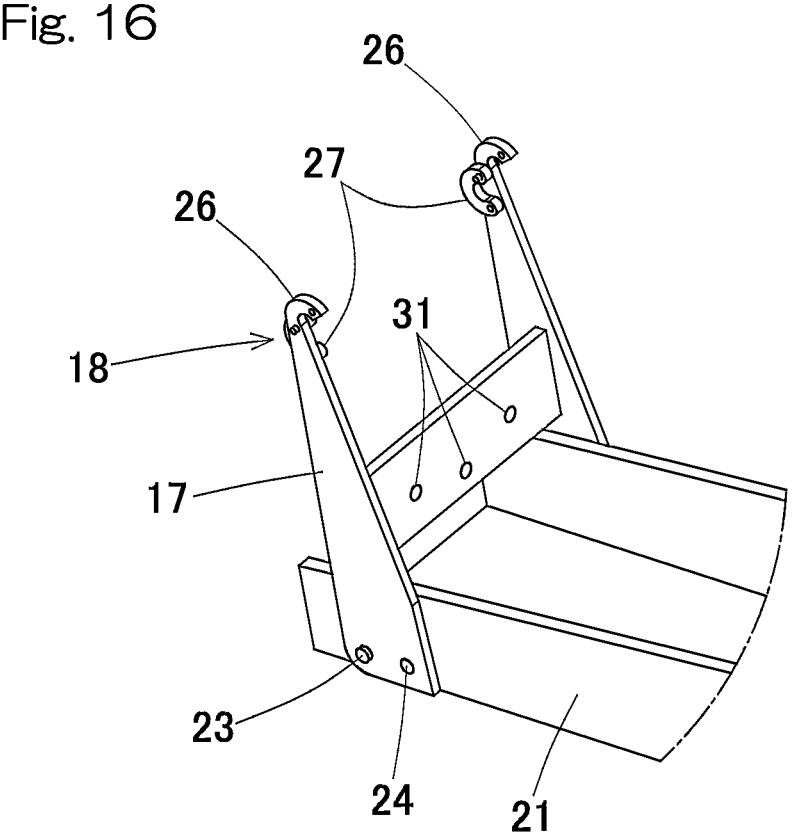
FIG. 16 is a perspective view illustrating a raised state of the wind turbine mount of the vertical axis wind power generation device.
Figure 17:
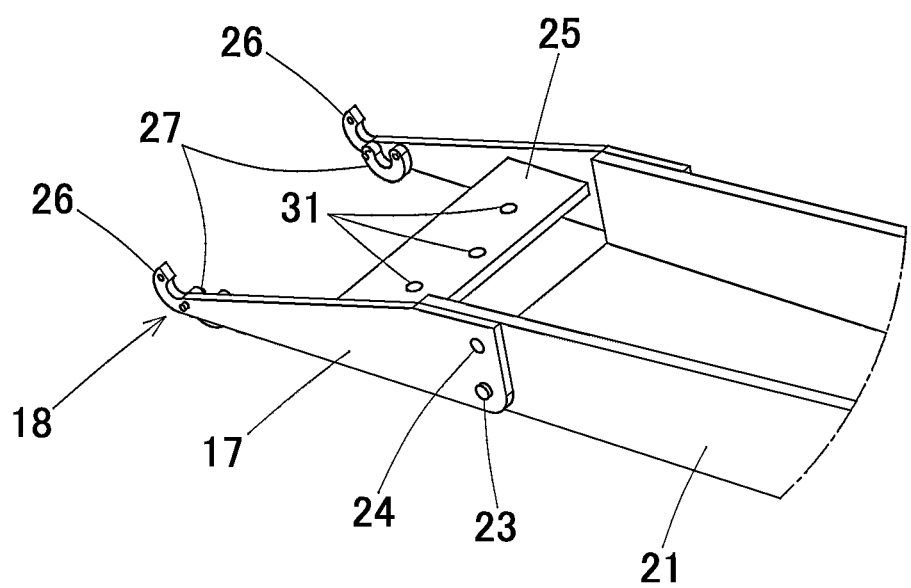
FIG. 17 is a perspective view illustrating a laid state of the wind turbine mount.

FIG. 16 to FIG. 21 show the support-column tilting mechanism 18 of the main-shaft-unit folding mechanism 13 (FIG. 1). As shown in FIG. 16 and FIG. 17, the wind turbine mount 17 is coupled to a lower end of the inclining mount 21 in an inclination direction so as to be tiltable about a horizontal support shaft 23 and can be fixed in a raised posture for accommodation as shown in FIG. 16 and in a horizontal position for use as shown in FIG. 17 by a locking fixture (not illustrated), such as a pin, removably inserted into a locking hole 24.

Figure 18:
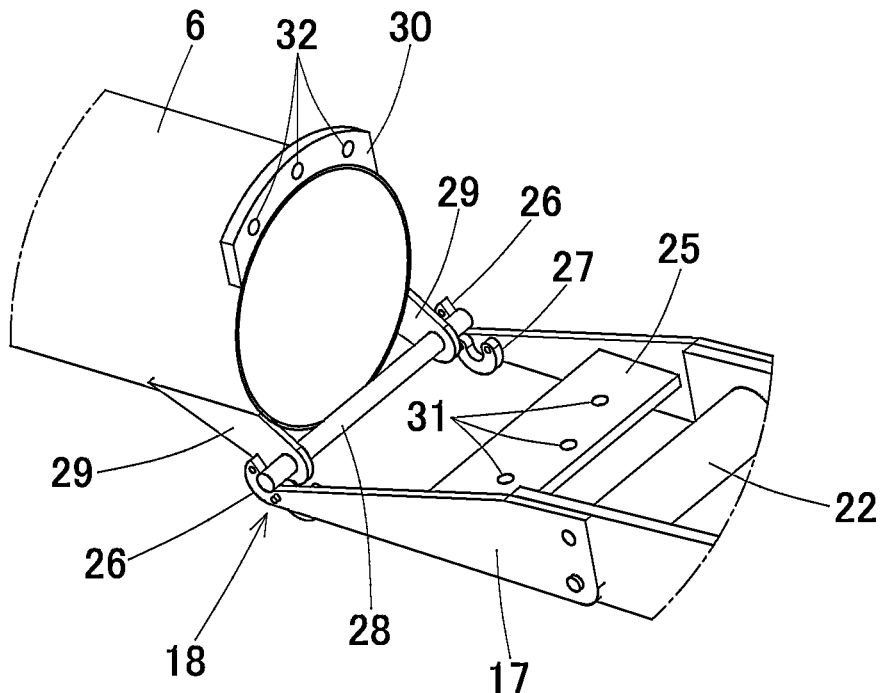
FIG. 18 is a perspective view illustrating a step of coupling the support column to the wind turbine mount.
Figure 19:
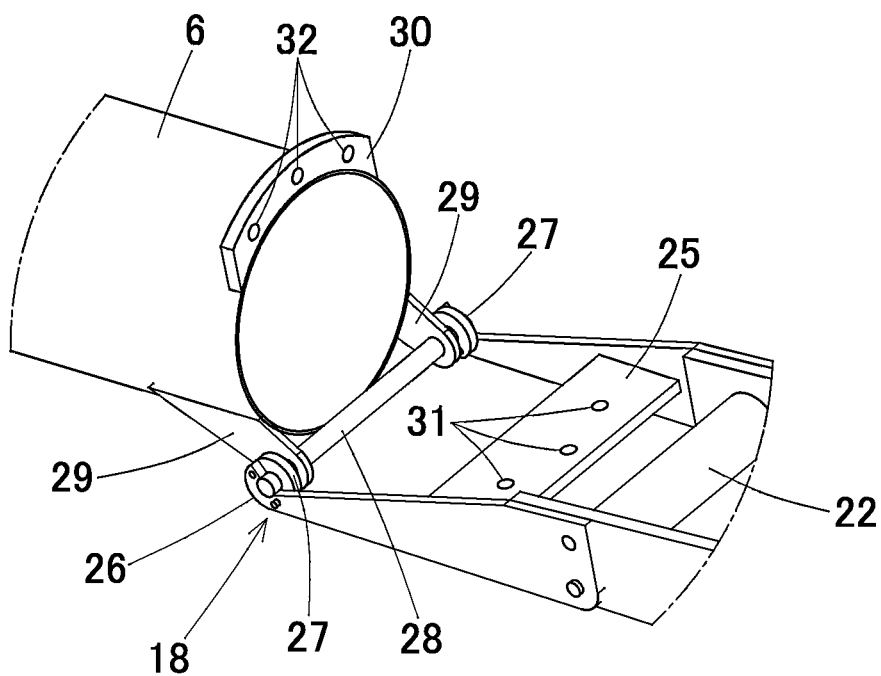
FIG. 19 is a perspective view illustrating a step of engaging an overhanging hook of the wind turbine mount.
Figure 20:
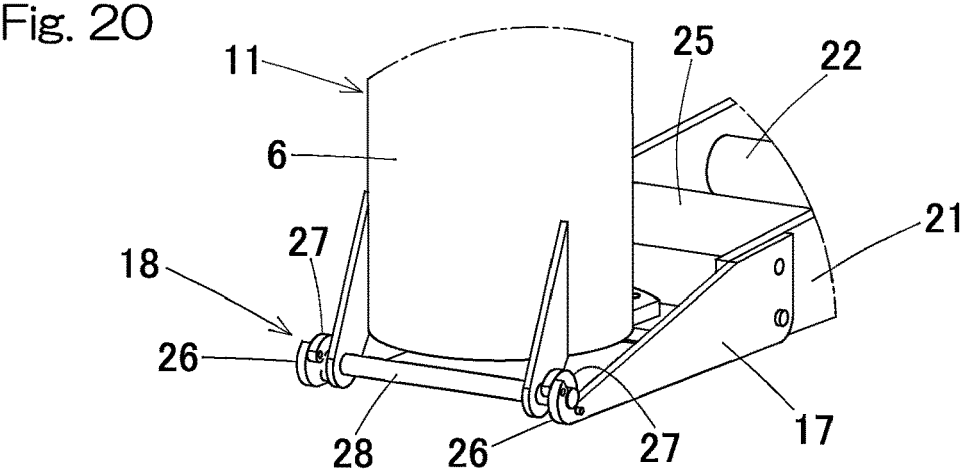
FIG. 20 is a perspective view illustrating a step of raising the support column on the wind turbine mount.
Figure 21:
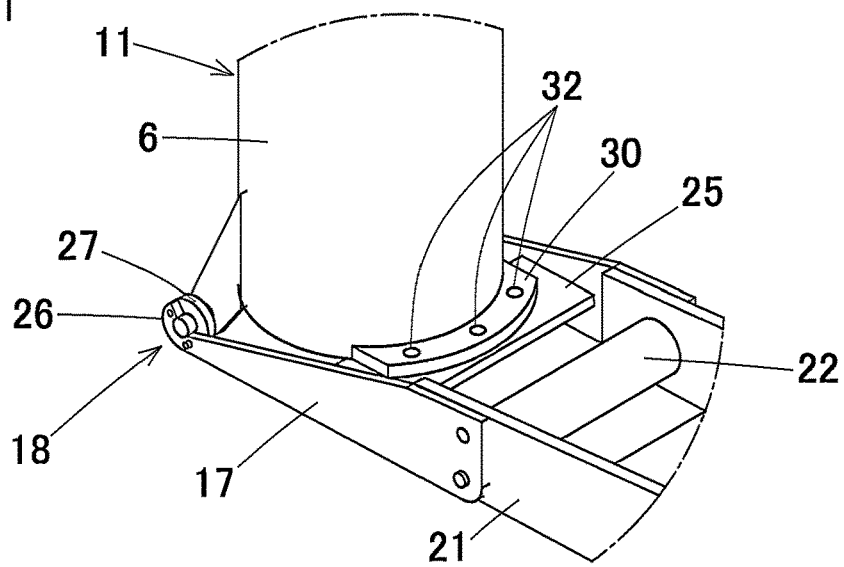
FIG. 21 is a perspective view illustrating a step of fixing the support column to the wind turbine mount.

The wind turbine mount 17 has a part on a base end side with respect to its center, which is provided with a support-column coupling plate 25, and opposite side portions each having a tip end provided with a fixed receiving hook 26 and a turnable overhanging hook 27. As shown in FIG. 18 and FIG. 19, the support column 6 has a base end provided with a supported bar 28 fixed through brackets 29, 29 at opposite side portions thereof and a base-end coupling plate 30. With the supported bar 28 being engaged with the receiving hooks 26 of the wind turbine mount 17 as shown in FIG. 18 and engaged from above with the overhanging hooks 27 of the wind turbine mount 17 as shown in FIG. 19, the support column 6 is raised as shown in FIG. 20. In this state, the base-end coupling plate 30 of the support column 6 is superposed on the support-column coupling plate 25 of the wind turbine mount 17 as shown in FIG. 21, so that the lower end of the support column 6 is fixed to the wind turbine mount 17 by bolts (not illustrated) inserted through bolt insertion holes 31 (FIG. 19), 32 provided in the support-column coupling plate 25 and the base-end coupling plate 30 in an aligned manner and nuts fastened thereto. The raised support column 6 can be laid down in the reverse order. The support-column tilting mechanism 18 is constituted by the receiving hooks 26, the overhanging hooks 27, the supported bar 28 (FIG. 20), the support-column coupling plate 25, and the base-end coupling plate 30.

Figure 22:
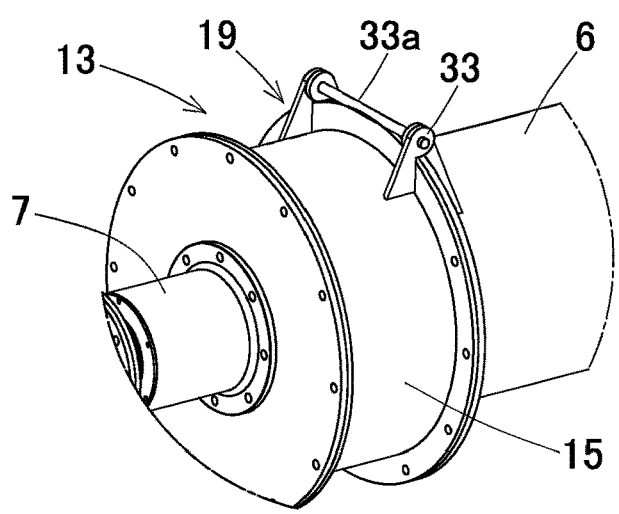
FIG. 22 is a perspective view of a main-shaft tilting coupling mechanism of the vertical axis wind power generation device.
Figure 23:
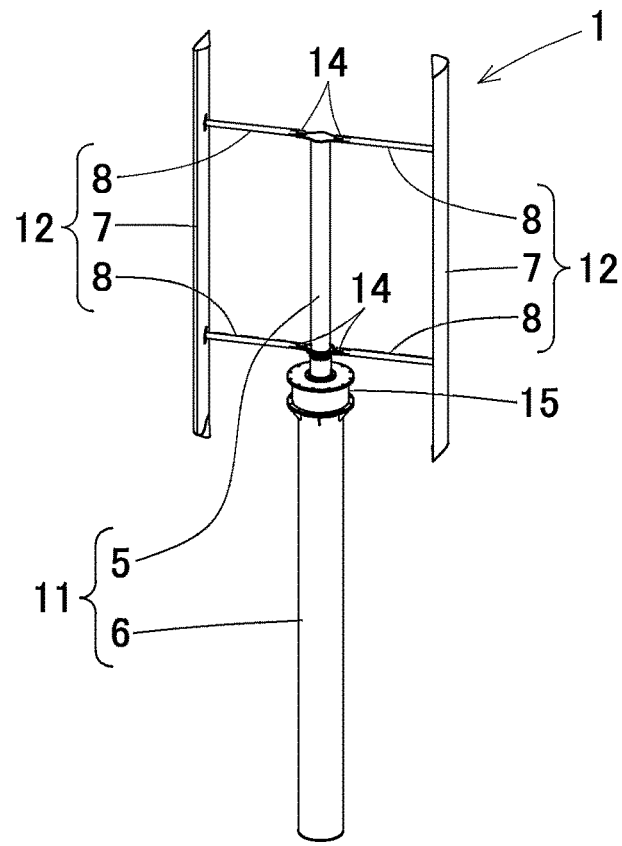
FIG. 23 is a perspective view illustrating an unfolded state of the blade units of the vertical axis wind power generation device.

FIG. 22 shows the main-shaft tilting coupling mechanism 19 of the main-shaft-unit folding mechanism 13. FIG. 22 shows the support column 6 in a laid posture. The main-shaft lower-end supporting member 15 is tiltably coupled to the upper end of the support column 6 by a hinge device 33. Specifically, the main-shaft lower-end supporting member 15 is tiled integrally with the main shaft 5 (FIG. 2) about a rotation support shaft 33a of the hinge device 33. The main-shaft tilting coupling mechanism 19 is constituted by the hinge device 33 and a coupling member (not illustrated) which is disposed at a position opposite to the position of the hinge device 33 in a direction of a diameter of the support column and releasably couples the support column 6 and the main-shaft lower-end supporting member 15.

Figure 24:
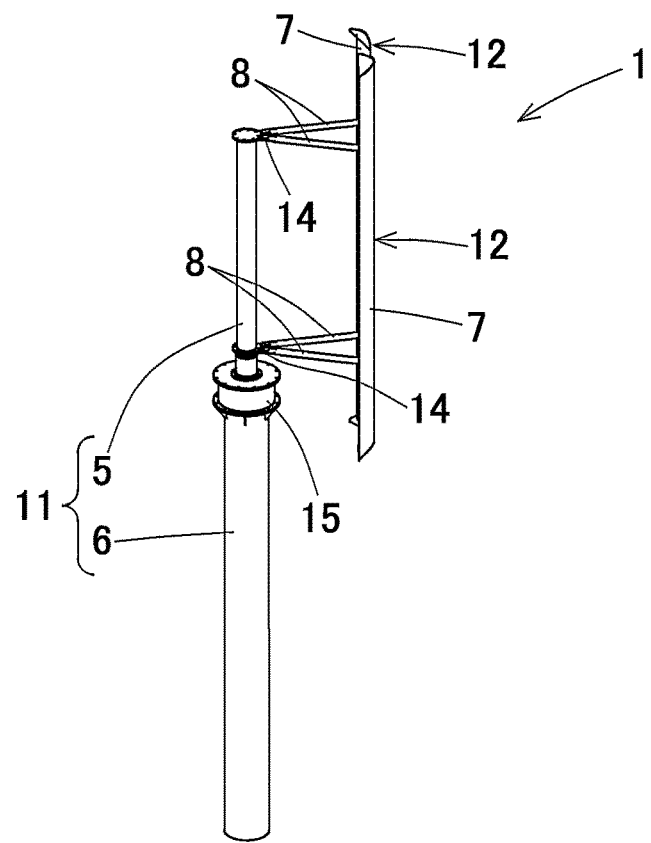
FIG. 24 is a perspective view illustrating a folded state of the blade units of the vertical axis wind power generation device.
Figure 25:
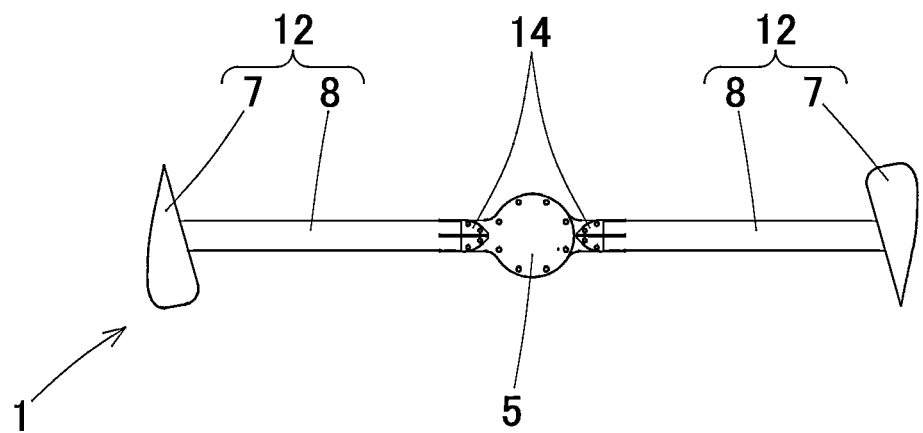
FIG. 25 is a plan view illustrating an unfolded state of the blade units of the vertical axis wind power generation device.
Figure 26:
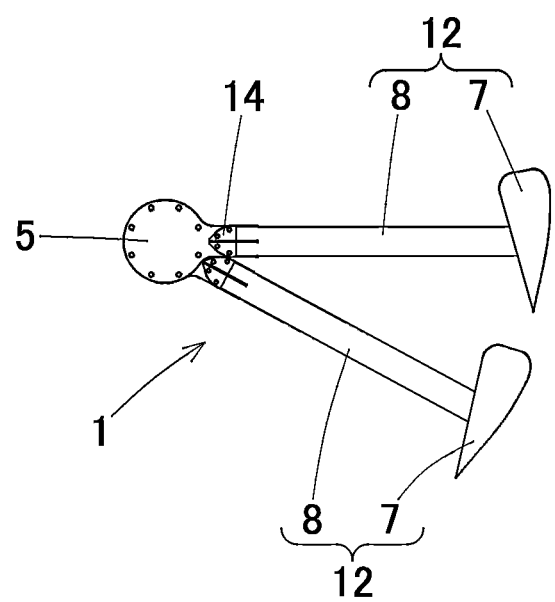
FIG. 26 is a plan view illustrating a folded state of the blade units of the vertical axis wind power generation device.
Figure 27:
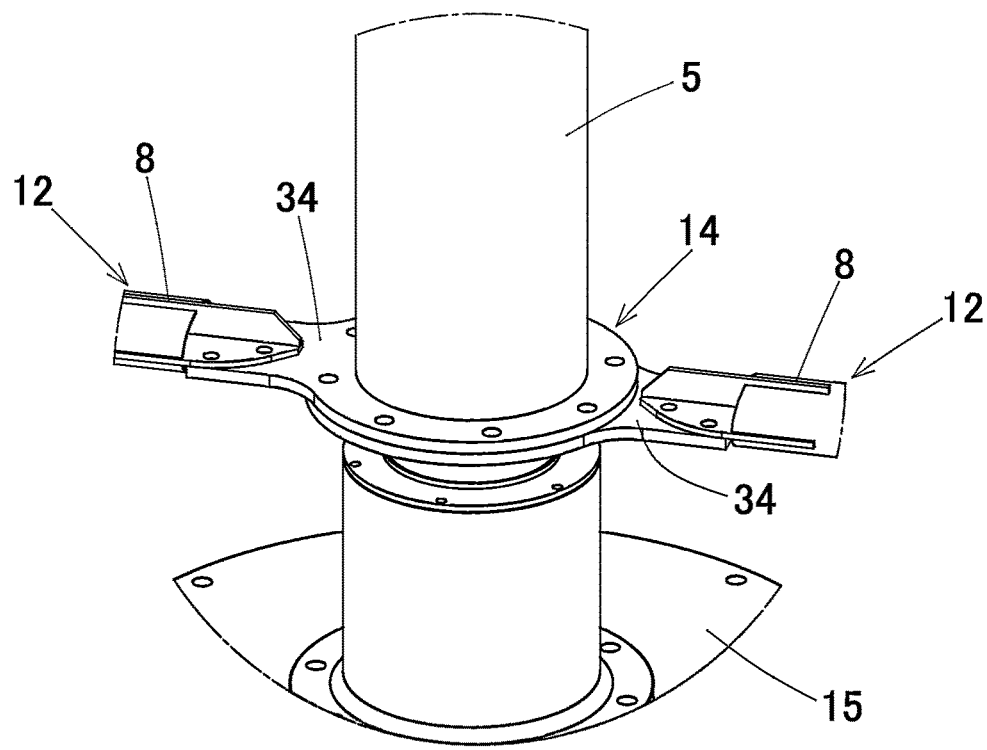
FIG. 27 is a perspective view illustrating an unfolded state of a blade-unit folding mechanism of the vertical axis wind power generation device.
Figure 28:
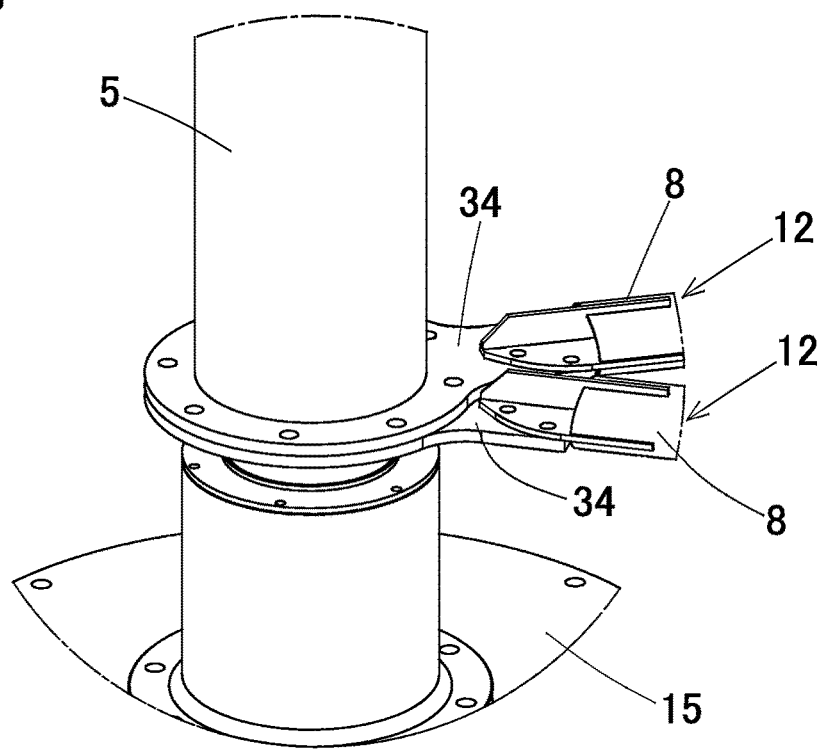
FIG. 28 is a perspective view illustrating a folded state of the blade-unit folding mechanism of the vertical axis wind power generation device.

FIG. 23 to FIG. 28 show the blade-unit folding mechanism 14 and an example of a folded configuration thereof. The blade-unit folding mechanism 14 of this example is a mechanism for folding the blade units 12 each including one blade 7 and the arms 8 in such a manner that the blade units are placed upon each other as shown in FIG. 24 and FIG. 26. Specifically, as shown in FIG. 27, it is constituted by rotary coupling members 34 provided to the respective blade units 12 so as to be rotatable about the main shaft 5 and coupled to base ends of the arms 8. The rotary coupling members 34 of the respective blade units 12 are arranged one above the other and are rotated to have a phase at which the respective rotary coupling members 34 are substantially overlapped with each other as shown in FIG. 28, so that the plurality of blade units 12 are folded so as to be placed upon each other as shown in FIG. 24 and FIG. 26. The rotary coupling member 34 (FIG. 28) of one blade unit 12 of the plurality of blade units 12 may be fixed so as not to rotate about the main shaft 5. In such as case, the fixed rotary coupling member 34 is a mere coupling member.

Figure 7:
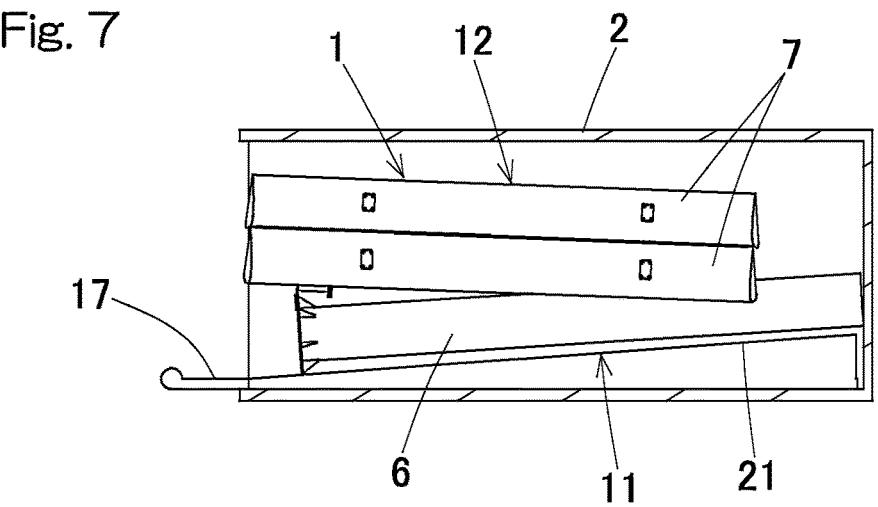
FIG. 7 is a sectional view along line VII-VII of FIG. 6.
Figure 8:
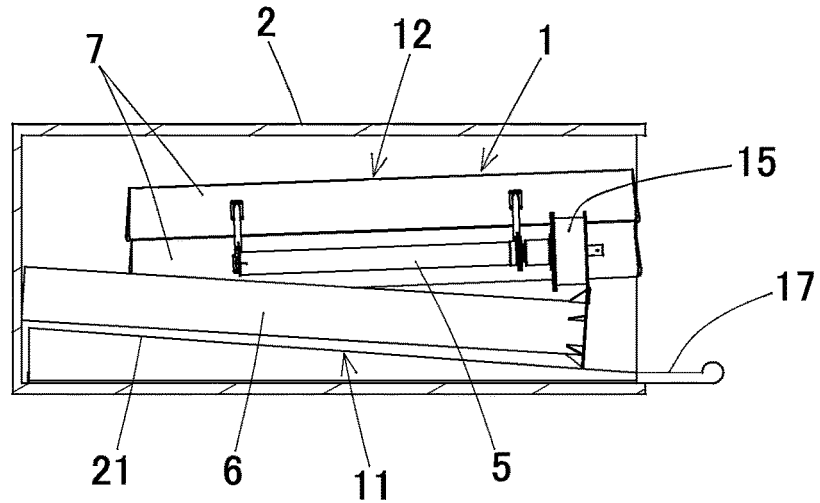
FIG. 8 is a sectional view along line VIII-VIII of FIG. 6.

The following describes a method of using the vertical axis wind power generation device W having the above constitution and the effects thereof. The vertical axis wind power generation device W fixes the support column 6 of the wind turbine 1 to the container 2 to use the container 2 as a foundation as shown in FIG. 1 and performs wind power generation. The container 2 may be fixed to the ground using a fixing part (not illustrated). During transport and storage, the main shaft unit 11 and the blade units 12 of the wind turbine 1 are folded as shown in FIG. 2, FIG. 7 and FIG. 8, and the wind-turbine folded body is placed on the inclining mount 21 and is accommodated in the container 2. Note that FIG. 7 and FIG. 8 show the wind turbine mount 17 in a non-accommodated state in the container 2.

Figure 9:
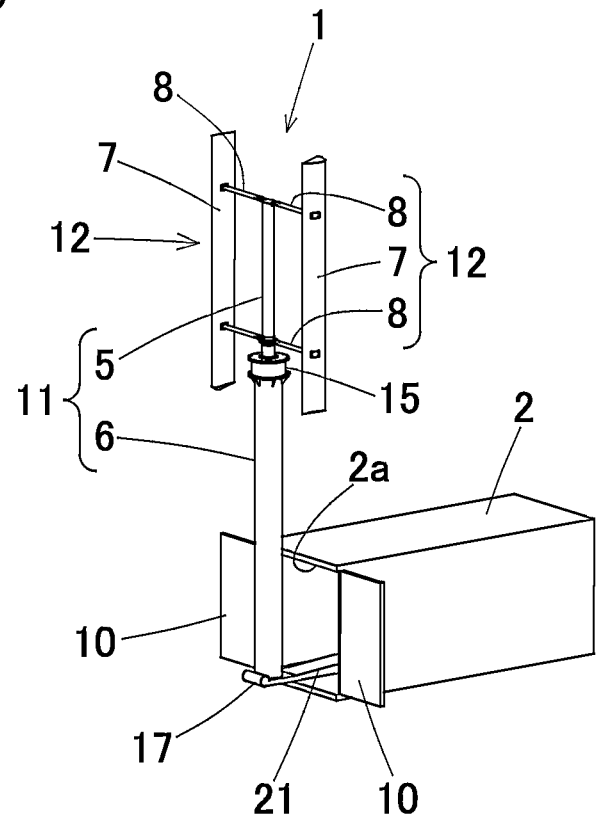
FIG. 9 is a perspective view illustrating the vertical axis wind power generation device before being accommodated in an accommodation process.
Figure 10:
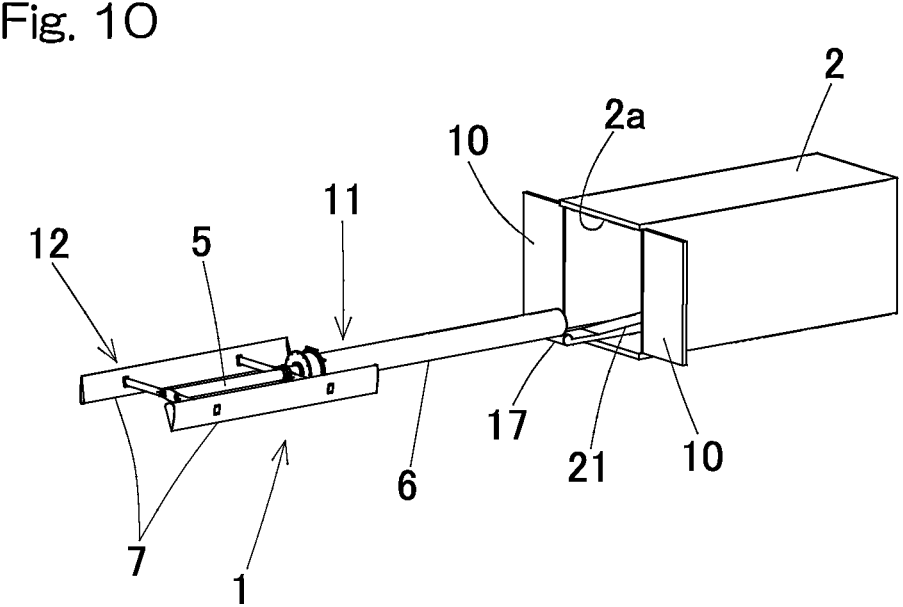
FIG. 10 is a perspective view illustrating a step of laying a support column during the accommodation process of the vertical axis wind power generation device.
Figure 11:
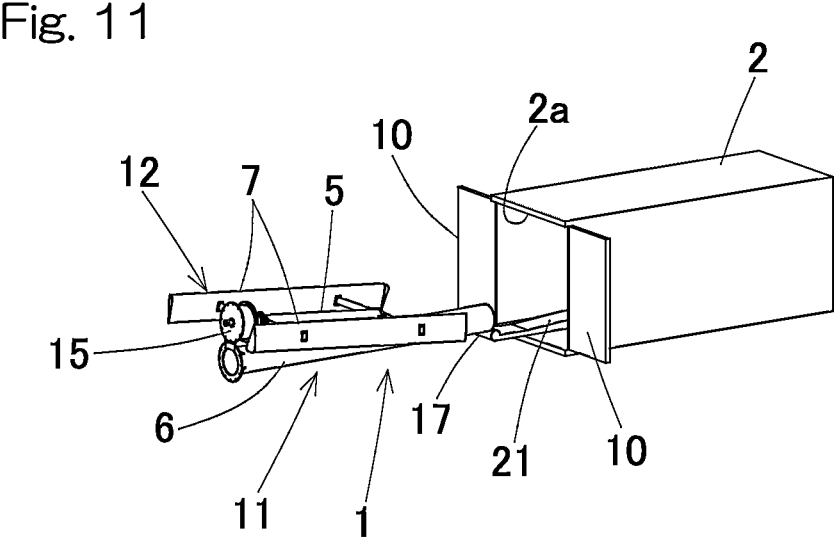
FIG. 11 is a perspective view illustrating a step of folding a main shaft unit during the accommodation process of the vertical axis wind power generation device.
Figure 12:
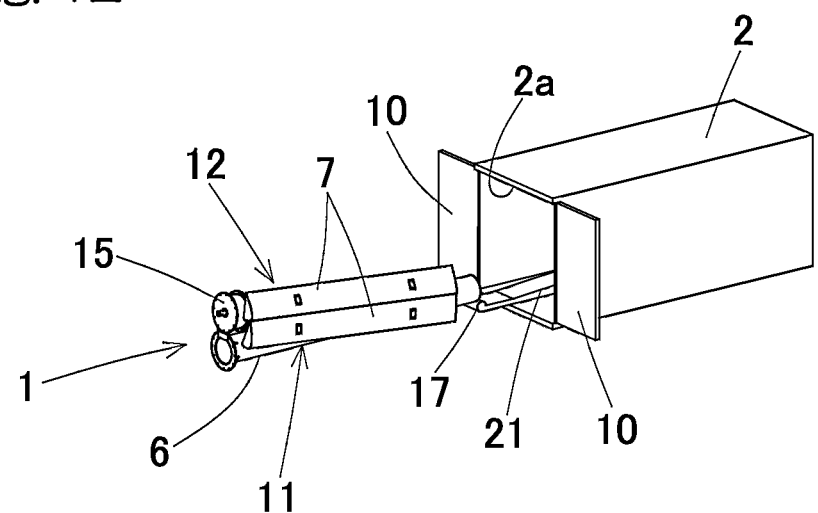
FIG. 12 is a perspective view illustrating a step of folding blade units during the accommodation process of the vertical axis wind power generation device.

FIG. 9 to FIG. 18 show a process of accommodating the vertical axis wind power generation device W into the container 2 from an operating state. FIG. 9 shows the operating state of the vertical axis wind power generation device W. To accommodate the wind turbine 1 in the container 2, the entire wind turbine 1 is laid down as shown in FIG. 10. In this case, the wind turbine 1 is laid down by the support-column tilting mechanism 18 (see FIG. 16 to FIG. 21) of the main-shaft-unit folding mechanism 13. Next, the main shaft unit 11 is folded by the main-shaft tilting coupling mechanism 19 (FIG. 22) such that the support column 6 and the main shaft 5 are placed upon each other as shown in FIG. 11.

Figure 13:
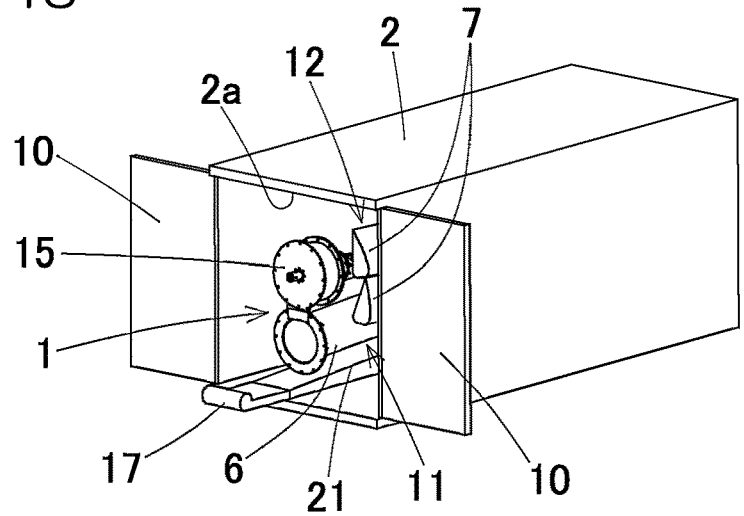
FIG. 13 is a perspective view illustrating a step of accommodating a wind-turbine folded body during the accommodation process of the vertical axis wind power generation device.
Figure 14:
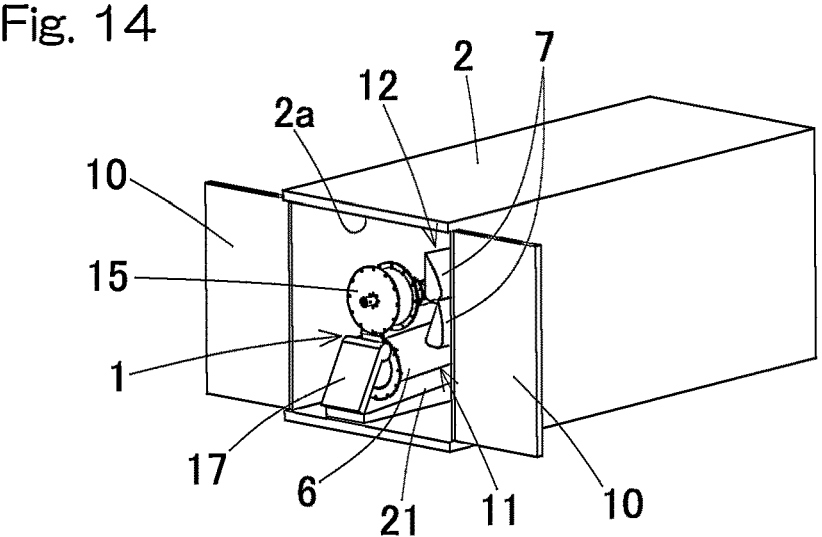
FIG. 14 is a perspective view illustrating a step of raising a wind turbine mount during the accommodation process of the vertical axis wind power generation device.
Figure 15:
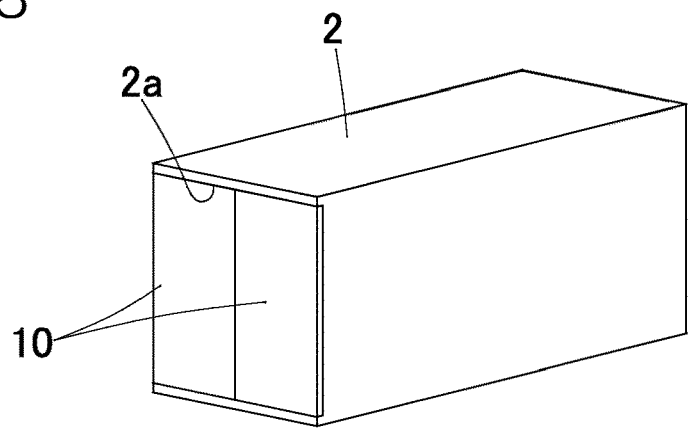
FIG. 15 is a perspective view illustrating a step of closing the door during the accommodation process of the vertical axis wind power generation device.

Then, the blade units 12 are folded by the blade-unit folding mechanism 14 (FIG. 27, FIG. 28) such that the blade units 12 are placed upon each other as shown in FIG. 24. The wind-turbine folded body, which is the thus-folded wind turbine 1, is pushed up on the inclining mount 21 and is accommodated in the container 2 as shown in FIG. 13. In this state, the wind turbine mount 17 coupled to the lower end of the inclining mount 21 protrudes from the opening 2a of the container 2, and the wind turbine mount 17 is raised to be accommodated in the container 2 as shown in FIG. 14. Then, the door 10 of the container 2 is closed to complete the accommodation as shown in FIG. 15. In this way, the wind turbine 1 is accommodated in the folded state in the container 2 when it is transported and stored.

According to the vertical axis wind power generation device W having this constitution, since the wind power generation device is of a vertical axis type, it is possible to efficiently generate electric power even where the device has such a compact size that it can be transported by a single truck and to efficiently generate electric power at low wind speed, unlike that of a horizontal axis type. Further, since the wind power generation device includes the container 2 having a standard dimension for freight transport, and the wind turbine 1 is accommodatable in the folded state in the container 2 together with the power generator 3, it can be treated as a general standard-sized container when transported by ground transport (by trucks or trains), ocean freight and/or air freight and thus is excellent in transportability. For this reason, the power generation device can have a largest possible size within a size restriction for transport, which is advantageous in ensuring power generation capability.

In particular, since both the main shaft unit 11 including the support column 6 and the main shaft 5 and the blade units 12 including the blades 7 and the arms 8 for supporting the blades can be folded, the device has greater transportability because it can be transported in the compactly folded state. Further, the device can be easily installed by being unfolded from the folded state at a destination because it is a foldable type. Since not only the blade units 12, but also the main shaft unit 11 including the support column 6 can be folded, the support column 6 can have a relatively large height so as to securely receive a wind force and thus provide sufficient power generation capability, without causing the problem of transportability.

The main-shaft-unit folding mechanism 13 includes the support-column tilting mechanism 18 which tiltably couples the support column 6 to the wind turbine mount 17, and the support column 6 is tiltable, so that the device can be transported in a more compactly folded state. Further, the main-shaft-unit folding mechanism 13 includes the main-shaft tilting coupling mechanism 19 coupling the main-shaft lower-end supporting member 15 at the upper end of the support column 6 and rotatably supporting the main shaft 5 at the lower end of the main shaft such that the main shaft 5 is tiltable, the main-shaft tilting coupling mechanism being configured to cause the main shaft 5 in a laid state to assume a posture along the support column 6. Thus, the main shaft 5 can be folded so as to assume a posture along the support column 6, so that the device can be transported in a more compactly folded state.

In order to install the wind turbine 1, a support-column fixing part 20 (see FIG. 4, FIG. 5) is provided to fix the support column 6 of the wind turbine 1 to the container 2, so that the wind turbine 1 can be easily set up on the container 2, and the container 2 can be used as a foundation for the wind turbine 1. For these reasons, it is possible to easily transport the wind power generation device, to install it easily and speedily, and to ensure power generation capability even where it has a compact configuration. Thus, it is possible to meet a demand for electric power in non-electrified areas and/or disaster areas affected by hazards.

Further, the container 2 includes the inclining mount 21 inside the container, the inclining mount being inclined so as to be lowered toward the side of the opening 2a at a longitudinal end of the container and configured to receive the folded body of the wind turbine 1 on the inclining mount, so that the folded body of the wind turbine 1 can slide on the inclining mount 21 due to self-weight so as to be moved out of the container 2 at an installation site, which facilitates installation operation at the site. For example, it is possible to manually take out the folded body of the wind turbine 1 from the container 2, without using heavy equipment.

Figure 38:
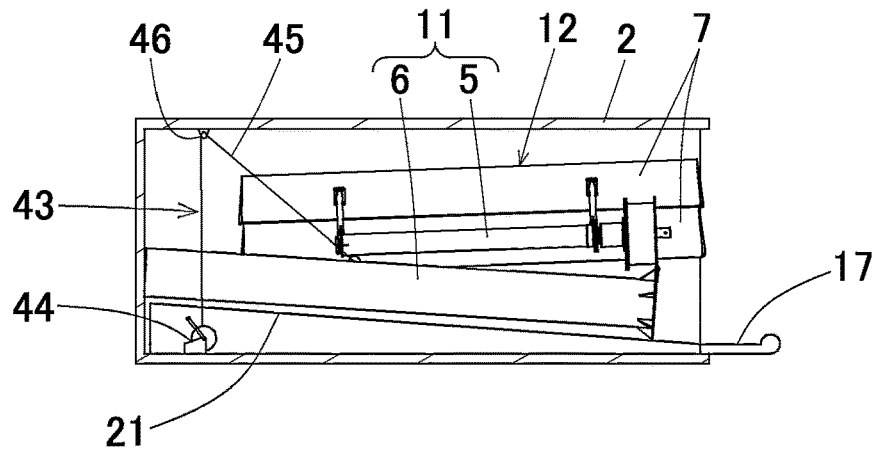
FIG. 38 is a cutaway front view illustrating an accommodated state of an embodiment in which the vertical axis wind power generation device is provided with a withdrawing and unfolding mechanism.

In order to accommodate the folded body of the wind turbine 1 in the container 2, the wind turbine is pushed up on the inclining mount 21 so as to be received in the container. Since factories or storage warehouses of vertical axis wind power generation devices W are generally equipped with heavy machinery or the like, a problem is unlikely to arise in accommodating the devices. Where the vertical axis wind power generation device is set up in a disaster area, however, it is preferable that the wind turbine can be easily taken out from the container by human power at an installation site where the environment is not ready for use of heavy equipment. When the vertical axis wind power generation device W is no longer needed and is removed, the traffic situation in the surrounding area is likely be recovered, and heavy equipment can thus be used easily. Alternatively, it is also possible to manually push up the wind turbine on the inclining mount by using a winch or the like from the state of FIG. 39 to accommodate it in the state of FIG. 38.

Hereinafter, various other embodiments of the present invention will be described. These embodiments have the same features as those of the first embodiment, unless otherwise specifically described.

Figure 29:
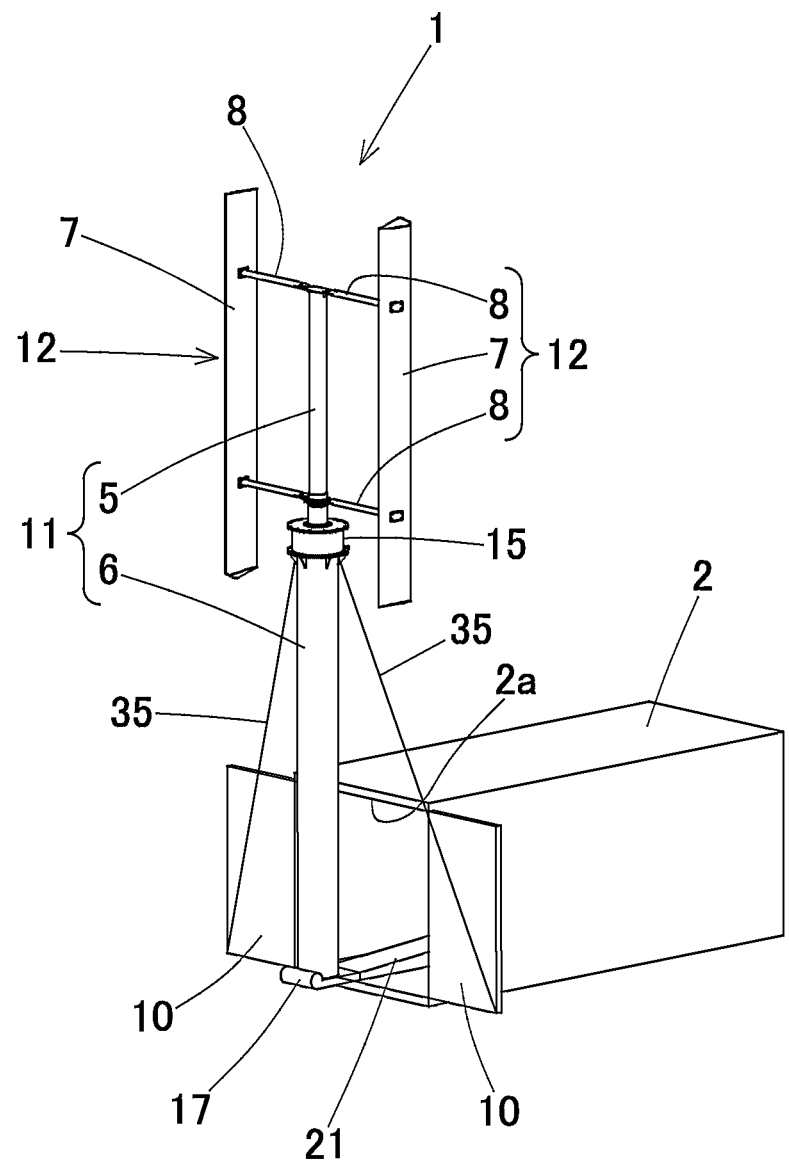
FIG. 29 is a perspective view showing an example in which the door of the vertical axis wind power generation device is used as outriggers.
Figure 30:
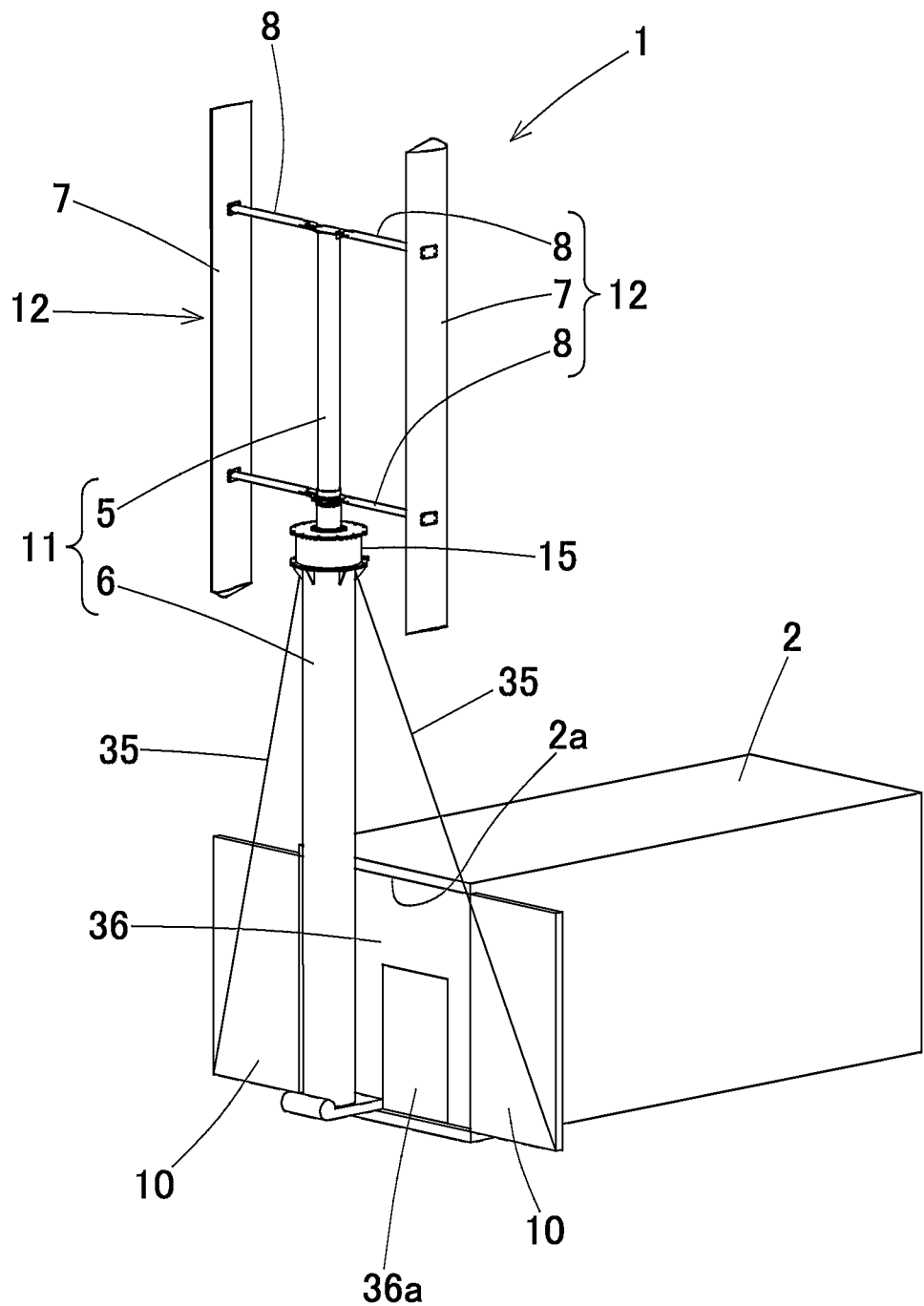
FIG. 30 is a perspective view of the container of the vertical axis wind power generation device, which additionally includes an inner door.
Figure 31:
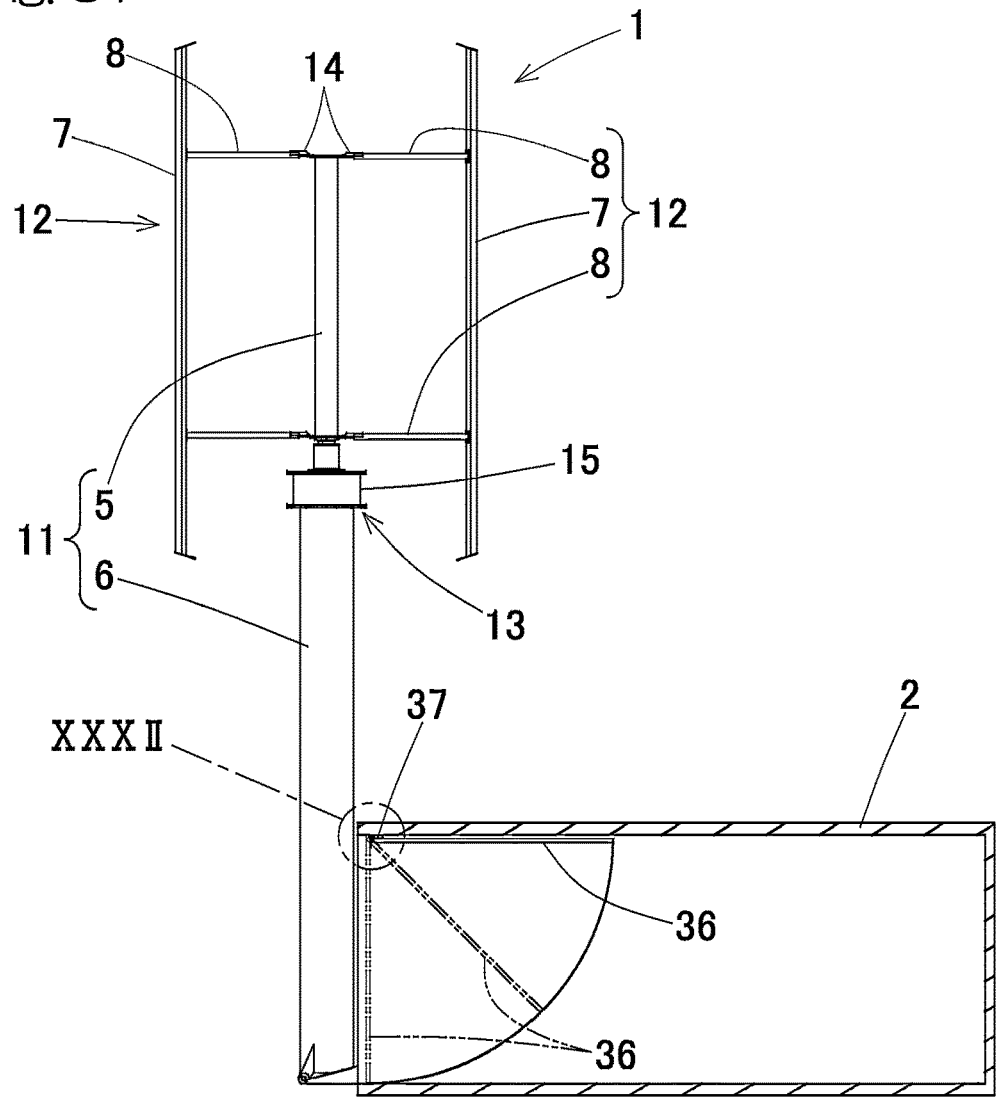
FIG. 31 is a cutaway front view of the container of the vertical axis wind power generation device, which additionally includes the inner door.
Figure 32:
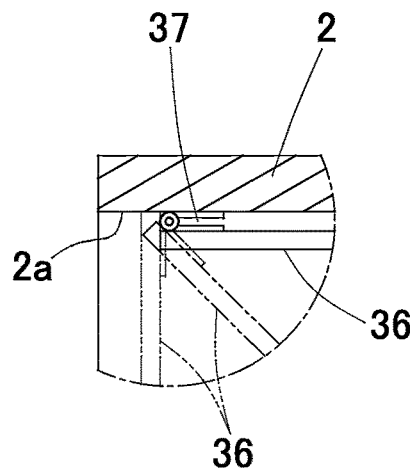
FIG. 32 is an enlarged sectional view of part XXXII of FIG. 31.
Figure 33:
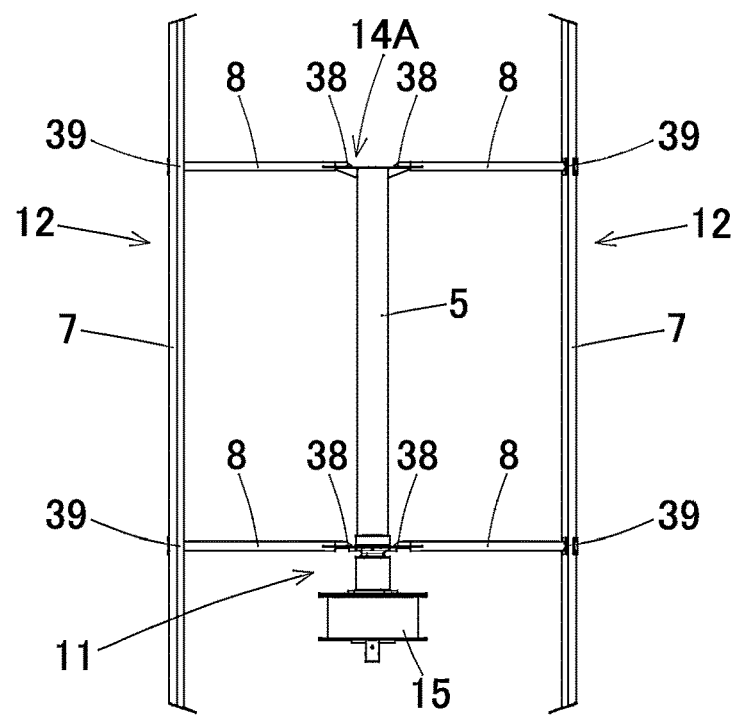
FIG. 33 is a front view showing an example in which a variant of the blade-unit folding mechanism is provided to the blade units.
Figure 34A:
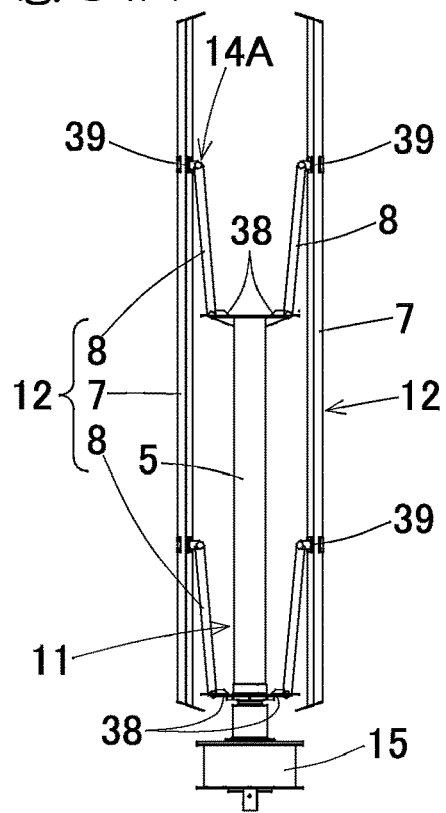
FIG. 34A is a front view showing an example of the folded state of the blade-unit folding mechanism according to the variant.
Figure 34B:
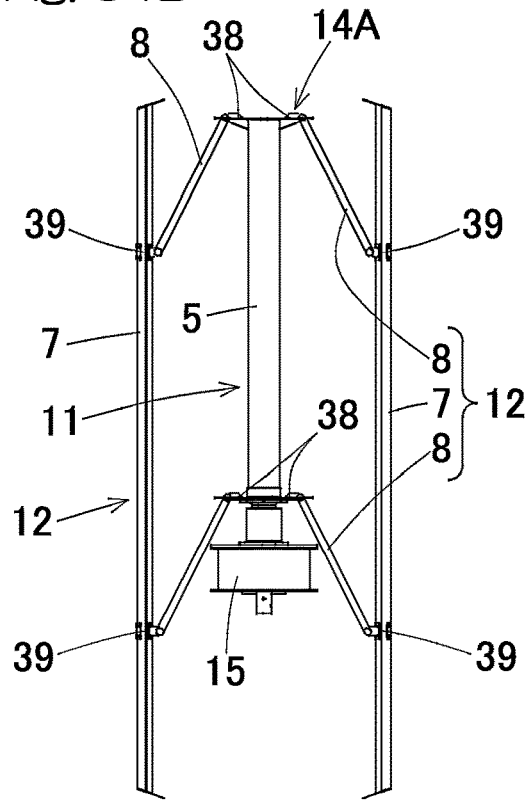
FIG. 34B is a front view showing another example of the folded state of the blade-unit folding mechanism according to the variant.

In the first embodiment, the double door 10 of the container 2 in an opened state may serve as outriggers when the device is set up. Where the door serves as outriggers, an interposition (not illustrated) is interposed between the door 10 and a surface on which the container 2 is placed, or the door 10 is provided with extensible legs (not illustrated), so that the door 10 can support a load when the container 2 is inclined. Since the door 10 of the container 2 serves as outriggers, it is possible to secure stability of the container 2 as well as the wind turbine 1 fixed thereto against e.g. strong wind and/or earthquake, without providing a dedicated outrigger.

Where the door 10 serves as outriggers, there may be reinforcing wires 35 such as wire ropes extended between lower ends of tip ends of the double door 10 and the upper end of support column 6 as shown in e.g. FIG. 29. In this way, the wind turbine 1 is more stably supported.

Where the door 10 serves as outriggers, the container 2 may include an inner door 36 disposed an inner side of the door 10 and configured to prevent entry from an outside as shown in FIG. 30 to FIG. 32. The inner door 36 may have an opening 36a with an openable door. In this example, the inner door 36 is connected to an upper edge of the opening 2a of the container 2 by a hinge 37 such that it can be flipped up to be opened as shown in FIG. 31 and FIG. 32. Where the door 10 (FIG. 30) is used as outriggers, if nothing is provided, the inside of the container 2 would be left open and may be subjected to entry of rain and wind and/or theft. The inner door 36 can prevent such entry and/or theft or the like.

FIG. 33 to FIG. 37 show a variant of the blade-unit folding mechanism 14. The blade-unit folding mechanism 14A of this example includes: arm-base-end bending coupling parts 38 each coupling a base end of one arm 8 of the blade units 12 to the main shaft 5 in a bendable manner; and arm-tip-end bending coupling parts 39 each coupling a tip end of one arm 8 to one blade 7 in a bendable manner. The blades 7 may be configured to be folded upwardly as shown in FIG. 34A or downwardly as shown in FIG. 34B with respect to the main shaft 5.

Figure 35:
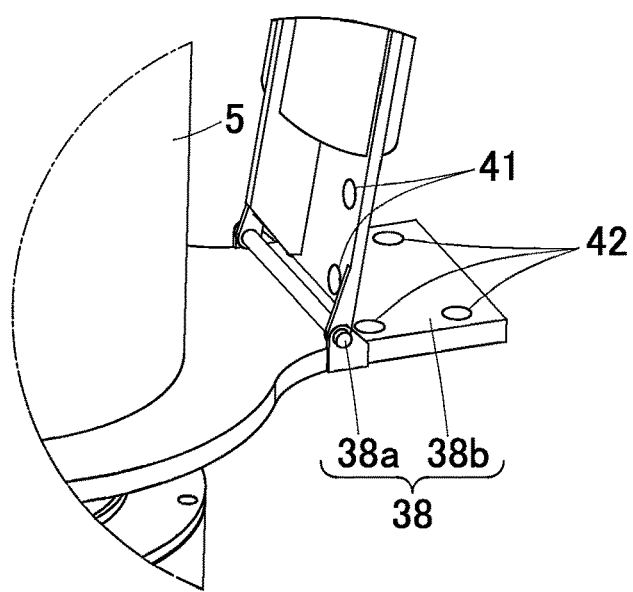
FIG. 35 is a perspective view illustrating a folded state of arm-base-end bending coupling parts of the blade-unit folding mechanism.
Figure 36:
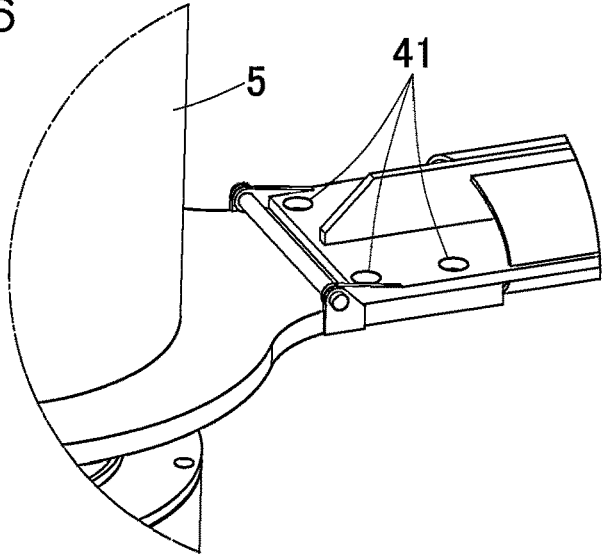
FIG. 36 is a perspective view of the arm-base-end bending coupling parts before being folded.
Figure 37:
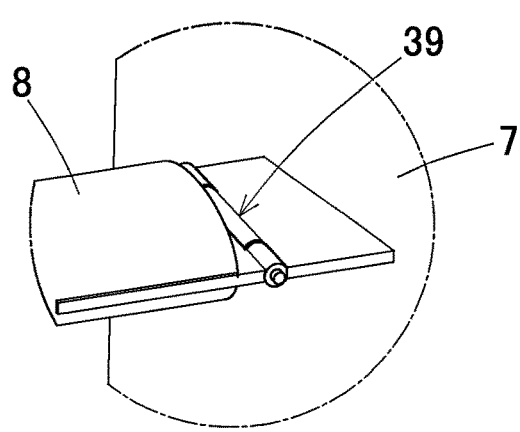
FIG. 37 is a perspective view of an arm-tip-end bending coupling part of the blade-unit folding mechanism before being folded.

As shown in FIG. 35, each arm-base-end bending coupling part 38 is constituted by a hinge 38a and a stopper member 38b configured to be engaged with a base end of one arm 8 coupled to the hinge 38a to regulate an inclination angle of the arm 8 when unfolded. When the arms 8 are unfolded, i.e., when each arm 8 has an angle for use of the wind turbine, the arm 8 and the stopper member 38b are placed one above the other as shown in FIG. 36 and are fixed by nuts and bolts (none of them illustrated) inserted through bolt insertion holes 41, 42 of the arm 8 and the stopper member 38b. FIG. 37 shows an example of the arm-tip-end bending coupling part 39. In this example, the arm-tip-end bending coupling part 39 is constituted by a hinge.

This constitution also makes it possible to compactly fold the blade units 12.

FIG. 38 to FIG. 44 show an example in which, in the first embodiment, the container 2 is provided with a withdrawing and unfolding mechanism 43 configured to withdraw the folded body of the wind turbine 1, which is constituted by the main shaft unit 11 and the blade units 12 in the folded state and is accommodated on the inclining mount 21, by using the inclining mount 21 while unfolding the folded body and to assist operation of setting up the wind turbine.

The withdrawing and unfolding mechanism 43 is constituted by: a winch 44 disposed on a floor surface near an inner end portion with respect to the opening 2a inside the container 2; a rope 45 such as a wire rope wound around the winch 44 and having a tip end connected to an intermediate portion of the support column 6 in a lengthwise direction; and a guide roller 46 disposed above the winch 44 inside the container 2 and holding the rope 45 in a hanging manner.

Figure 39:
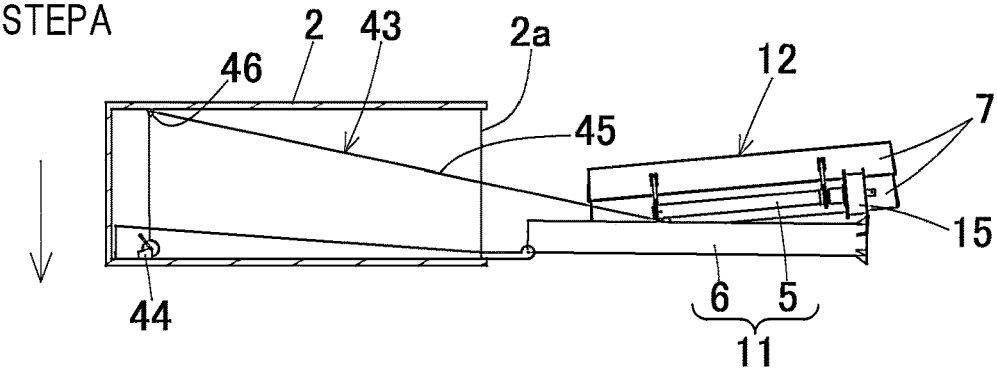
FIG. 39 is a cutaway front view illustrating a step of unfolding the vertical axis wind power generation device.
Figure 39:
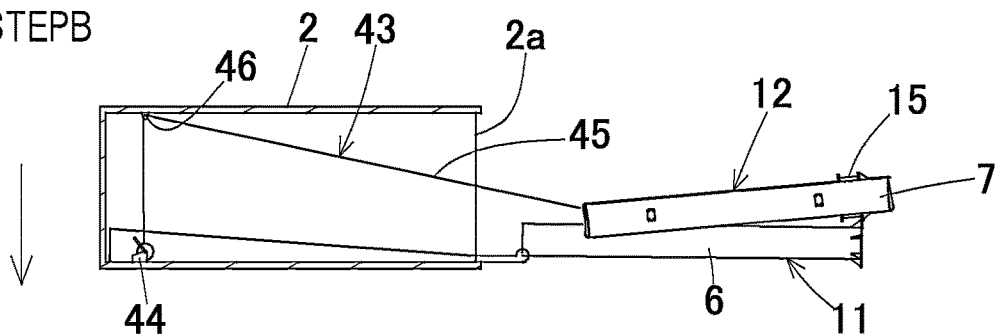
Figure 39:
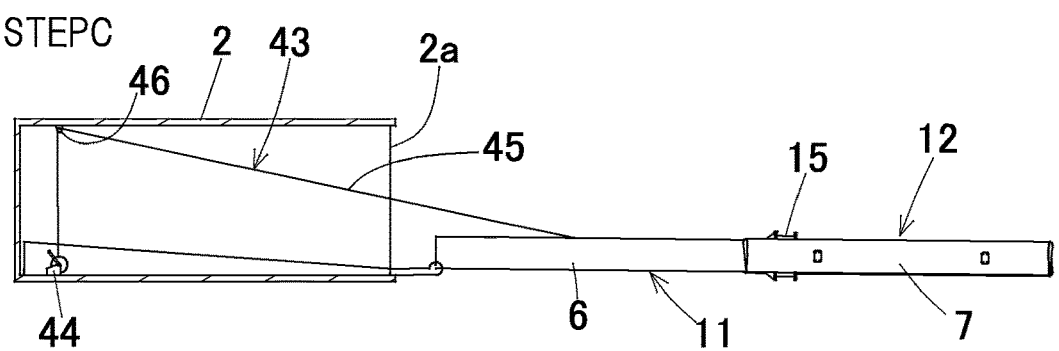

According to this constitution, when the winch 44 is unwound, the folded body of the wind turbine 1 slides down on the inclining mount 17 due to self-weight and moves out from the opening 2a of the container 2 as shown in step A of FIG. 39. In this process, the folded body of the wind turbine 1 can be slowly and safely lowered thanks to the use of the winch 44. In this state, the blade units 12 are unfolded by an operator as shown in step B of FIG. 39, and the main shaft unit 11 is further unfolded such that the support column 6 and the main shaft 5 extend linearly as shown in step C of FIG. 39.

Figure 40A:
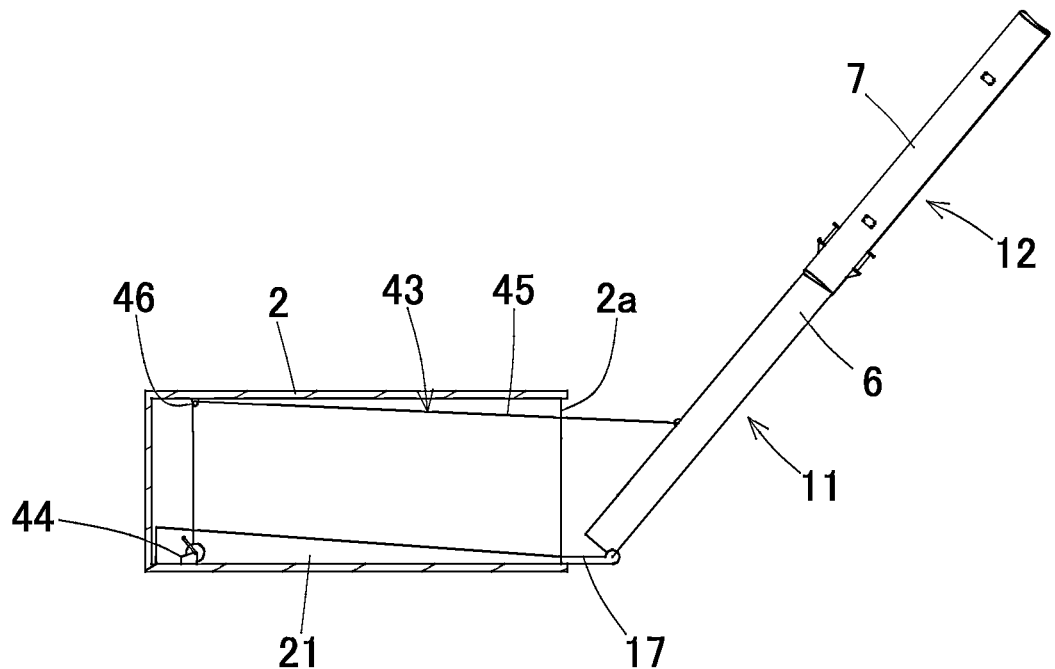
FIG. 40A is a cutaway front view illustrating a step of raising the support column of the vertical axis wind power generation device.
Figure 40B:
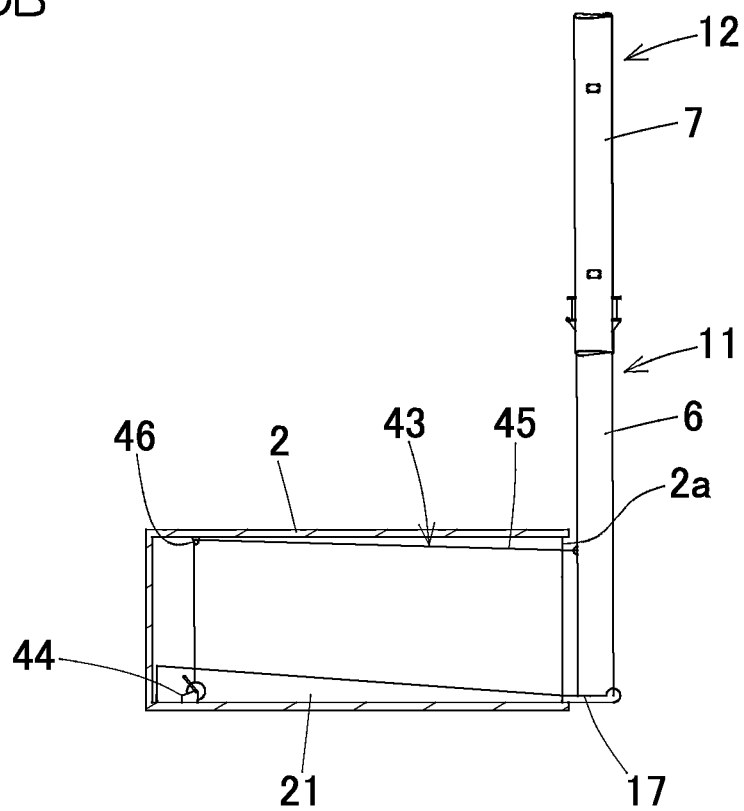
FIG. 40B is a cutaway front view illustrating a completely raised state of the support column.
Figure 41:
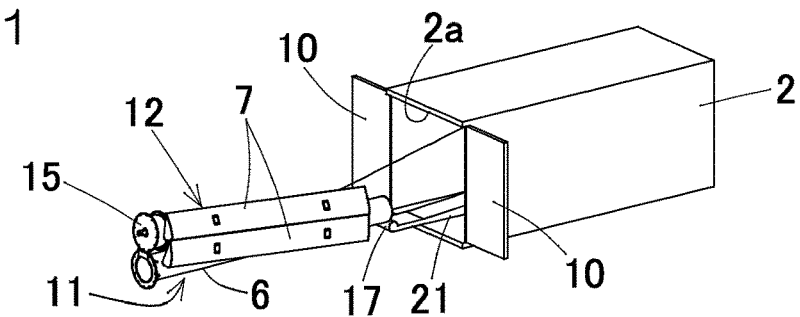
FIG. 41 is a perspective view illustrating a step of withdrawing the wind-turbine folded body of the vertical axis wind power generation device.
Figure 42:
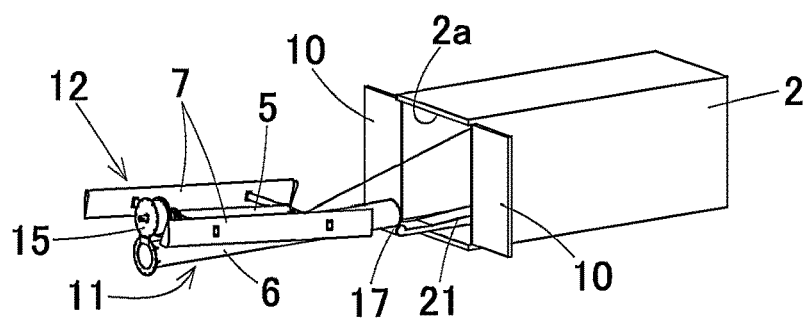
FIG. 42 is a perspective view illustrating a step of unfolding the blade units of the vertical axis wind power generation device.
Figure 43:
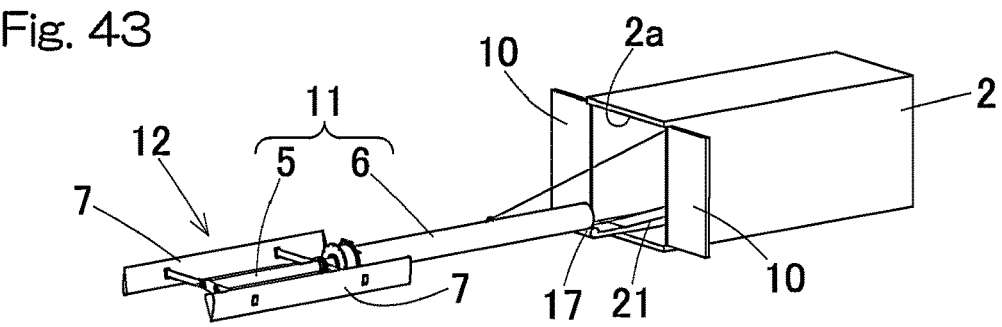
FIG. 43 is a perspective view illustrating a step of unfolding the main shaft unit of the vertical axis wind power generation device.
Figure 44:
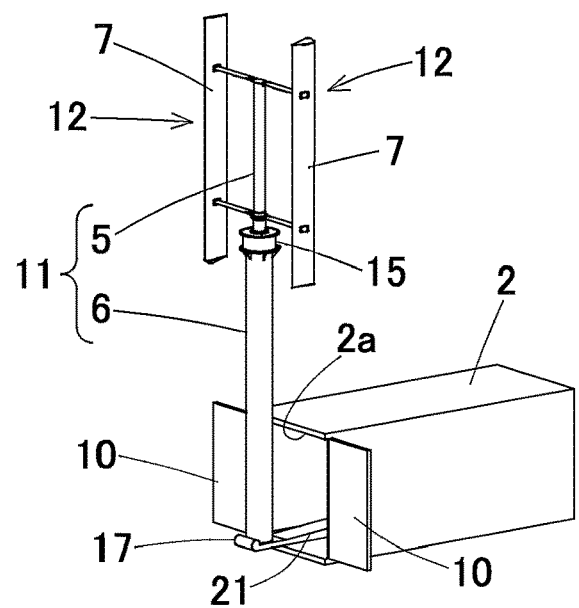
FIG. 44 is a perspective view illustrating a step of raising the main shaft unit of the vertical axis wind power generation device.
Figure 45:
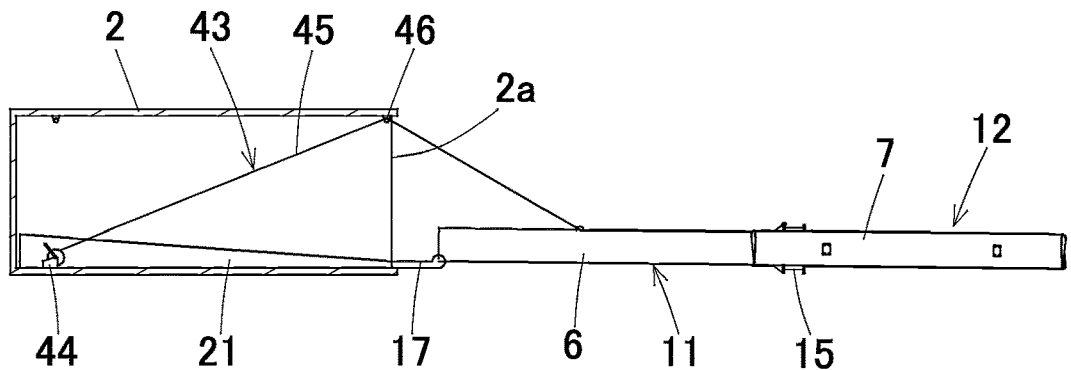
FIG. 45 is a sectional view illustrating a variant of the withdrawing and unfolding mechanism of the vertical axis wind power generation device.

In this state, the wind turbine 1 is gradually raised by winding the winch 44 as shown in FIG. 40A, and the support column 6 is fixed to the container 2 by the support-column fixing part 20 (see FIG. 4, FIG. 5) when the wind turbine is completely raised as shown in FIG. 40B. FIG. 41 to FIG. 44 show the above process in perspective views. Note that the guide roller 46 in the container 2 may be disposed at the opening 2*a* of the container 2 as shown in FIG. 45.

Provision of such a withdrawing and unfolding mechanism 43 can further facilitate and expedite installation operation of the vertical axis wind power generation device W at an installation site.

Figure 46:
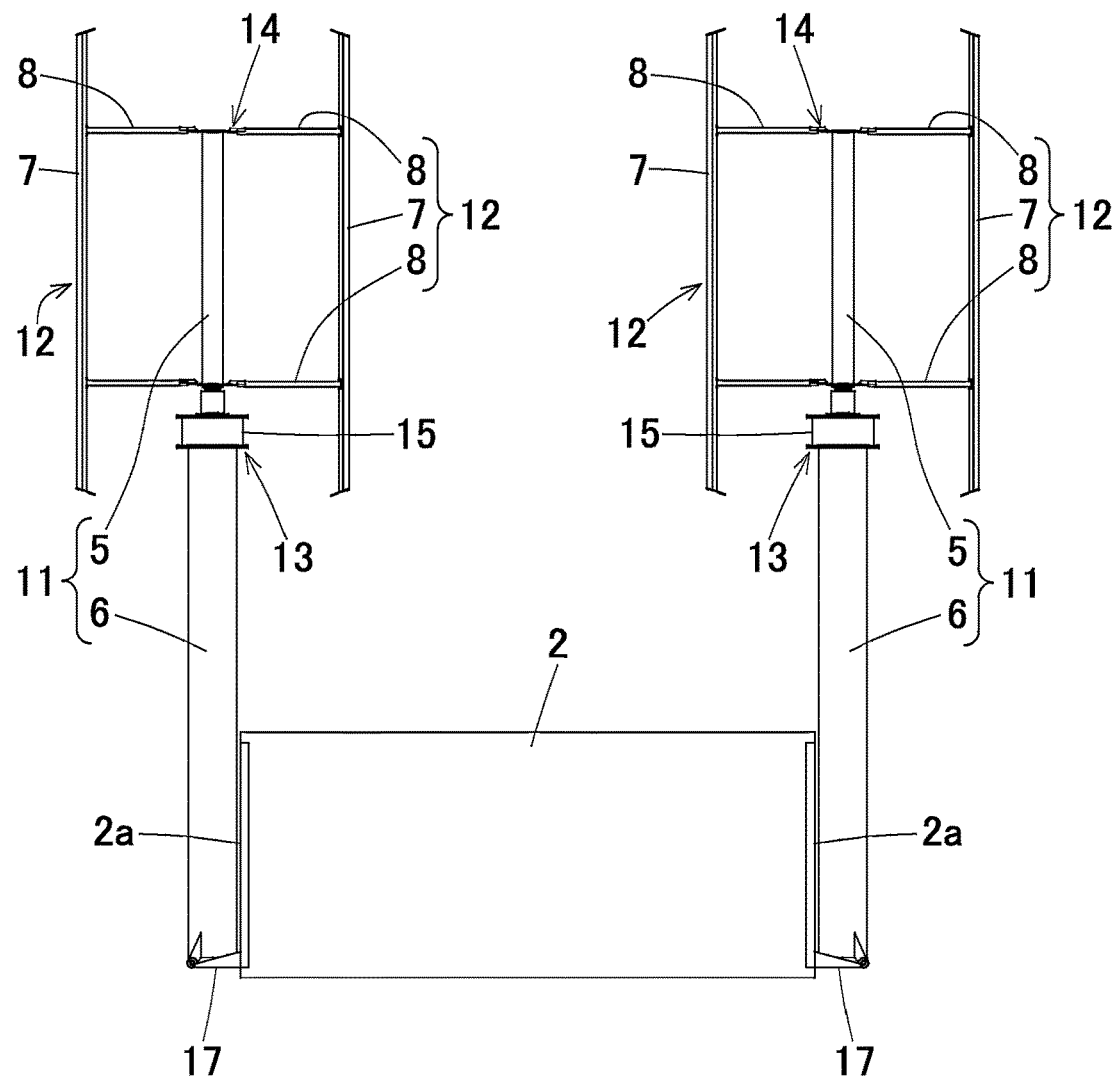
FIG. 46 is a front view of yet another embodiment of the vertical axis wind power generation device.
Figure 47:
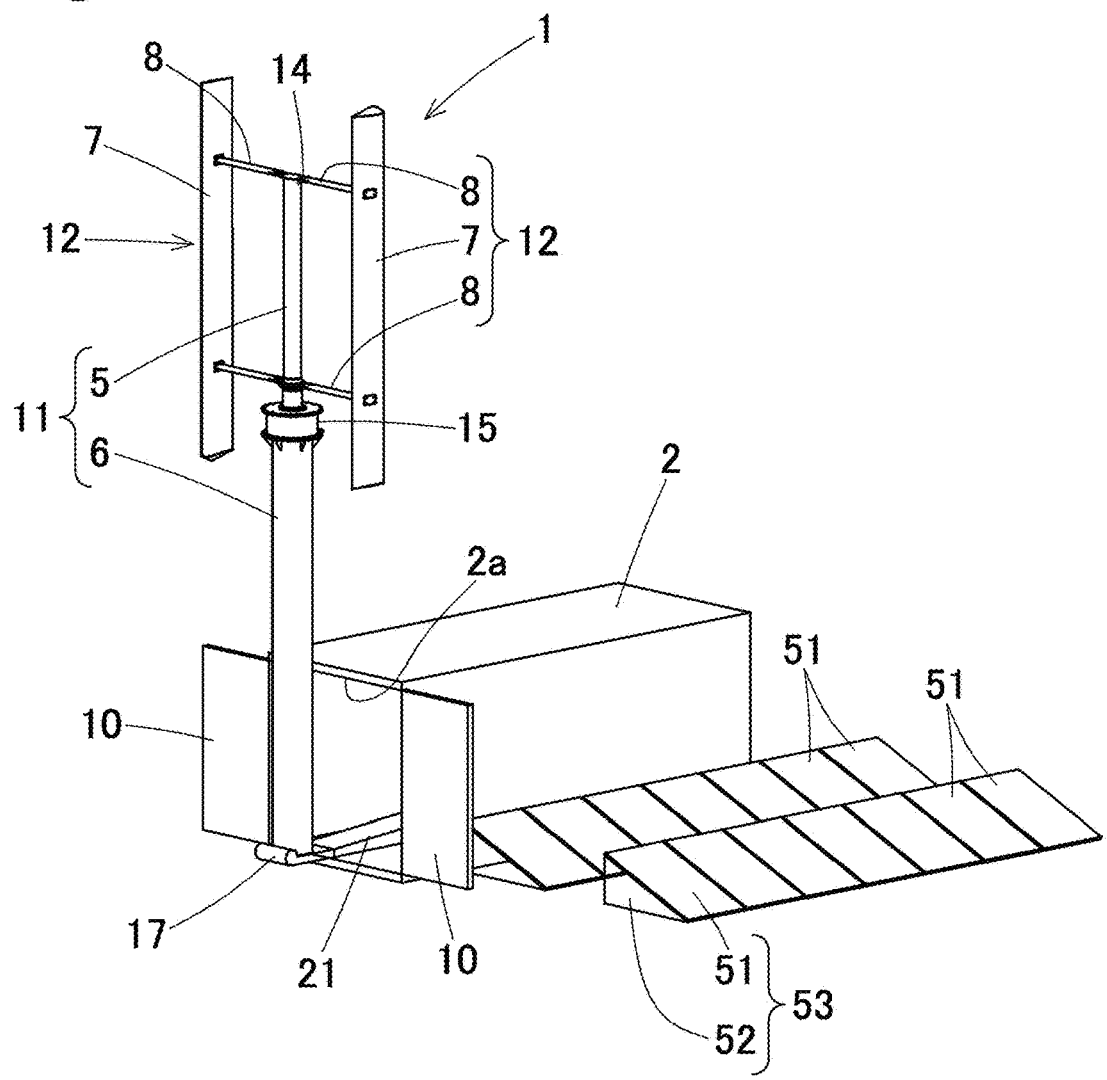
FIG. 47 is a perspective view of an embodiment of the vertical axis wind power generation device in which solar panels are provided.

FIG. 46 shows an example in which two wind turbines 1 are fixed at opposite ends of the container 2 in the longitudinal direction. Both of the two wind turbines 1 can be folded and accommodated in the container 2 as in the case of the first embodiment. In this case, the container 2 is provided with openings 2*a* at the opposite ends, and inclining mounts 21 of FIG. 1 are arranged in opposite directions to each other and juxtaposed in a widthwise direction inside the container 2. Thus, it is possible to accommodate the two wind turbines 1 in the folded state in the container 2 and to unfold and fix them to the container 2.

Figure 48:
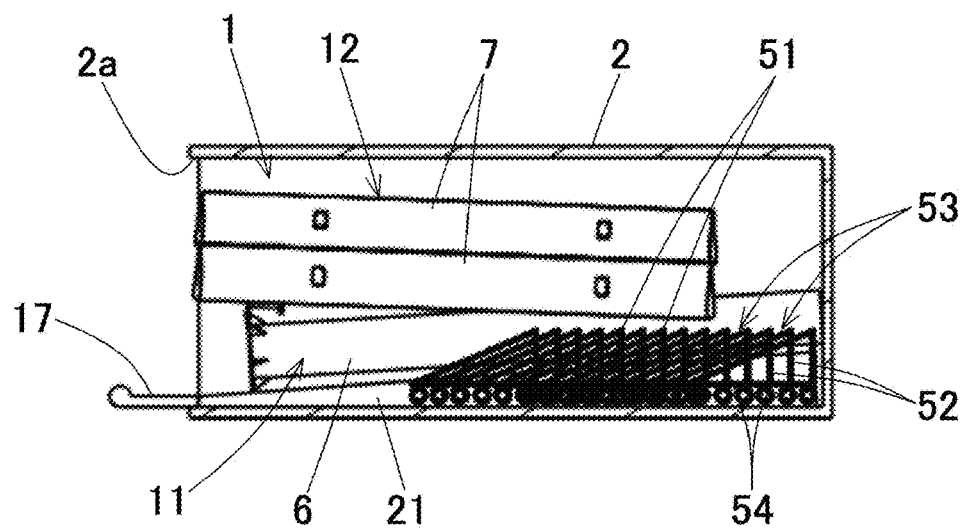
FIG. 48 is a sectional view illustrating an accommodated state of the vertical axis wind power generation device.
Figure 49:
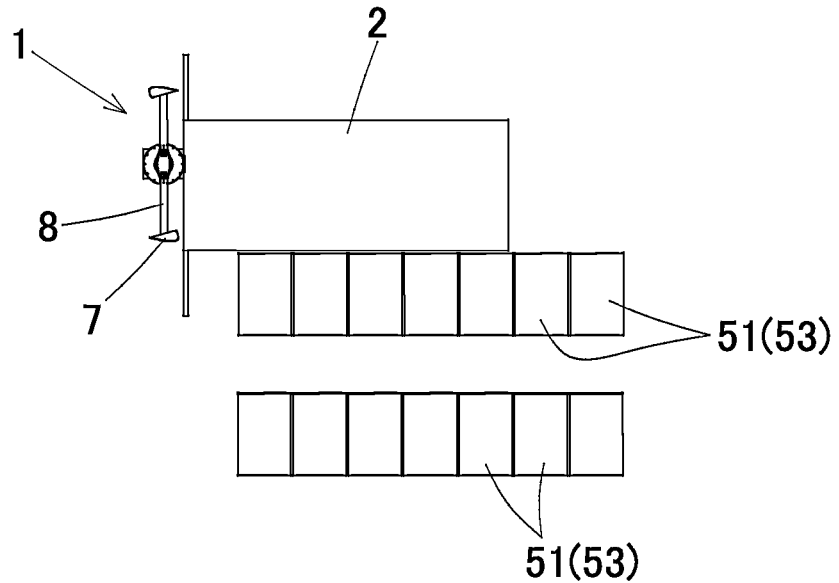
FIG. 49 is a plan view illustrating the use state of the vertical axis wind power generation device.
Figure 50:
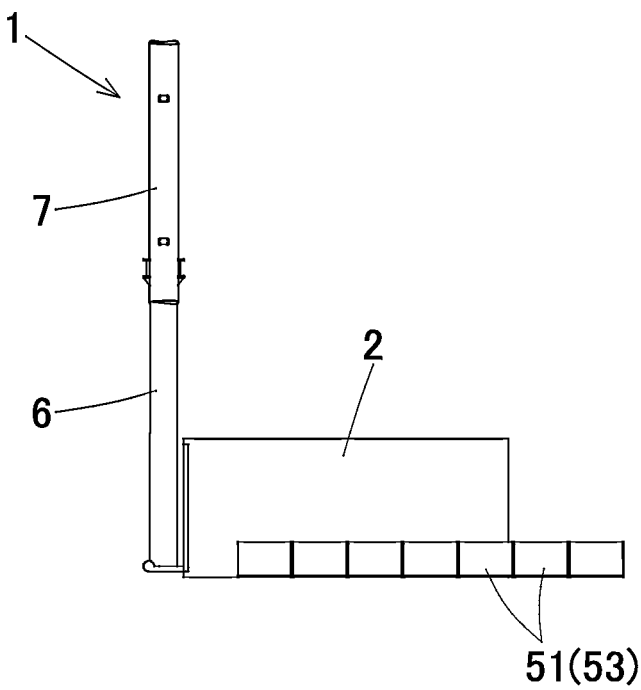
FIG. 50 is a front view illustrating the use state of the vertical axis wind power generation device.
Figure 51:
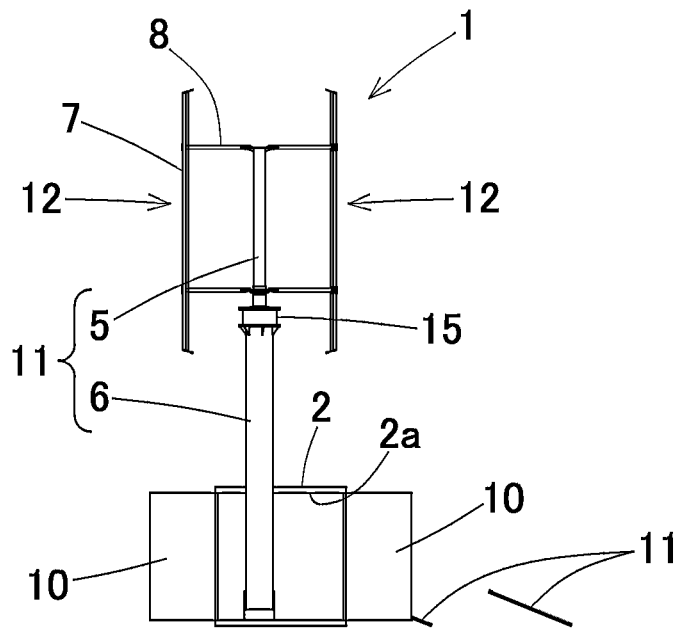
FIG. 51 is a left-side view illustrating the use state of the vertical axis wind power generation device.
Figure 52:
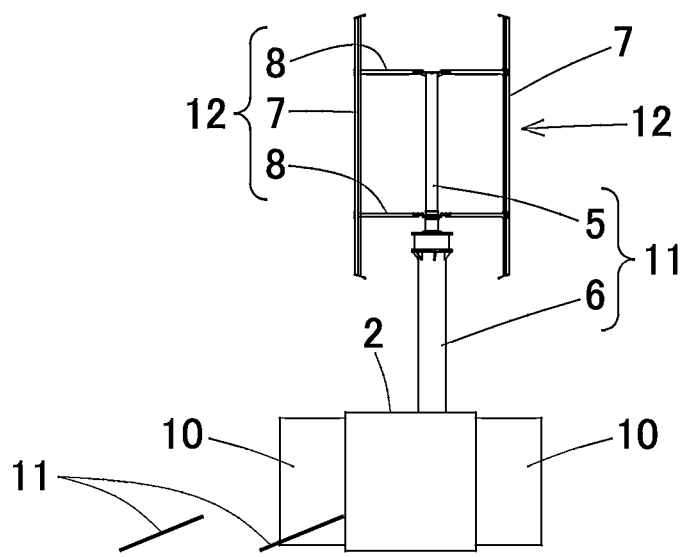
FIG. 52 is a right-side view illustrating the use state of the vertical axis wind power generation device.
Figure 53:
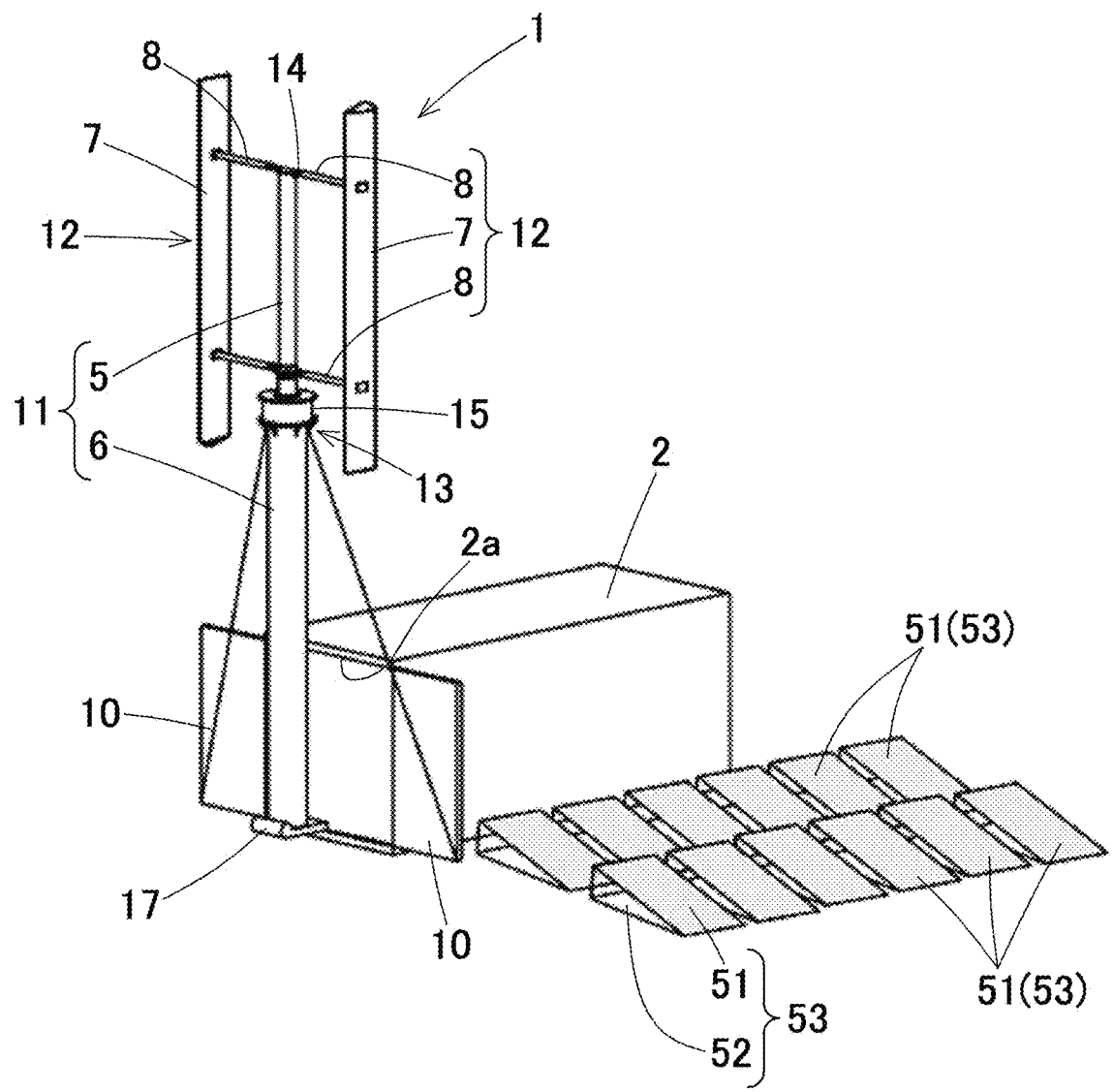
FIG. 53 is a perspective view of still another embodiment of the vertical axis wind power generation device in which solar panels are provided.
Figure 54:
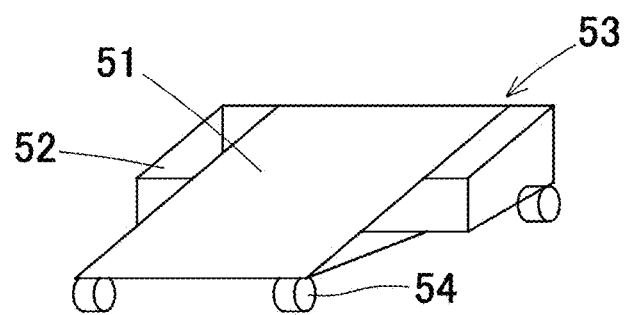
FIG. 54 is a perspective view showing an example of a stand-equipped solar panel used in the vertical axis wind power generation device.
Figure 55:
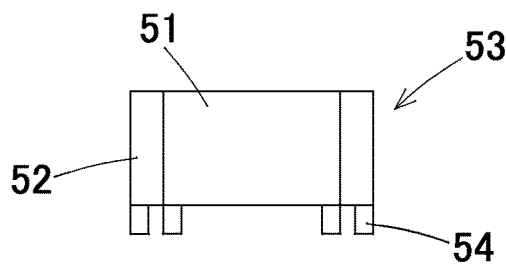
FIG. 55 is a plan view showing another example of the stand-equipped solar panel.
Figure 56:
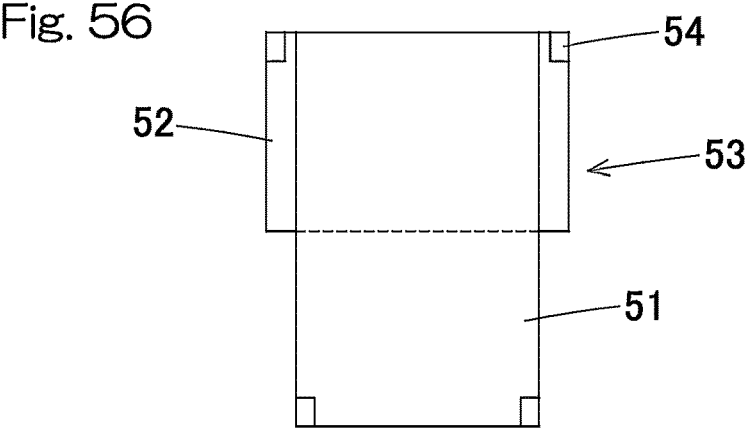
FIG. 56 is a plan view showing yet another example of the stand-equipped solar panel.

FIG. 47 to FIG. 52 show an example in which solar panels 51 are added to the first embodiment. Each solar panel 51 includes a plurality of photovoltaic cells (not illustrated) arranged in a panel-like manner. Each solar panel 51 is disposed on a stand 52 in an inclined manner so as to receive a greater amount of sunlight, and one stand-equipped solar panel 53 is constituted by one solar panel 51 and one stand 52. The stand-equipped solar panel 53 may include a caster 54 (FIG. 48). Stand-equipped solar panels 53 are accommodated in the container 2 together with the folded wind turbine 1.

Each of the stands 52 of the stand-equipped solar panels 53 is shaped such that the solar panels 51 of the respective stand-equipped solar panels 53 can be sequentially stacked on one another in a slightly shifted manner so as to be nested as shown in FIG. 48. The plurality of stand-equipped solar panels 53 are accommodated in the stacked manner in a vacant space lateral to the inclining mount 21 in the container 2. In the case where a larger number of the solar panels 51 are desired to be accommodated without increasing the size of the container 2, the wind turbine 1 is constituted more compactly than that of the first embodiment. In this embodiment, the control panel 50 (FIG. 1) in the container 2 is additionally provided with a solar charger configured to charge the secondary battery 4 with electric power generated by the respective solar panels 51.

Figure 64:
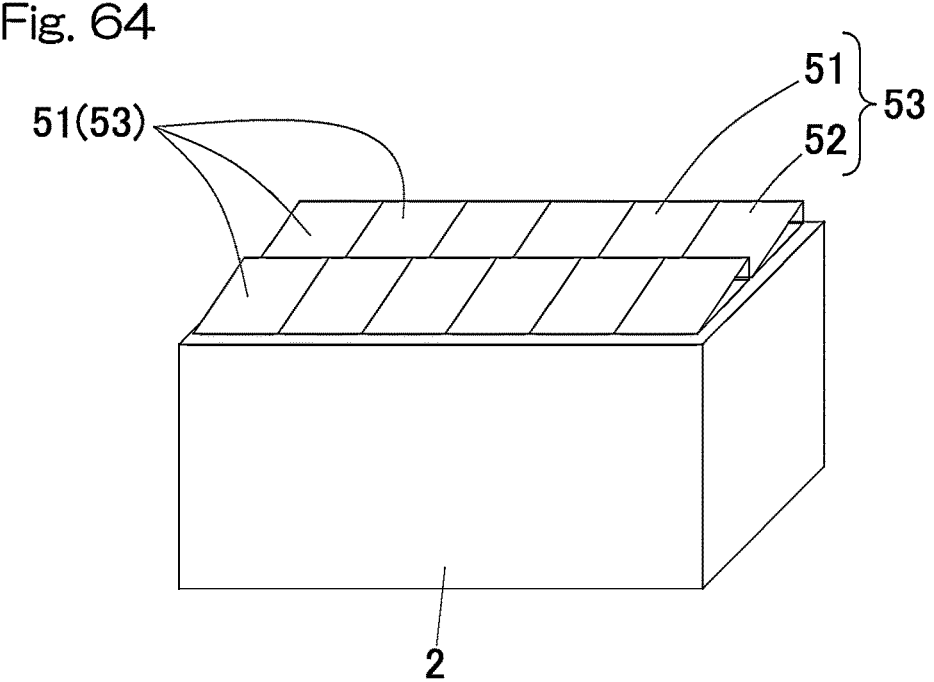
FIG. 64 is a perspective view showing an example in which the stand-equipped solar panels are disposed on the container.

In the case of this constitution, the respective stand-equipped solar panels 53 are arranged in a juxtaposed manner on the ground around the container 2 at an installation site of the vertical axis wind power generation device W as shown in FIG. 47 and FIG. 49 to FIG. 52. The stand-equipped solar panels 53 may be arranged in a juxtaposed manner on a ceiling plate of the container 2 as shown in FIG. 64.

Where the solar panels 51 are additionally used in this way, it is possible to generate electric power also by sunlight during the duration of sunshine and thus to ensure power generation capability even under windless condition or the like. Since the respective stand-equipped solar panels 53 are separately disposed from the container 2, there is no need to worry about the direction of an installation site of the container 2.

Figure 57:
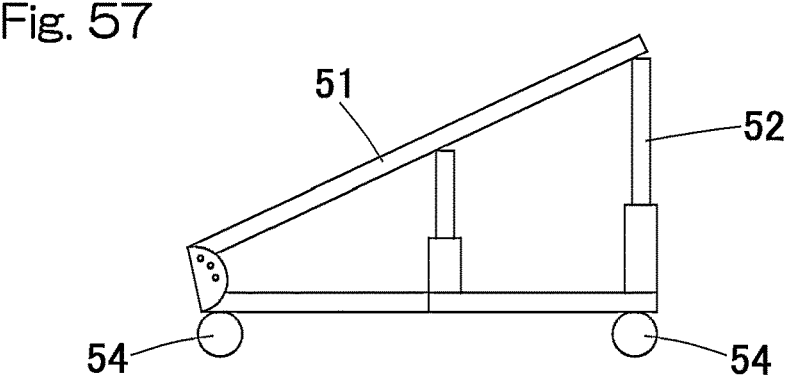
FIG. 57 is a front view showing still another example of the stand-equipped solar panel.
Figure 58:
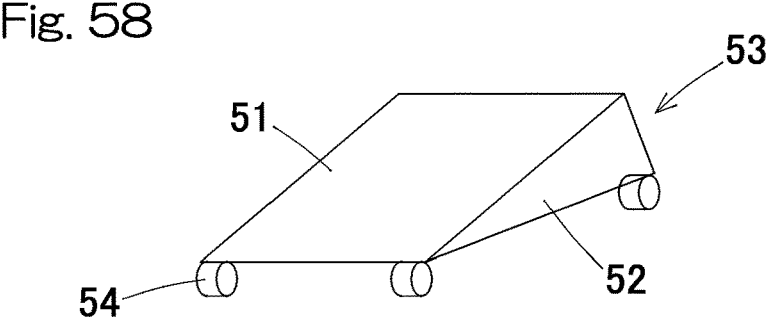
FIG. 58 is a perspective view showing yet another example of the stand-equipped solar panel.
Figure 59:
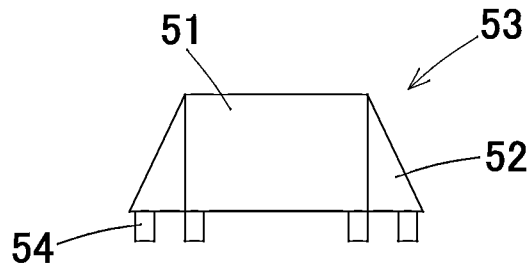
FIG. 59 is a side view showing still another example of the stand-equipped solar panel.
Figure 60:
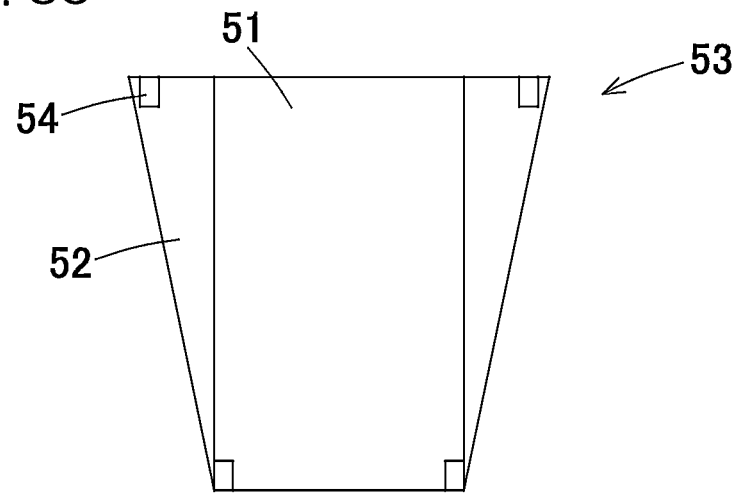
FIG. 60 is a plan view showing yet another example of the stand-equipped solar panel.
Figure 61:
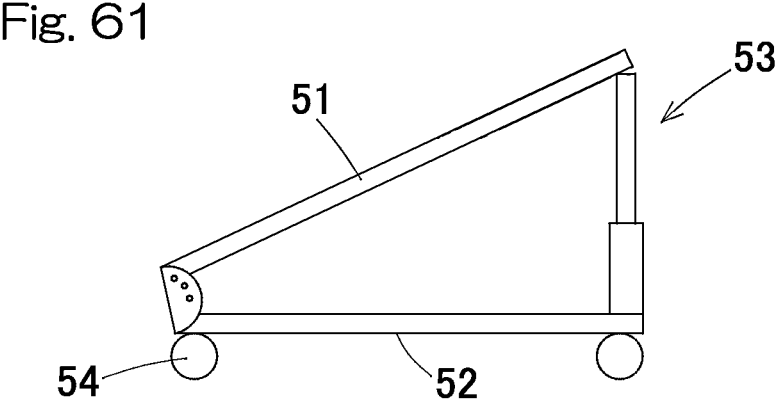
FIG. 61 is a front view showing still another example of the stand-equipped solar panel.
Figure 62:
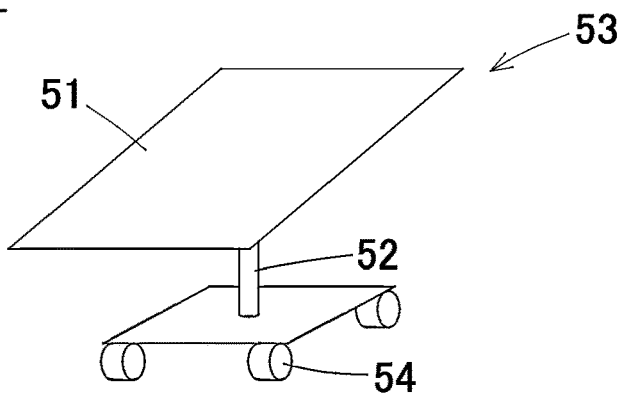
FIG. 62 is a perspective view showing yet another example of the stand-equipped solar panel.
Figure 63:
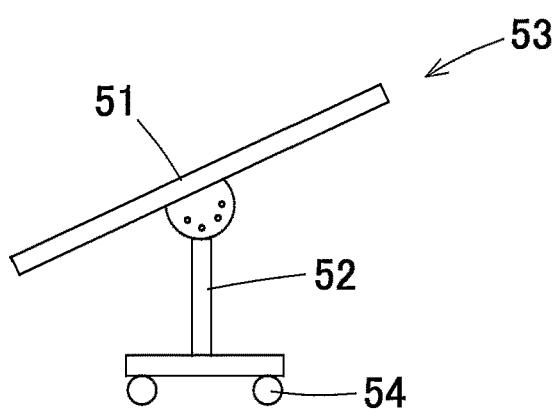
FIG. 63 is a front view showing still another example of the stand-equipped solar panel.

FIG. 54 to FIG. 63 show various examples of the stand-equipped solar panel 53. In the examples of FIG. 57 and FIG. 61, the stand 52 includes an extensible leg portion 52*a*, so that the inclination angle of the solar panel 51 can be adjusted.

FIG. 65 to FIG. 70 show still another embodiment of the present invention. The embodiment shown in these figures has the same features as those of the first embodiment, unless otherwise specifically described.

Figure 65:
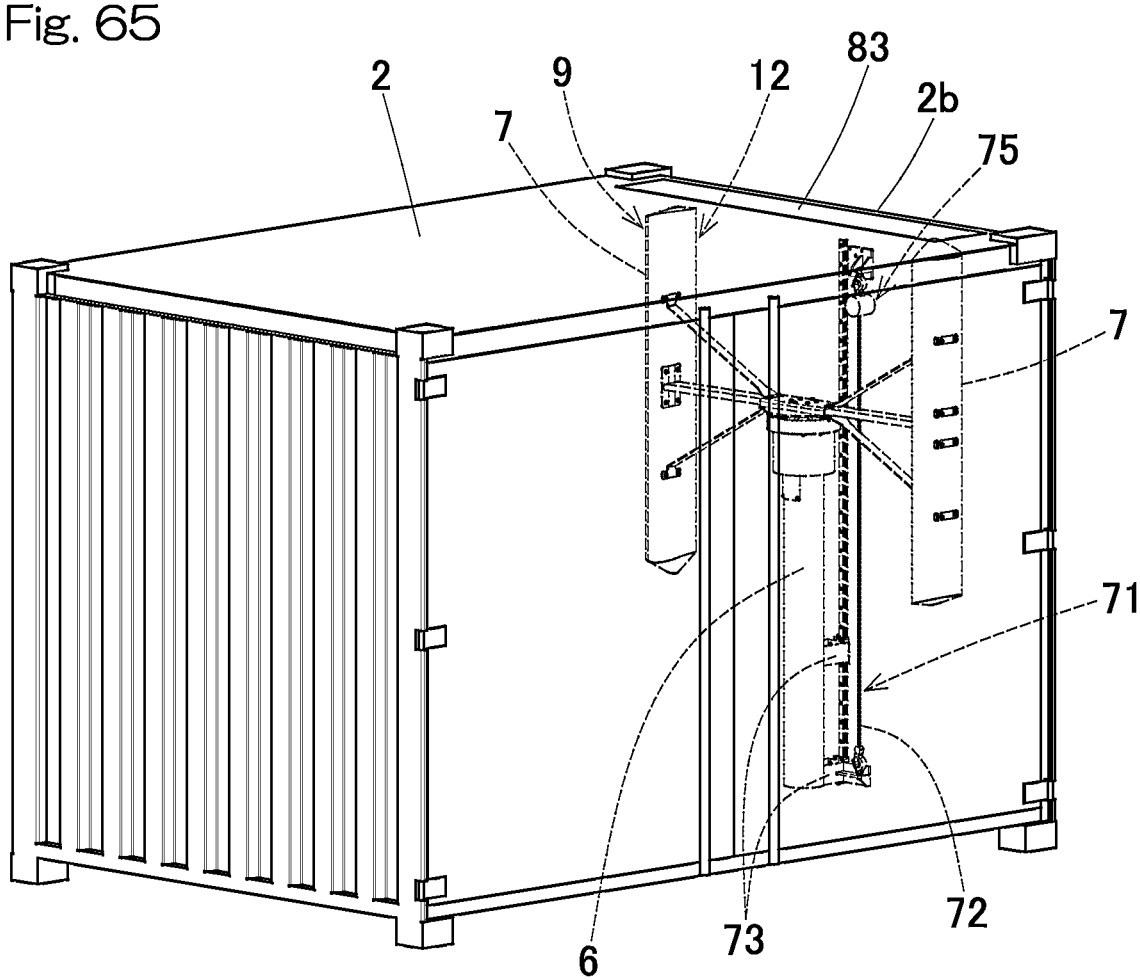
FIG. 65 is a perspective view illustrating an accommodated state of a wind turbine of a vertical axis wind power generation device according to yet another embodiment of the present invention.
Figure 66:
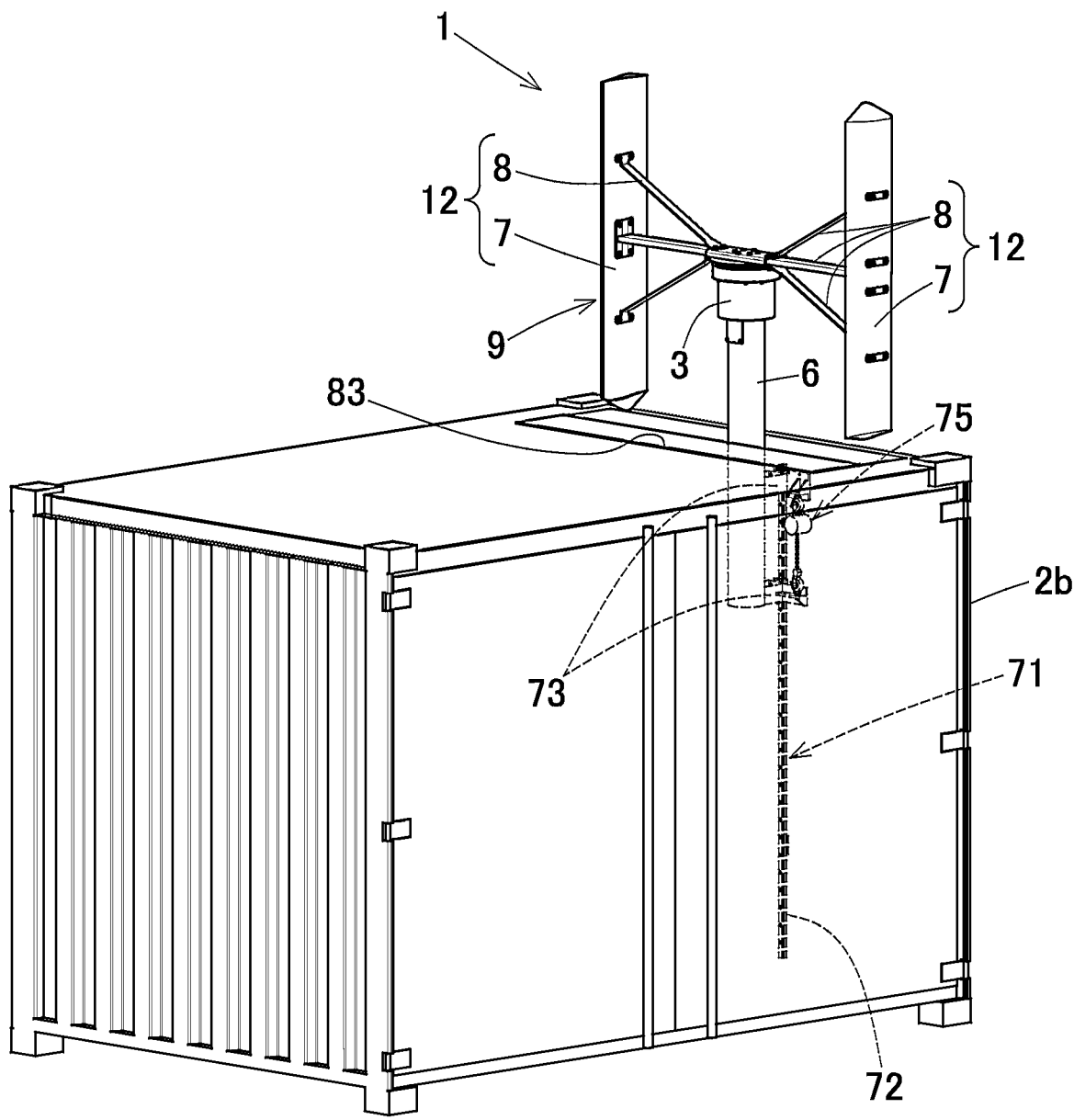
FIG. 66 is a perspective view illustrating a use state of the wind turbine of the vertical axis wind power generation device.

In the present embodiment, the container 2 is provided with a linear guiding device 71 configured to liftably guide the wind turbine 1 between a use position (a position as shown in FIG. 65) in which the blades 7 project upward from a height range of the container 2 and an accommodation position (a position as shown in FIG. 66) in which the blades 7 are accommodated within the height range of the container 2. Further, a lifting device 75 configured to lift and lower the wind turbine 1 is provided. The container 2 is a standard-sized container which can be transported by ground transport or air freight in order to transport a system for supplying electric power in disaster areas affected by hazards. A 12-feet container is assumed to be used in the present invention.

The linear guiding device 71 is constituted by a linear guide of a rolling type (also referred to as a linear rolling bearing) or the like and is attached to an inner surface of a wall 2*b* of one end of the container 2. The linear guiding device 71 is constituted by a fixed rail 72 attached to the wall 2*b* of the container 2 along the vertical direction and a plurality of upper and lower movable members 73 assembled to the fixed rail so as to be linearly movable in the vertical direction, and the movable members 73 are attached to the lower portion of the support column 6 of the wind turbine 1.

Figure 67A:
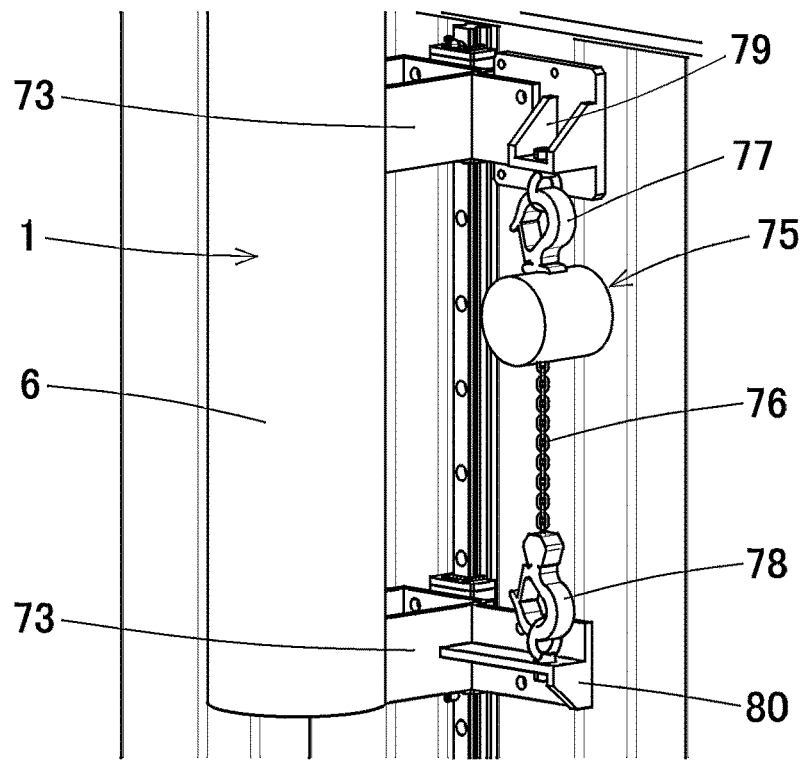
FIG. 67A is a perspective view illustrating a lifting device of the vertical axis wind power generation device.

The lifting device 75 is a lifting winder (e.g., a winch) capable of winding a winding member 76 connected to an upper portion of the container 2 and the lower portion of the support column 6 to lift and lower the wind turbine 1 as shown in FIG. 67A. The winding member 76 may be, for example, a rope, a belt, or a chain which is provided with hooks 77, 78 at its upper and lower ends. The upper hook 77 is engaged with a receiving metal fitting 79 provided to the upper portion of the container 2, and the lower hook 78 is engaged with a receiving metal fitting 80 provided to the lower end of the support column 6.

Figure 67B:
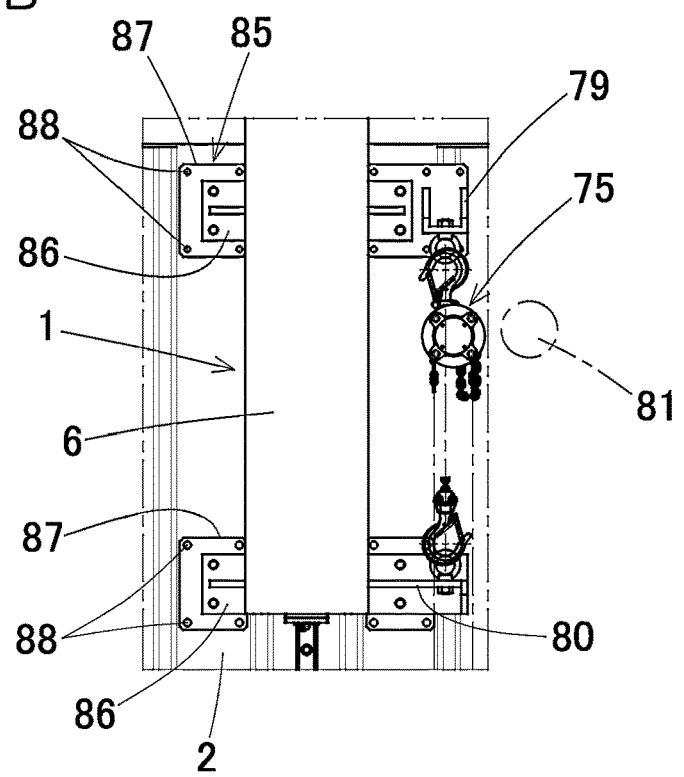
FIG. 67B is a perspective view illustrating a support-column fixing part of the vertical axis wind power generation device.
Figure 68:
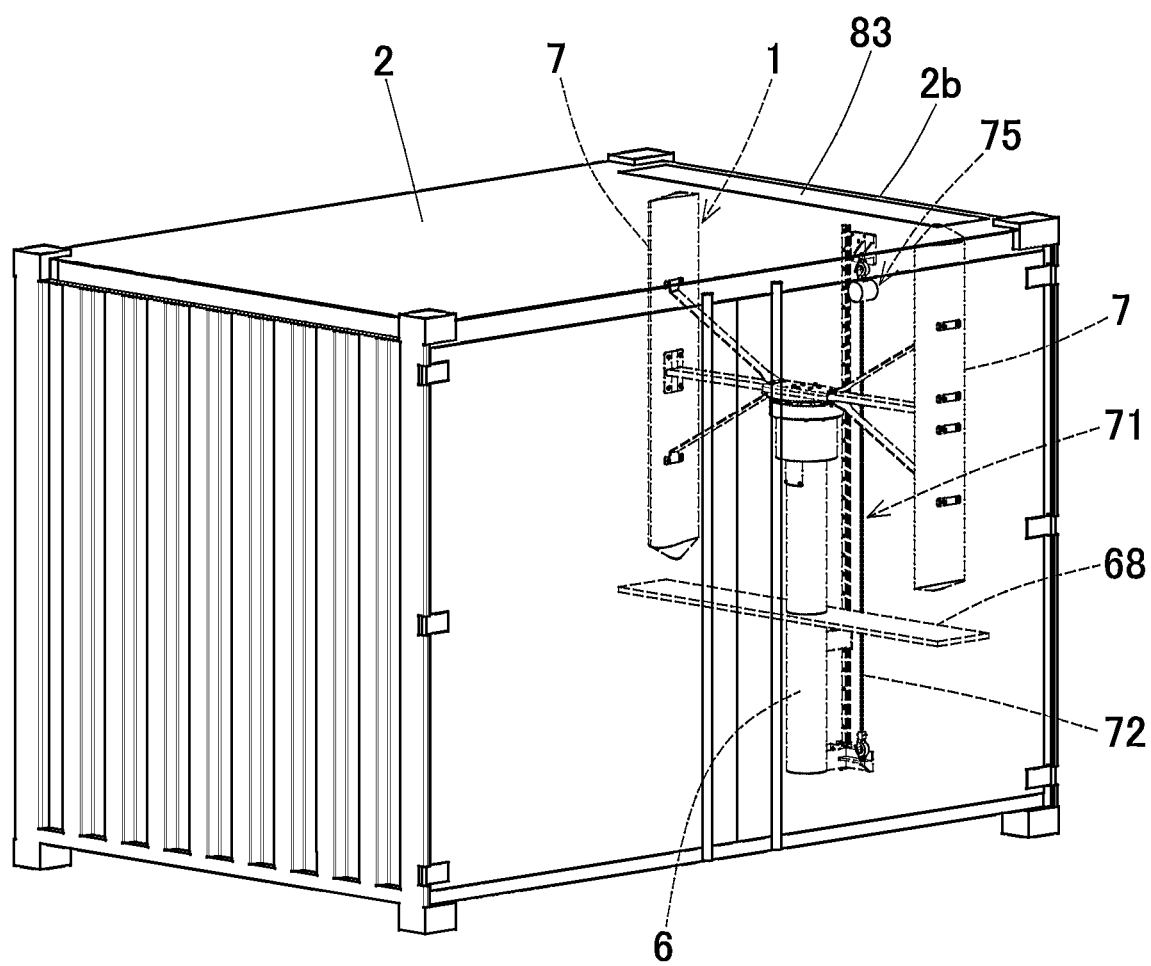
FIG. 68 is a perspective view illustrating an accommodated state of a wind turbine of a vertical axis wind power generation device according to still another embodiment of the present invention.

The lifting device 75 is of a manual winding type in which a drum around which the winding member 76 is wound is rotated by a handle or the like (not illustrated). The lifting device 75 may be of a motorized type in which the drum is rotated by an electric motor 81 (see FIG. 67B). Although the lifting device 75 of FIG. 67B is of a manual winding type, an electric motor 81 is also illustrated by an imaginary line.

The container 2 has a ceiling 2*c* formed with an upper opening 83 for moving the wind turbine 1 in and out therethrough. A door (not illustrated) is provided to the upper opening 83 such that it can be opened and closed as needed. The door can be closed when the wind turbine 1 is accommodated in the container 2 and be opened when the wind turbine 1 is unfolded to the use position. The upper opening 83 is shaped in a rectangular shape matching an end face of the container 2 and is sized to define a minimum opening area such that the rotary blade 9 constituted by the two blades 7 of the wind turbine 1 can be moved in and out only when the rotary blade has a rotation phase in which it matches the end face of the container 2.

According to this constitution, in the container 2, the support column 6 of the wind turbine 1 is attached to the linear guiding device 71 vertically disposed on the wall 2*b* inside the container 2. When the wind turbine 1 is unfolded, the wind turbine 1 can be easily moved up on the container 2 by manually winding the winding member 76 connecting the hook 77 engaged with the upper portion of the container 2 and the hook 78 engaged with the lower portion of the support column 6 of the wind turbine 1 by the lifting device 75. The ceiling 2c of the container 2 has the upper opening 83 which can be closed when the wind turbine 1 is accommodated and be opened when the wind turbine 1 is unfolded as needed in a doorlike manner. An inner lid 84 (FIG. 68) may be provided to protect the inside of the container 2 against the wind and rain even when the wind turbine 1 is unfolded. The inner lid 84 may be attached to the support column 6 of the wind turbine 1. Thus, the inner lid 84 is closed from the inside at the same time as the wind turbine 1 is moved up, so that the container 2 is closed tightly.

In the case where the wind turbine is required to further easily be unfolded and accommodated, the lifting device 75 may be a motorized winder. This makes it possible to unfold and accommodate the wind turbine 1 only by operating a switch. In such a case, a limit switch or the like (not illustrated) may be provided to the support column 6 and the container 2 to additionally provide a function that the motorized lifting device is automatically stopped when unfolding and accommodating are completed.

Although the lifting device 75 may also serve as a support-column fixing part for fixing the support column 6 of the wind turbine 1 to the container 2 together with the linear guiding device 71, there may be a dedicated support-column fixing for fixing the wind turbine 1 in a moved-up state to the container 2 if needed. FIG. 67B shows an example in which a bolt is used as the support-column fixing part 85 to fix the support column 6 of the wind turbine 1 and the container 2. In this example, a fixing metal fitting 86 fixed to the support column 6 is fixed by a bolt 88 to a container-side fixing metal fitting 87 which is integrated with the container 2.

Figure 69:
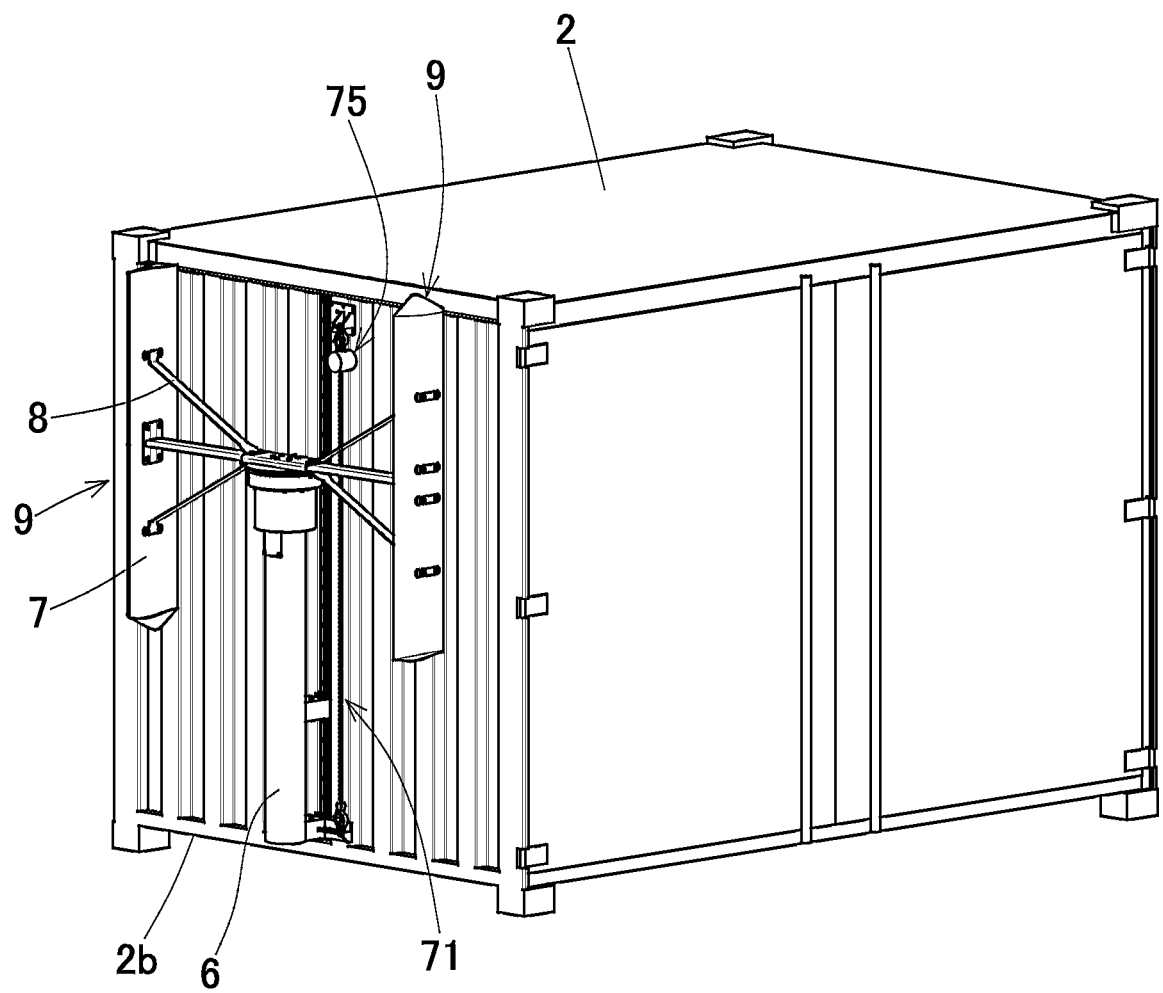
FIG. 69 is a perspective view illustrating an accommodated state of a wind turbine of a vertical axis wind power generation device according to yet another embodiment of the present invention.
Figure 70:
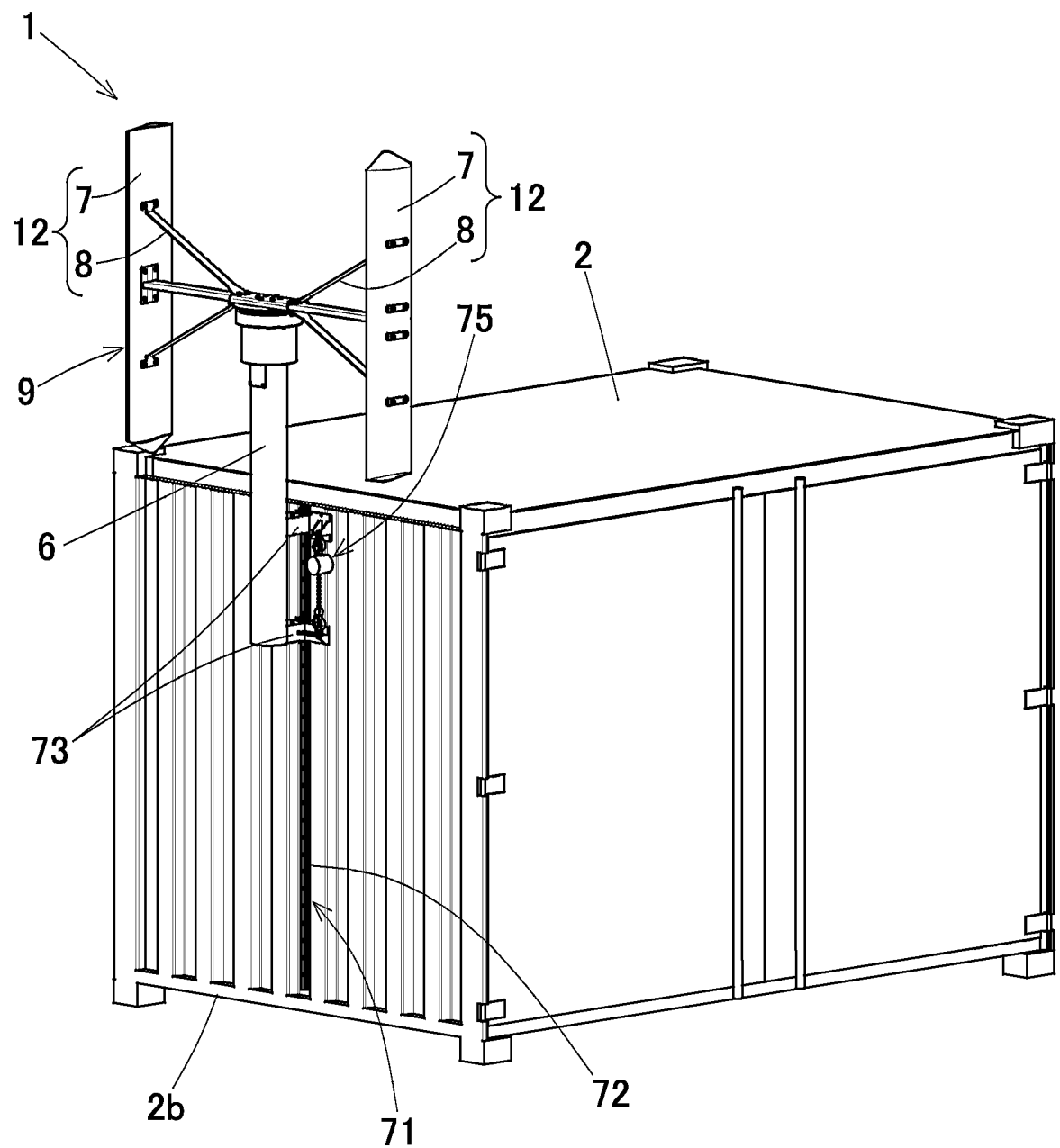
FIG. 70 is a perspective view illustrating a use state of the wind turbine of the vertical axis wind power generation device.

Although the wind turbine 1 is disposed inside the container 2 in the above embodiment, the wind turbine 1 may be fixed outside the container 2 if needed, as shown in e.g. FIG. 69 and FIG. 70. In the case where the wind turbine 1 is attached outside the container 2, a space inside the container 2 is widened, so that the inner space can be effectively used. In this case, however, the wind turbine 1 is shaped and dimensioned such that it can be accommodated in the container 2 as it is or in a folded or disassembled state. This makes it possible to immediately accommodate the wind turbine 1 when a large-scale typhoon approaches in order to avoid damage to the wind turbine 1 due to the typhoon.

As described above, in the case where the wind turbine 1 is attached outside the container 2, there is a risk that the wind turbine 1 may be damaged when the container 2 is moved with the wind turbine 1 being attached thereto. Therefore, when moving the container 2, the wind turbine 1 is detached from the linear guiding device 71 and is accommodated in the container by using a non-illustrated dolly or the like. In such a case, since there is a step between a floor of the container and the ground, it is necessary to separately provide a slope or the like. Further, it is very difficult to push the dolly carrying the wind turbine 1, which is a heavy object, on the slope up to the floor. In the case where the wind turbine disposed in the container is set up outside the container, it is also necessary to provide a slope and lower a dolly carrying the wind turbine from the container.

As a means for solving the problems, as shown in FIG. 73A, FIG. 73B, FIG. 74A and FIG. 74B, one door 10A is provided with a wind-turbine holding part Ha configured to hold the wind turbine 1 in the accommodated state in the container 2 along an inner side of the door 10A of the container 2. Also, one door 10A is provided with a water-turbine holding part Hb configured to hold the compact hydropower generation device 60 including the water turbine 62 in the accommodated state in the container 2 along an inner side of the door 10A of the container 2. The container 2 of the present embodiment has the openings 2a on opposite sides and double doors 10A, 10A for opening and closing the respective openings 2a.

Figure 74A:
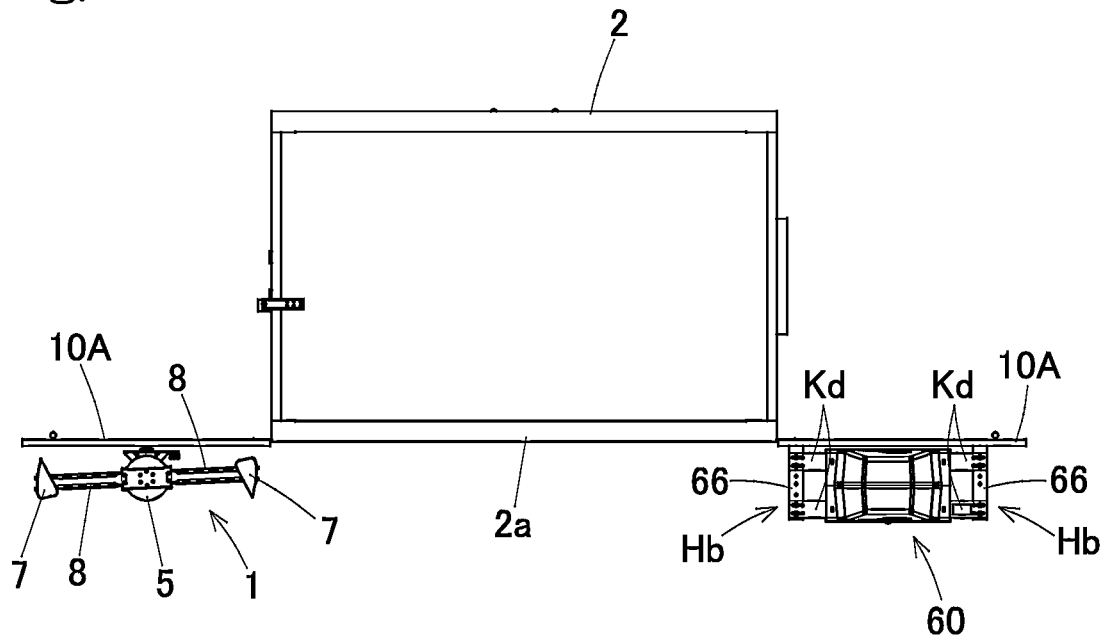
FIG. 74A is a plan view illustrating the container of the vertical axis wind power generation device, with its door being opened.
Figure 74B:
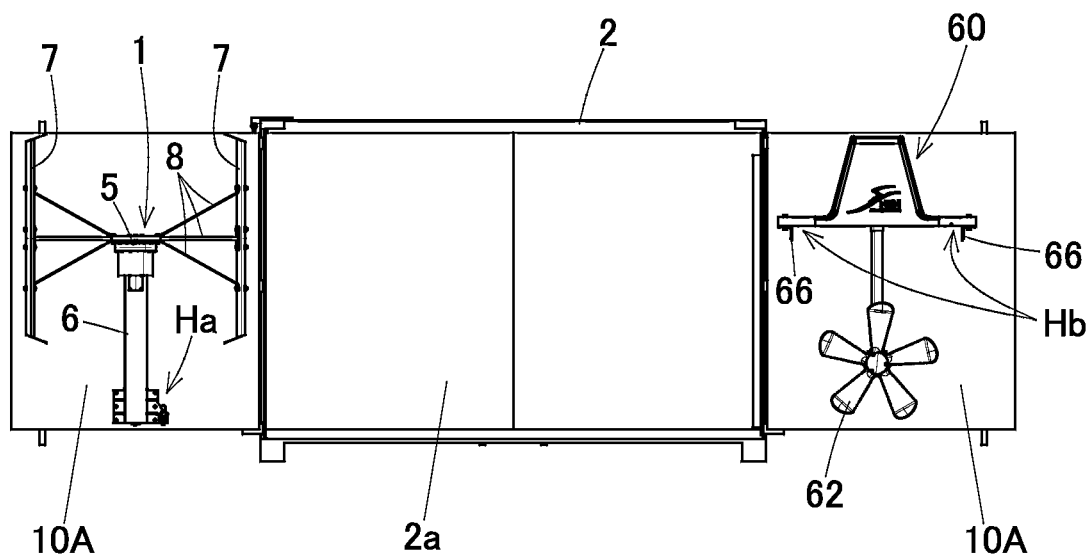
FIG. 74B is a front view illustrating the container of the vertical axis wind power generation device, with the door being opened.
Figure 75:
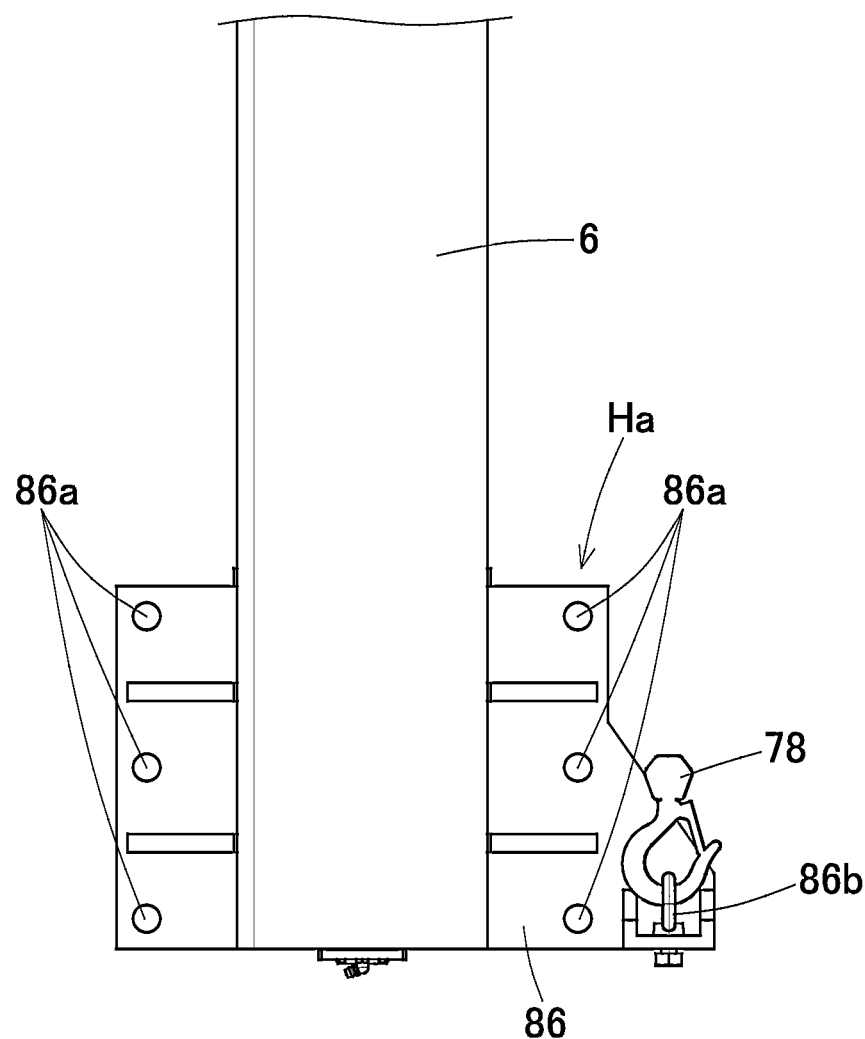
FIG. 75 is a partially enlarged view of a wind-turbine holding part of the vertical axis wind power generation device.

As shown in FIG. 75 which shows a left-side lower portion of FIG. 74B in an enlarged manner, the wind-turbine holding part Ha includes a fixing metal fitting 86 fixed to the longitudinal lower portion of the support column 6 and a non-illustrated plurality of bolts inserted through respective bolt holes 86a in the fixing metal fitting 86 and screwed into the door 10A (FIG. 74B) of the container 2. The fixing metal fitting 86 is provided with a to-be-engaged portion 86b which can be engaged with the lower hook 78 of the winding member 76 (see FIG. 67A).

Therefore, as shown in FIG. 74A and FIG. 74B, when the door 10A is opened to take out the wind turbine 1 held along the inner side of the door 10A from the container, the wind turbine 1 can be received on a dolly or the like without using a slope or the like, and the wind turbine 1 can be easily attached to the linear guiding device 71 outside container 2 as shown in e.g. FIG. 69 and FIG. 70. Also in the case where the wind turbine 1 is removed from an installation position and is accommodated into the container, when the door 10A is opened, the wind turbine 1 can be easily held along the inner side of the door 10A by the wind-turbine holding part Ha without using a slope or the like as shown in FIG. 74B.

Figure 76:
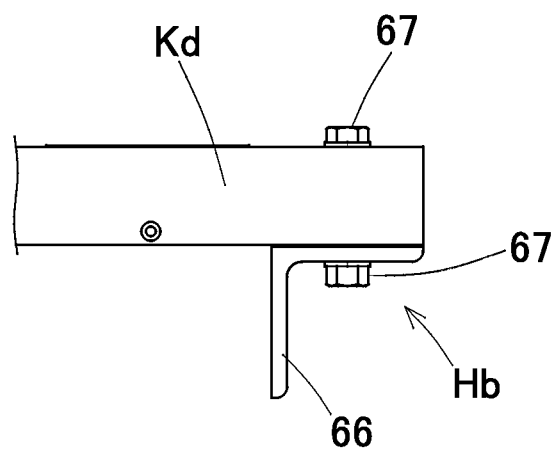
FIG. 76 is a partially enlarged view of a water-turbine holding part of the vertical axis wind power generation device.

As shown in FIG. 74A and FIG. 76 which shows a right-side upper portion of FIG. 74B in an enlarged manner, the water-turbine holding part Hb includes: two supporting members 66, 66 supporting base mounts Kd, Kd at opposite ends of the water turbine 62 in the widthwise direction; and a plurality sets of bolts and nuts 67 inserted through oblong holes defined in the base mounts Kd, Kd and fastened to the respective supporting members 66. The two supporting members 66, 66 are fixed to the inside of the door 10A of the container 2 in a parallel manner and extend in the vertical direction with respect to a wall surface across a predetermined gap. Each of the supporting members 66 may be constituted by, for example, an equilateral angle steel (such as a so-called angle).

In this case, when the door 10A is opened to take out the water turbine 62 held along the inner side of the door 10A from the container, the water turbine 62 can be received on a dolly or the like and be moved to a desired installation position without using a slope or the like. Also in the case where the water turbine 62 is removed from an installation position and is accommodated into the container, the water turbine 62 can be easily held along the inner side of the door 10A by the water-turbine holding part Hb without using a slope or the like.

Figure 77:
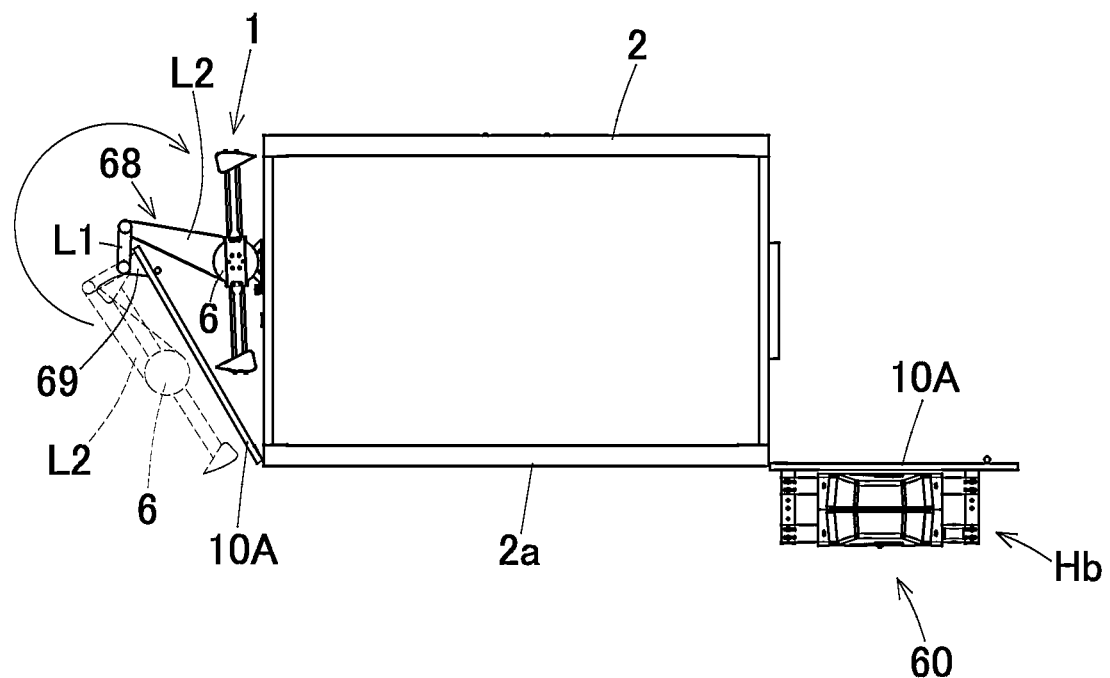
FIG. 77 is a plan view of a vertical axis wind power generation device according to still another embodiment of the present invention.

Although, as shown in FIG. 73A, FIG. 73B, FIG. 74A and FIG. 74B, when the door 10A is opened, the wind turbine 1 held along the inner side of the door 10A can be easily taken out from the container, it is sometimes difficult to carry it on a dolly depending on road surface conditions, such as gravel or soil roads. Thus, as shown in FIG. 77, the wind-turbine holding part Ha may include a link mechanism 68 which serves to change the position of the wind turbine 1 from the inner side of the door 10A to a position distant from the inner side of the door 10A. The link mechanism 68 includes a bracket 69, a first link plate L1, and a second link plate L2.

The bracket 69 is fixed to an inner opening edge of the door 10A, and the bracket 69 supports one longitudinal end of the first link plate L1 such that it is rotatable about a vertical axis. The other longitudinal end of the first link plate L1 supports one longitudinal end of the second link plate L2 such that it is rotatable about the vertical axis. The other longitudinal end of the second link plate L2 is coupled to the support column 6.

Therefore, when the door 10A is opened to take out the wind turbine 1 held along the inner side of the door 10A from the container, and the bolts are removed from the fixing metal fitting 86 (FIG. 75), the position of the wind turbine 1 can be changed by the link mechanism 68 as shown in FIG. 77, from the inner side of the door 10A to a position distant from the inner side of the door 10A, i.e., to a position on the side of one longitudinal end of the container 2 in the example of FIG. 77. This makes it possible to directly move the wind turbine 1 and fix it to a desired installation position by the bolts, without being unloaded from the door 10A.

Figure 71:
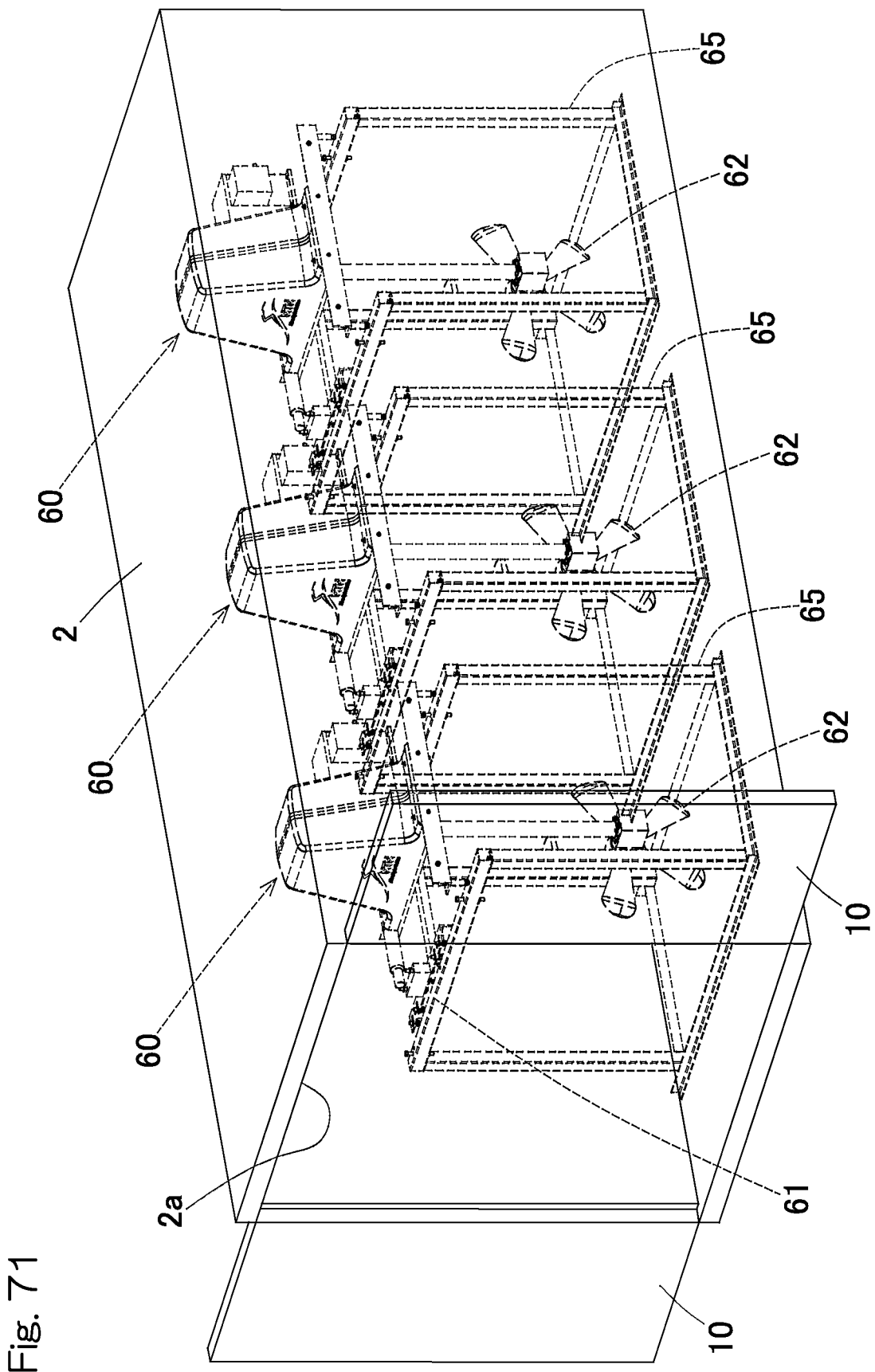
FIG. 71 is a perspective view illustrating an accommodated state of a container-accommodated hydropower generation device according to an embodiment of the present invention.
Figure 72:
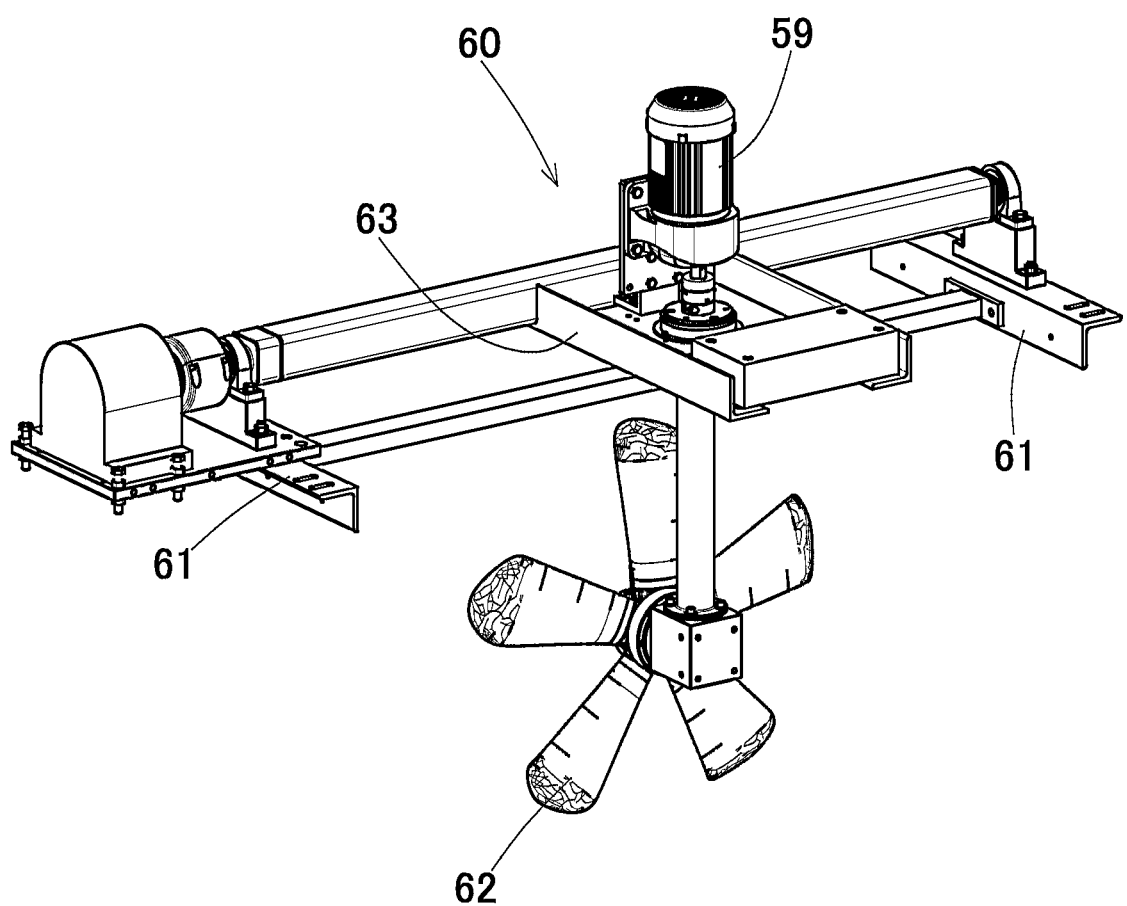
FIG. 72 is a perspective view showing an example of the compact hydropower generation device.
Figure 73A:
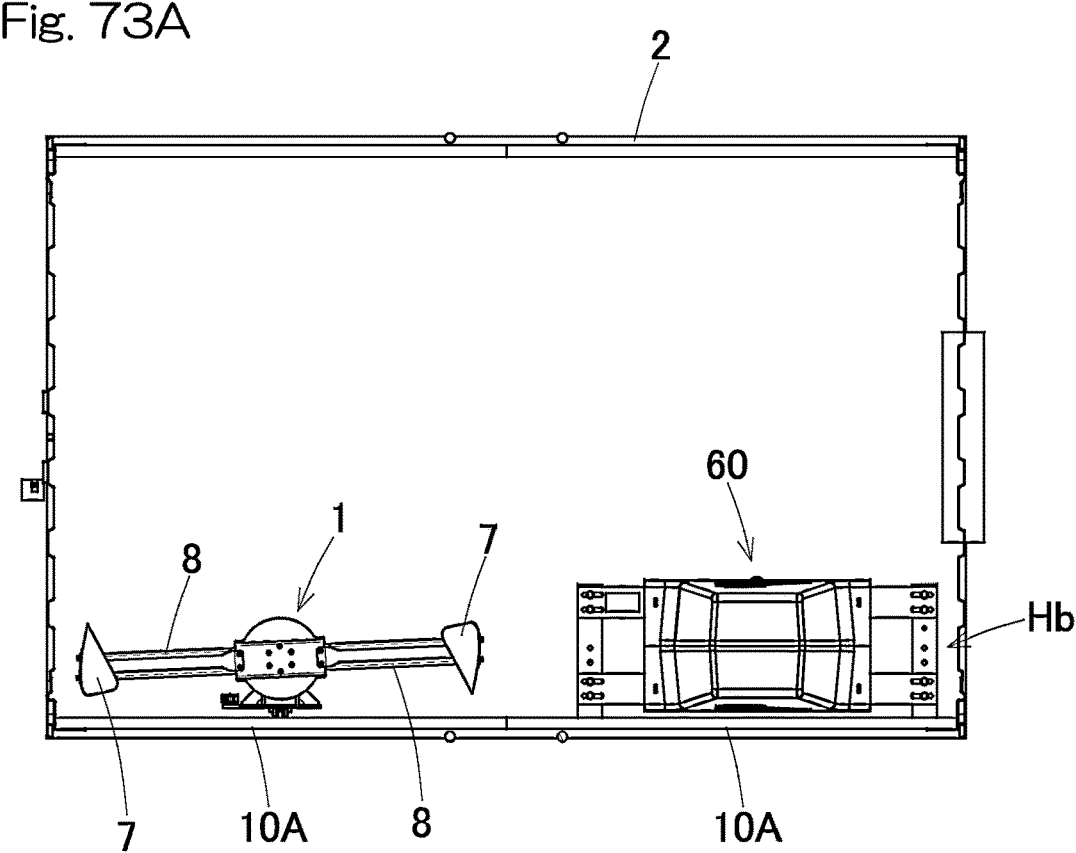
FIG. 73A is a plan view of an inside of a container, which illustrates an accommodated state of a wind turbine of a vertical axis wind power generation device according to still another embodiment of the present invention.
Figure 73B:
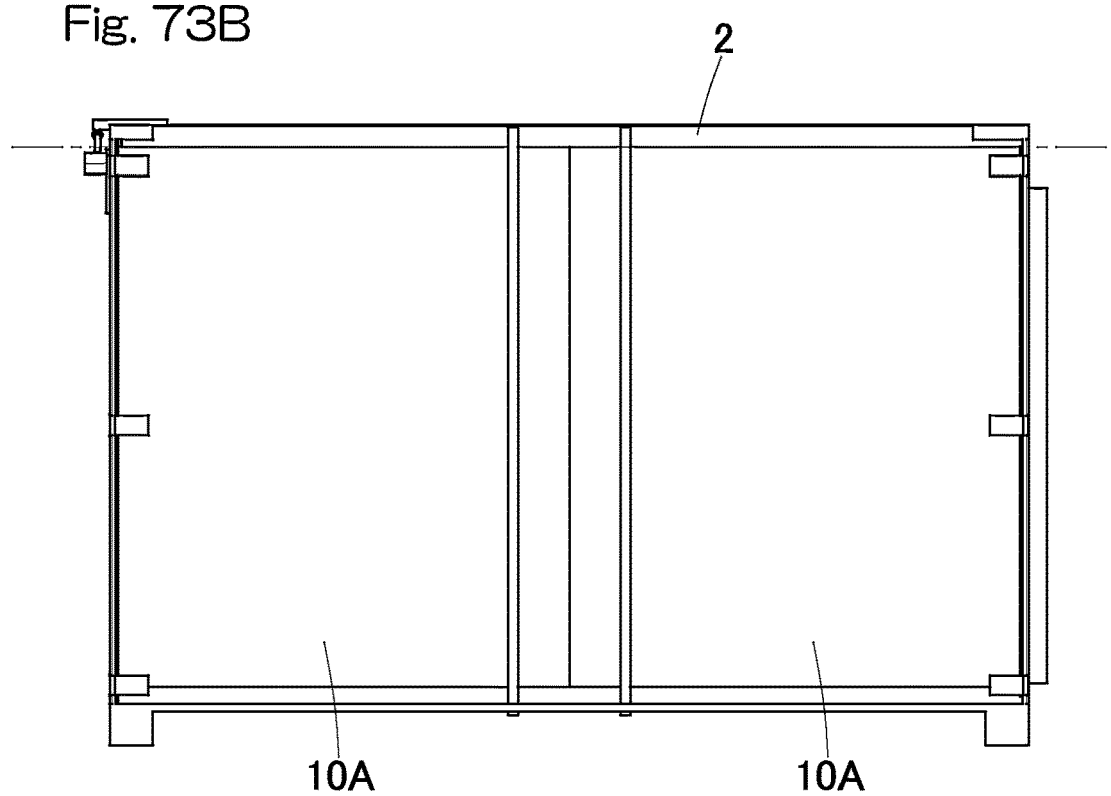
FIG. 73B is a front view illustrating an accommodated state of a wind turbine of a vertical axis wind power generation device according to yet another embodiment of the present invention.

FIG. 71 and FIG. 72 show an embodiment of a container-accommodated hydropower generation device. The container-accommodated hydropower generation device includes a container 2 having a standard dimension for freight transport and a plurality of compact hydropower generation devices 60 capable of being installed in a water channel and being accommodated in and removed from the container 2. Each of the compact hydropower generation devices 60 is accommodated in the container 2 together with a jig 64 for transport.

As shown in e.g. FIG. 72, each compact hydropower generation device 60 includes: a pair of base mounts 61, 61 disposed on water channel walls on opposite sides of the water channel (not illustrated); a water turbine 62; a rotary frame 63 supporting the water turbine 62 and supported by the pair of base mounts 61, 61 in a vertically rotatable manner; and a power generator 59 configured to generate electric power by rotation of the water turbine 62. The rotary frame 63 can be rotated between a use posture in which the water turbine 62 is submerged under the surface of the water in the water channel and a raised posture in which the water turbine is rest above the water. According to the hydropower generation device having this constitution, the compact hydropower generation device has excellent transportability because it is accommodated in the container having a standard dimension.

Although the present invention has been described in connection with the embodiments thereof, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

Next, the following describes vertical axis wind power generation devices according to application aspects which do not fall within the scope of the present invention, each of the application aspects providing the above-described vertical axis wind power generation device which does not require the container and the support-column fixing part. The application aspects include aspects 1 to 8 below. The vertical axis wind power generation device according to any of the application aspects also provides the effects that since both the main shaft unit including the support column and the main shaft as well as the blade units including the blades and the arms for supporting the blades can be folded, the device has excellent transportability because it can be transported in the folded state, and can be easily installed by being unfolded from the folded state at a destination because it is a foldable type.

Aspect 1

A vertical axis wind power generation device including:
a main shaft unit including a support column and a main shaft disposed on an upper portion of the support column so as to be rotatable about a vertical axis;
a plurality of blade units including blades extending in the vertical direction around the main shaft and arms coupling the blades to the main shaft;
a power generator configured to generate electric power by rotation of the main shaft;
a main-shaft-unit folding mechanism configured to allow the main shaft unit to be folded; and
a blade-unit folding mechanism configured to allow the blade units to be folded along the main shaft unit in a folded state.

Aspect 2

The vertical axis wind power generation device as recited in aspect 1, wherein the main-shaft-unit folding mechanism includes a support-column tilting mechanism tiltably coupling the support column to a wind turbine mount.

Aspect 3

The vertical axis wind power generation device as recited in aspect 1 or 2, wherein the main-shaft-unit folding mechanism includes a main-shaft tilting coupling mechanism coupling a main-shaft lower-end supporting member located at an upper end of the support column and rotatably supporting the main shaft at a lower end of the main shaft such that the main shaft is tiltable, the main-shaft tilting coupling mechanism being configured to cause the main shaft in a laid state to assume a posture along the support column.

Aspect 4

The vertical axis wind power generation device as recited in any of aspect 1 to 3, wherein the blade-unit folding mechanism includes rotary coupling members provided to the respective blades and disposed around the main shaft so as to be rotatable, the rotary coupling members being coupled to base ends of the respective arms.

Aspect 5

The vertical axis wind power generation device as recited in any of aspect 1 to 3, wherein the blade-unit folding mechanism includes arm-base-end bending coupling parts coupling base ends of the arms to the main shaft in a bendable manner and arm-tip-end bending coupling parts coupling tip ends of the arms to the blades in a bendable manner.

Aspect 6

The vertical axis wind power generation device as recited in any of aspect 1 to 5, including a container configured to accommodate the main shaft unit and the blade units in the folded state and housing the power generator disposed in the container, and
a support-column fixing part configured to fix the support column of the main shaft unit taken out from the container in a raised posture.

Aspect 7

The vertical axis wind power generation device as recited in aspect 6, including an inclining mount inside the container, the inclining mount being inclined so as to be lowered toward an opening side at a longitudinal end of the container and configured to carry the main shaft unit and the blade units in the folded state on the inclining mount such that the folded body can be moved in and out through an opening.

Aspect 8

The vertical axis wind power generation device as recited in aspect 7, wherein the container includes a withdrawing and unfolding mechanism configured to withdraw the main shaft unit and the blade units in the folded state, which are accommodated on the inclining mount, by using the inclining mount while unfolding the main shaft unit and the blade units and to assist operation of setting up the main shaft unit and the blade units.

REFERENCE NUMERALS

1 ... wind turbine
2 ... container
3 ... power generator
4 ... secondary battery
6 ... support column
7 ... blade
8 ... arm
9 ... rotary blade
2a ... opening
10, 10A ... door
11 ... main shaft unit
12 ... blade unit
13 ... main-shaft-unit folding mechanism
14 ... blade-unit folding mechanism
14A ... blade-unit folding mechanism
17 ... wind turbine mount
18 ... support-column tilting mechanism
19 ... main-shaft tilting coupling mechanism
20 ... support-column fixing part
21 ... inclining mount
22 ... roller
34 ... rotary coupling member
35 ... reinforcing wire
36 ... inner door
38 ... arm-base-end bending coupling part
39 ... arm-tip-end bending coupling part
43 ... withdrawing and unfolding mechanism
44 ... winch
45 ... rope
46 ... guide roller
50 ... control panel
51 ... solar panel
52 ... stand
53 ... stand-equipped solar panel
54 ... caster
60 ... compact hydropower generation device
62 ... water turbine
63 ... rotary frame
71 ... linear guiding device
75 ... lifting device
76 ... winding member
83 ... upper opening
84 ... inner lid
85 ... support-column fixing part
Ha ... wind-turbine holding part
Hb ... water-turbine holding part
W ... vertical axis wind power generation device

What is claimed is:

1. A vertical axis wind power generation device comprising:
a wind turbine of a vertical axis type including a support column, a main shaft disposed on an upper portion of the support column so as to be rotatable about a vertical axis, a plurality of blades extending in a vertical direction around the main shaft and coupled to the main shaft through arms;
a power generator configured to generate electric power by rotation of the main shaft; and
a container having a standard dimension for freight transport,
wherein
the wind turbine is accommodatable in the container together with the power generator,
the container is provided with a support-column fixing part configured to fix the support column of the wind turbine to the container, and
the support-column fixing part includes a two-pronged metal fitting having a semicircular receiving part matching a part of an outer periphery of the support column and a base end fixed to a lower surface of a ceiling of the container.

2. The vertical axis wind power generation device as claimed in claim 1, wherein the wind turbine of the vertical axis type is foldable or able to be disassembled.

3. The vertical axis wind power generation device as claimed in claim 1, wherein the container includes a double door configured to open and close the opening at the longitudinal end of the container, and the door in an opened state serves as outriggers.

4. The vertical axis wind power generation device as claimed in claim 3, wherein the container includes an inner door disposed an inner side of the double door and configured to prevent entry from an outside.

5. The vertical axis wind power generation device as claimed in claim 1, comprising: a solar panel assembled with a stand so as to be installable outside or on the container and configured to photovoltaically generate electric power; and a secondary battery configured to store the generated electric power, the solar panel and the secondary battery being accommodatable in the container together with the wind turbine in the folded or disassembled state.

6. The vertical axis wind power generation device as claimed in claim 1, comprising: a main-shaft-unit folding mechanism configured to allow a main shaft unit including the support column and the main shaft to be folded; and a blade-unit folding mechanism configured to allow blade units, which are constituted by the blades and the arms, to be folded along the main shaft unit in a folded state.

7. The vertical axis wind power generation device as claimed in claim 6, wherein the main-shaft-unit folding mechanism includes a support-column tilting mechanism coupling the support column to a wind turbine mount in a tiltable manner.

8. The vertical axis wind power generation device as claimed in claim 6, wherein the main-shaft-unit folding mechanism includes a main-shaft tilting coupling mechanism coupling a main-shaft lower-end supporting member located at an upper end of the support column and rotatably supporting the main shaft at a lower end of the main shaft to the upper end of the support column such that the main shaft is tiltable, the main-shaft tilting coupling mechanism being configured to cause the main shaft in a laid state to assume a posture along the support column.

9. The vertical axis wind power generation device as claimed in claim 6, wherein the blade-unit folding mechanism includes rotary coupling members provided to the respective blades and disposed around the main shaft so as to be rotatable, the rotary coupling members being coupled to base ends of the respective arms.

10. The vertical axis wind power generation device as claimed in claim 6, wherein the blade-unit folding mechanism includes arm-base-end bending coupling parts coupling base ends of the arms to the main shaft in a bendable manner and arm-tip-end bending coupling parts coupling tip ends of the arms to the blades in a bendable manner.

11. The vertical axis wind power generation device as claimed in claim 1, wherein the container is provided with a linear guiding device configured to guide the wind turbine so as to allow the wind turbine to be lifted and lowered between a use position at which the blades project upward from a height range of the container and an accommodation position at which the blades are accommodated within the height range of the container.

12. The vertical axis wind power generation device as claimed in claim 11, comprising a lifting device of a winding type configured to wind a winding member connected to an upper portion of the container and a lower portion of the support column such that the wind turbine can be lifted and lowered.

13. The vertical axis wind power generation device as claimed in claim 12, wherein the lifting device is of an electrically-powered type which is configured to be driven by an electric motor to perform winding operation.

14. The vertical axis wind power generation device as claimed in claim 11, wherein the container has a ceiling surface having an upper opening configured to allow the wind turbine to move in and out therethrough, and the support column is provided with an inner lid configured to tightly close the upper opening when the wind turbine is raised.

15. A vertical axis wind power generation device comprising:
a wind turbine of a vertical axis type including a support column, a main shaft disposed on an upper portion of the support column so as to be rotatable about a vertical axis, a plurality of blades extending in a vertical direction around the main shaft and coupled to the main shaft through arms;
a power generator configured to generate electric power by rotation of the main shaft; and
a container having a standard dimension for freight transport,
wherein
the wind turbine is accommodatable in the container together with the power generator,
the container is provided with a support-column fixing part configured to fix the support column of the wind turbine to the container,
the wind turbine is accommodatable in a folded or disassembled state in the container, and
wherein the container includes an inclining mount inside the container, the inclining mount being inclined so as to be lowered toward an opening side at a longitudinal end of the container and configured to carry a folded body of the wind turbine on the inclining mount such that the folded body can be moved in and out through an opening.

16. The vertical axis wind power generation device as claimed in claim 15, wherein the container includes a withdrawing and unfolding mechanism configured to withdraw the folded body of the wind turbine by using the inclining mount and to assist operation of unfolding the folded body and setting up the wind turbine.

17. A vertical axis wind power generation device comprising:
a wind turbine of a vertical axis type including a support column, a main shaft disposed on an upper portion of the support column so as to be rotatable about a vertical axis, a plurality of blades extending in a vertical direction around the main shaft and coupled to the main shaft through arms;
a power generator configured to generate electric power by rotation of the main shaft; and
a container having a standard dimension for freight transport,
wherein
the wind turbine is accommodatable in the container together with the power generator,
the container is provided with a support-column fixing part configured to fix the support column of the wind turbine to the container,
the support-column fixing part includes a container-side fixing metal fitting and a bolt,
the container includes a door, and
the door includes a wind-turbine holding part configured to hold the wind turbine such that the wind turbine extends along the door of the container.

18. The vertical axis wind power generation device as claimed in claim 17, wherein the wind-turbine holding part has a function of changing a position of the wind turbine from the inner side of the door to a position distant from the inner side of the door.

19. The vertical axis wind power generation device as claimed in claim 17, wherein the door includes a water-turbine holding part configured to hold a water turbine in an accommodated state in the container such that the water turbine extends along the inner side of the door of the container.

\* \* \* \* \*